(12) United States Patent
Haase et al.

(10) Patent No.: US 11,397,297 B2
(45) Date of Patent: Jul. 26, 2022

(54) OPTICAL ASSEMBLY WITH CABLE RETAINER

(71) Applicant: 3M INNOVATIVE PROPERTIES COMPANY, St. Paul, MN (US)

(72) Inventors: Michael A. Haase, St. Paul, MN (US); Terry L. Smith, Roseville, MN (US); Alexander R Mathews, Austin, TX (US); James M. Nelson, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/247,586

(22) Filed: Dec. 17, 2020

(65) Prior Publication Data

US 2021/0103106 A1   Apr. 8, 2021

Related U.S. Application Data

(63) Continuation of application No. 16/578,654, filed on Sep. 23, 2019, now Pat. No. 10,890,724, which is a continuation of application No. 15/763,512, filed as application No. PCT/US2016/056327 on Oct. 11, 2016, now Pat. No. 10,459,173.

(60) Provisional application No. 62/240,008, filed on Oct. 12, 2015.

(51) Int. Cl.
*G02B 6/38* (2006.01)
*G02B 6/32* (2006.01)

(52) U.S. Cl.
CPC ............ *G02B 6/3885* (2013.01); *G02B 6/32* (2013.01); *G02B 6/383* (2013.01); *G02B 6/3839* (2013.01); *G02B 6/3887* (2013.01)

(58) Field of Classification Search
None
See application file for complete search history.

(56) References Cited

U.S. PATENT DOCUMENTS

| 3,954,338 A | 5/1976 | Hennel et al. |
| 4,148,557 A | 4/1979 | Garvey |
| 4,361,380 A | 11/1982 | Marzaai |

(Continued)

FOREIGN PATENT DOCUMENTS

| AU | 2007342442 B2 * | 10/2011 | .......... G02B 6/3885 |
| CN | 102211381 | 10/2011 | |

(Continued)

OTHER PUBLICATIONS

PCT International Search Report from PCT/US2016/056327, dated Mar. 30, 2017, 5 pages.

*Primary Examiner* — Michelle R Connelly
(74) *Attorney, Agent, or Firm* — Jonathan L. Tolstedt

(57) ABSTRACT

An optical cable subassembly includes one or more optical waveguides, at least light coupling unit comprising a first attachment area permanently attached to the optical waveguides, and at least one cable retainer comprising a second attachment area permanently attached to the optical waveguides and adapted to be installed in a housing. A length of the optical waveguides between the first attachment area and the second attachment area allows a bend in the optical waveguides that provides a predetermined mating spring force at a predetermined angle of the light coupling unit when installed in the housing.

6 Claims, 44 Drawing Sheets

(56) References Cited

U.S. PATENT DOCUMENTS

| | | | |
|---|---|---|---|
| 4,812,006 A * | 3/1989 | Osborn | G02B 6/3855 385/69 |
| 5,703,982 A | 12/1997 | Takizawa | |
| 5,933,564 A | 8/1999 | Pavlath | |
| 6,320,997 B1 | 11/2001 | Dautartas et al. | |
| 6,435,728 B2 | 8/2002 | Shimoji et al. | |
| 6,442,306 B1 | 8/2002 | Dautartas et al. | |
| 6,571,048 B1 | 5/2003 | Bechamps et al. | |
| 6,572,275 B2 | 6/2003 | Shimoji et al. | |
| 6,648,520 B2 * | 11/2003 | McDonald | G02B 6/3888 385/78 |
| 6,729,773 B1 | 5/2004 | Finona et al. | |
| 7,121,732 B2 | 10/2006 | Pimpinella et al. | |
| 7,452,138 B2 * | 11/2008 | Saito | G02B 6/3846 385/86 |
| 9,435,925 B2 * | 9/2016 | Motohara | G02B 6/0006 |
| 2002/0003932 A1 | 1/2002 | Schofield et al. | |
| 2002/0114582 A1 | 8/2002 | Otera | |
| 2003/0174971 A1 | 9/2003 | Shigenaga et al. | |
| 2004/0071407 A1 | 4/2004 | Vergeest | |
| 2013/0136401 A1 | 5/2013 | Cooke et al. | |
| 2015/0117822 A1 | 4/2015 | Hu et al. | |
| 2016/0231513 A1 | 8/2016 | Butler et al. | |

FOREIGN PATENT DOCUMENTS

| | | |
|---|---|---|
| JP | S63-86606 | 6/1988 |
| JP | 2005-274702 | 10/2005 |
| WO | WO 2014/055226 | 4/2014 |
| WO | WO 2015/038941 | 3/2015 |
| WO | WO 2015/126905 | 8/2015 |
| WO | WO 2015/142551 | 9/2015 |

\* cited by examiner

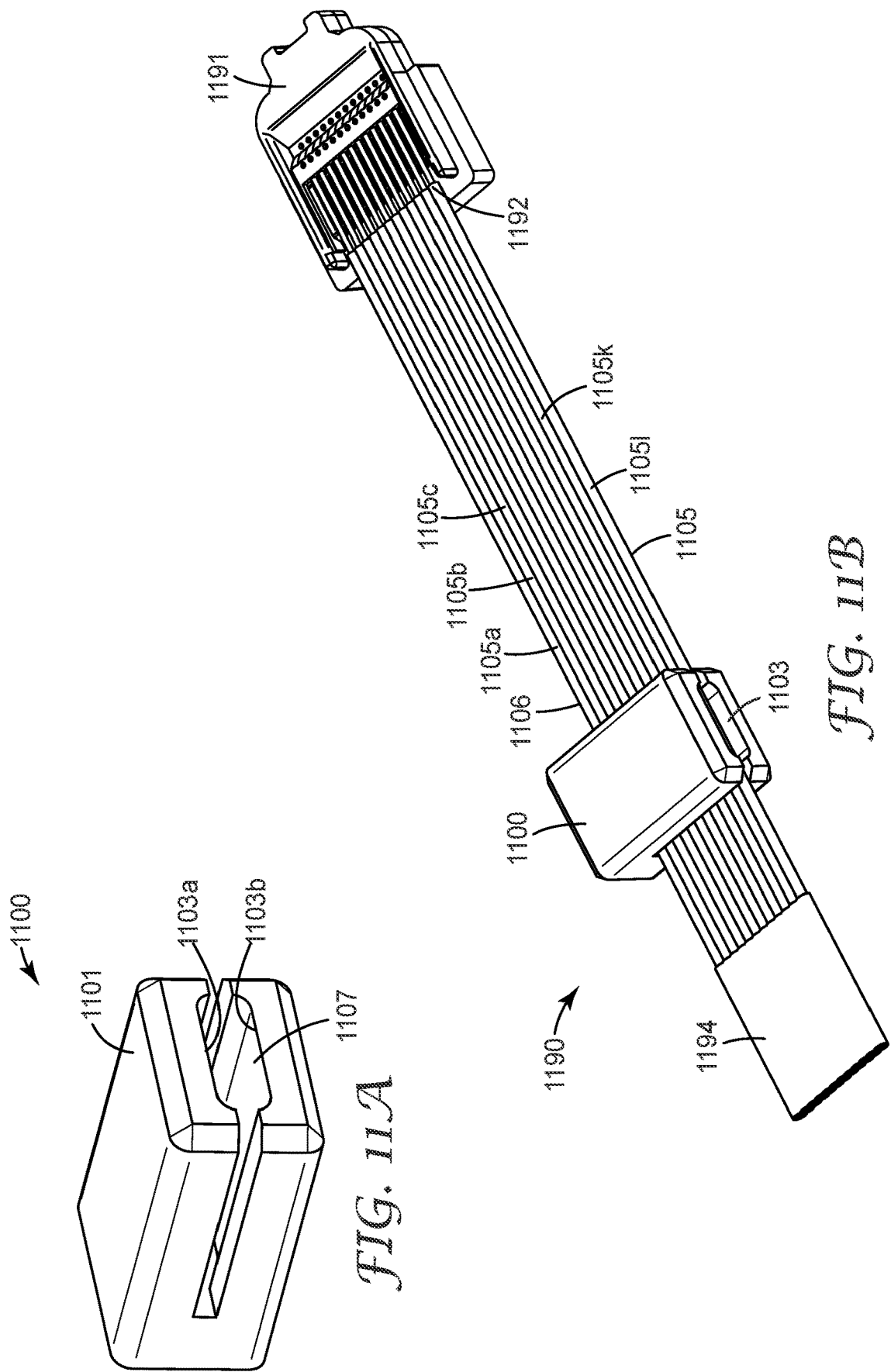

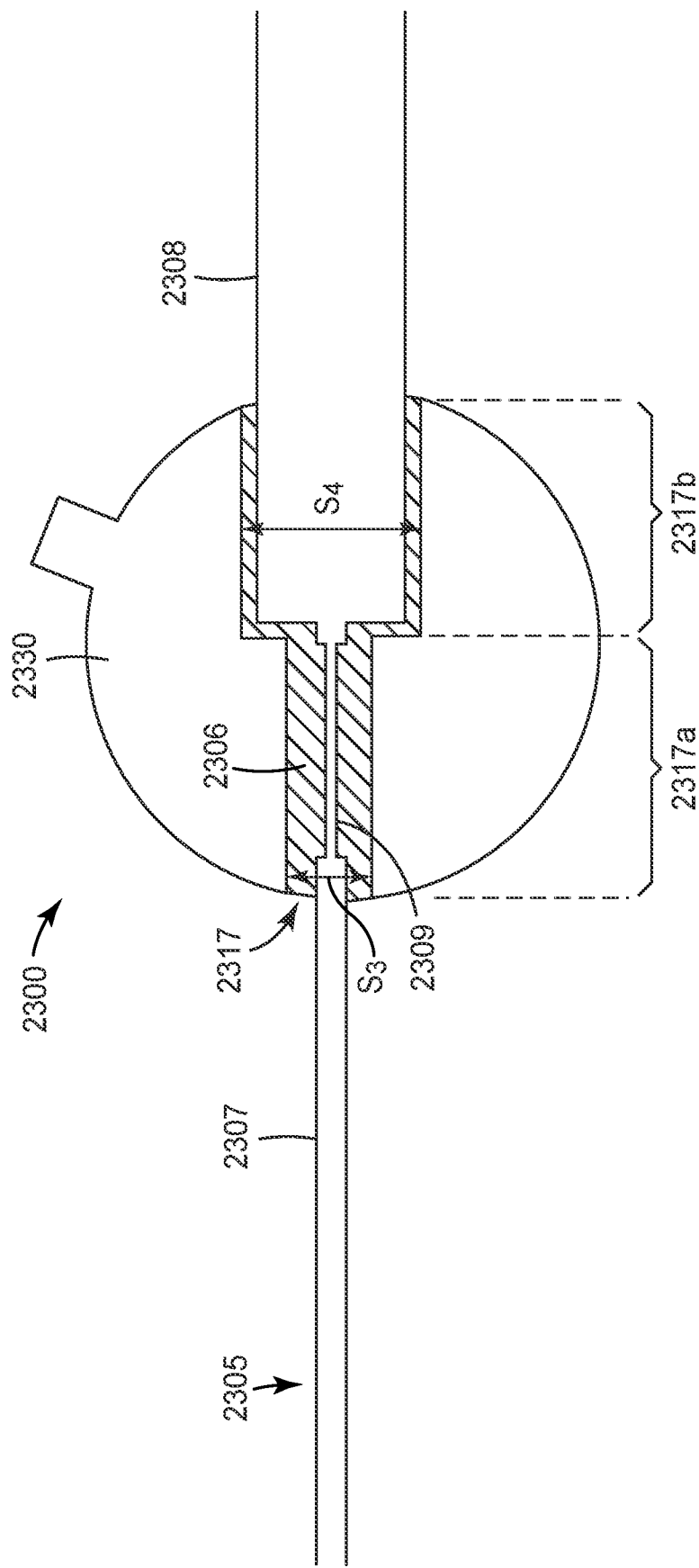

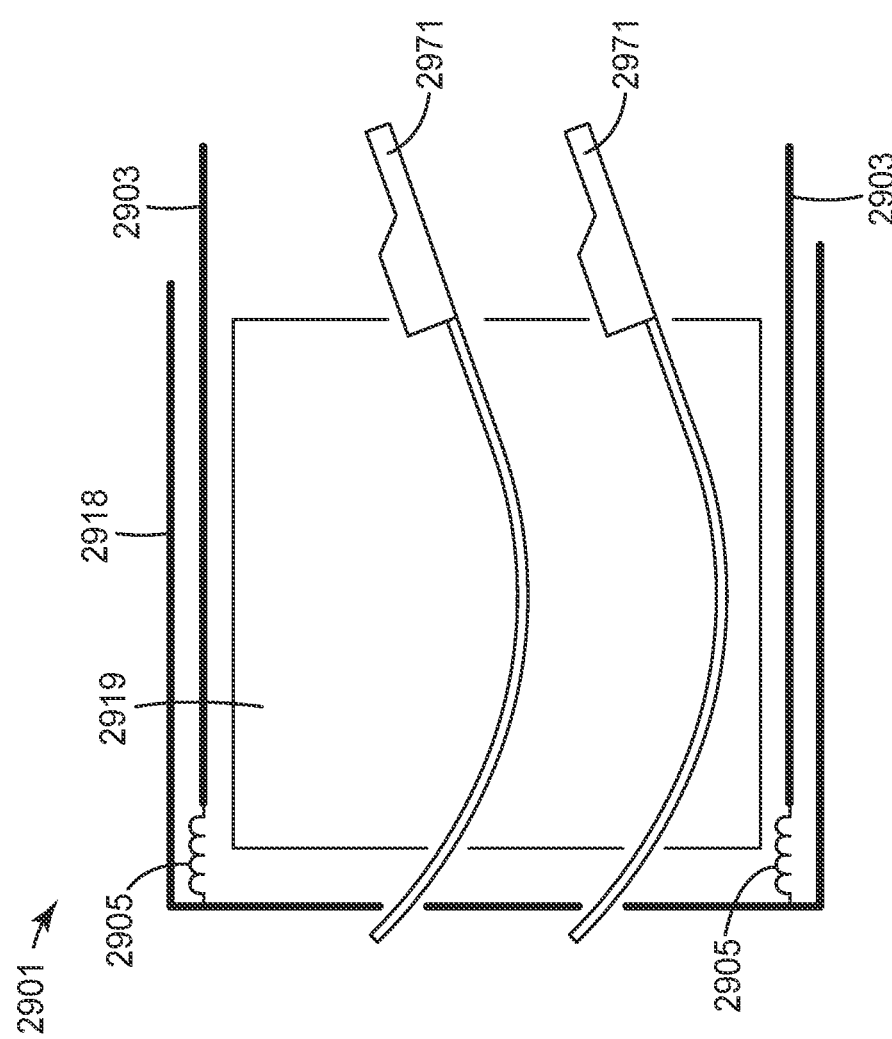

OPTICAL ASSEMBLY WITH CABLE RETAINER

TECHNICAL FIELD

This disclosure relates generally to optical connector assemblies and methods related to optical connector assemblies.

BACKGROUND

Optical connectors can be used for optical communications in a variety of applications including telecommunications networks, local area networks, data center links, and internal links in computer devices. There is interest in extending optical communication to applications inside smaller consumer electronic appliances such as laptops and even cell phones. Expanded optical beams may be used in connectors for these systems to provide an optical connection that is less sensitive to dust and other forms of contamination and so that alignment tolerances may be relaxed. Generally, an expanded beam is a beam that is larger in diameter than the core of an associated optical waveguide (usually an optical fiber, e.g., a multi-mode fiber for a multi-mode communication system). The connector is generally considered an expanded beam connector if there is an expanded beam at a connection point. The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror.

BRIEF SUMMARY

Some embodiments are directed to an optical cable subassembly. The subassembly includes one or more optical waveguides, at least one light coupling unit comprising a first attachment area permanently attached to the optical waveguides, and at least one cable retainer. The cable retainer includes a second attachment area permanently attached to the optical waveguides and adapted to be installed in a housing. A length of the optical waveguides between the first attachment area and the second attachment area is configured to allow a bend in the optical waveguides that provides a predetermined mating spring force at a predetermined angle of the light coupling unit when installed in the housing.

In some embodiments, an optical cable subassembly includes one or more optical waveguides, at least one light coupling unit permanently attached to and adapted to receive optical signals from the optical waveguides and propagate the received optical signal therein, and a cable retainer permanently attached to the plurality of optical waveguides and adapted to engage a corresponding retainer mount in a connector housing. When the subassembly is installed in the housing, the engagement of the cable retainer and the retainer mount provides the only attachment of the subassembly to the housing between the cable retainer and the light coupling unit.

According to some embodiments, an optical cable subassembly include one or more optical waveguides, at least one light coupling unit comprising a first attachment area for receiving and permanently attaching to the plurality of optical waveguides, and at least one cable retainer. The cable retainer includes a second attachment area for receiving and attaching to the optical waveguides. The cable retainer is dimensioned to couple with a retainer mount of a connector housing such that a position of the second attachment area within the connector housing is fixed. The light coupling unit and the first attachment area are configured to move within the connector housing relative to the fixed position of the second attachment area. A length of the optical waveguides between the first attachment area and the second attachment area allows the optical waveguides to bend within the housing as the first attachment area moves relative to the second attachment area.

In accordance with some embodiments, an optical cable subassembly includes one or more optical waveguides, at least one light coupling unit comprising a first attachment area for receiving and permanently attaching to the plurality of optical waveguides, and at least one cable retainer comprising a second attachment area for receiving and attaching to the plurality of optical waveguides. The cable retainer is dimensioned to couple with a retainer mount of a connector housing such that a position of the second attachment area within the connector housing is fixed. A length of the plurality of optical waveguides between the first attachment area and the second attachment area of the optical cable subassembly is greater than a straight-line distance between the first attachment area and the second attachment area after the optical cable subassembly is installed in the connector housing.

In some embodiments an optical connector housing has a mating end, a non-mating end opposite the mating end, and a passageway extending between the mating end and the non-mating end. The passageway is dimensioned to receive an optical cable subassembly including one or more optical waveguides attached to at least one light coupling unit and to at least one cable retainer. A retainer mount is configured to receive the cable retainer in the housing such that the position of the optical cable subassembly is fixed within the housing by the retainer mount. The passageway is dimensioned to constrain the optical waveguides to bend within the housing between the retainer mount and the mating end.

According to some embodiments, an optical connector assembly comprises an optical cable subassembly and a housing. The optical cable subassembly includes one or more optical waveguides, at least one light coupling unit comprising a first attachment area for receiving and permanently attaching to the optical waveguides, and at least one cable retainer comprising a second attachment area for receiving and attaching to the optical waveguides. The housing includes at least one passageway dimensioned to receive the optical cable subassembly and at least one retainer mount. The at least one retainer mount is configured to couple with the cable retainer such that a position of second attachment area is fixed within the housing. The passageway is dimensioned to constrain the optical waveguides to bend within the housing between the first attachment area and the second attachment area.

Some embodiments are directed to method of making an optical cable subassembly. One or more optical waveguides are attached at a first attachment area of a light coupling unit. The first attachment area is configured for receiving and permanently attaching to the optical waveguides. The optical waveguides are attached to a cable retainer comprising a second attachment area for receiving and attaching to the optical waveguides. A length of the optical waveguides between the first attachment area and the second attachment area allows a bend in the optical waveguides that provides a predetermined mating spring force at a predetermined angle of the light coupling unit.

Some embodiments a method of making an optical connector assembly. An optical cable subassembly is assembled by attaching one or more optical waveguides at a first attachment area of a light coupling unit and attaching the optical waveguides at a second attachment area of a cable retainer. The optical cable subassembly is inserted into a housing. The cable retainer is coupled to a retainer mount in the housing, the coupling of the cable retainer into the retainer mount fixing a position of the optical cable assembly within the housing. The optical waveguides are inserted into a passageway in the housing, the passageway dimensioned to constrain the optical waveguides to bend within the housing between the first attachment area and the second attachment area.

Some embodiments are directed to a method of making an optical connector assembly, An optical cable subassembly is assembled by: attaching one or more optical waveguides at a first attachment area of a light coupling unit; attaching the optical waveguides at a second attachment area of a cable retainer; and inserting the optical cable subassembly into a housing. Inserting the optical cable subassembly into the housing involves coupling the cable retainer to a retainer mount in the housing, the coupling of the retainer and the retainer mount fixing a position of the optical cable assembly within the housing; and inserting the optical waveguides into a passageway within the housing. A length of the optical waveguides between the first attachment area and the second attachment area is greater than a distance between the first attachment area and the second attachment area after the optical cable subassembly is installed in the connector housing.

According to some embodiments, an optical ferrule comprises one or more optical elements and one or more fiducials. Each optical element is configured to be on an optical path of a light ray propagating within the ferrule. The one or more fiducials correspond to the one or more optical elements. In accordance with some embodiments, an optical ferrule is configured to receive a one or more optical waveguides and comprises one or more features, each feature corresponding to a different optical waveguide and one or more fiducials, the one or more fiducials corresponding to the one or more features.

BRIEF DESCRIPTION OF DRAWINGS

FIG. 11A is a perspective view of an embodiment of a unitary, single piece cable retainer in accordance with some embodiments;

FIG. 11B shows an optical cable subassembly that includes the cable retainer of FIG. 11A;

FIG. 22 and FIG. 23 depict portions of optical cable subassemblies with optical waveguides disposed within a variable width adhesive attachment space of the cable retainer in accordance with some embodiments;

FIGS. 29A and 29B depict side views of hermaphroditic connector assemblies having spring actuated retractable covers in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments described herein involve optical cable subassemblies, optical connectors and related methods. Optical cables and connectors used in many applications may make use of one waveguide or arrays of multiple parallel waveguides (typically 4, 8 or 12 or more parallel waveguides). The individual waveguides are typically made of glass with a protective buffer coating, and the parallel waveguides are enclosed by a jacket. Optical cables and connectors including multiple waveguide cables and connectors are useful for connecting optical waveguides to optical waveguides or to optoelectronic components for in-line interconnects and/or printed circuit board (PCB) connections, e.g., backplane connections.

One type of connector is an expanded beam connector, in which light is coupled between waveguides in a beam that is larger in diameter than the core of an associated optical waveguide and typically somewhat less than the waveguide-to-waveguide pitch. The waveguides may comprise optical fibers, e.g., a multi-mode fibers for a multi-mode communication system. These expanded beam optical connectors can have non-contact optical coupling and can require reduced mechanical precision when compared with conventional optical connectors.

Figure 1:
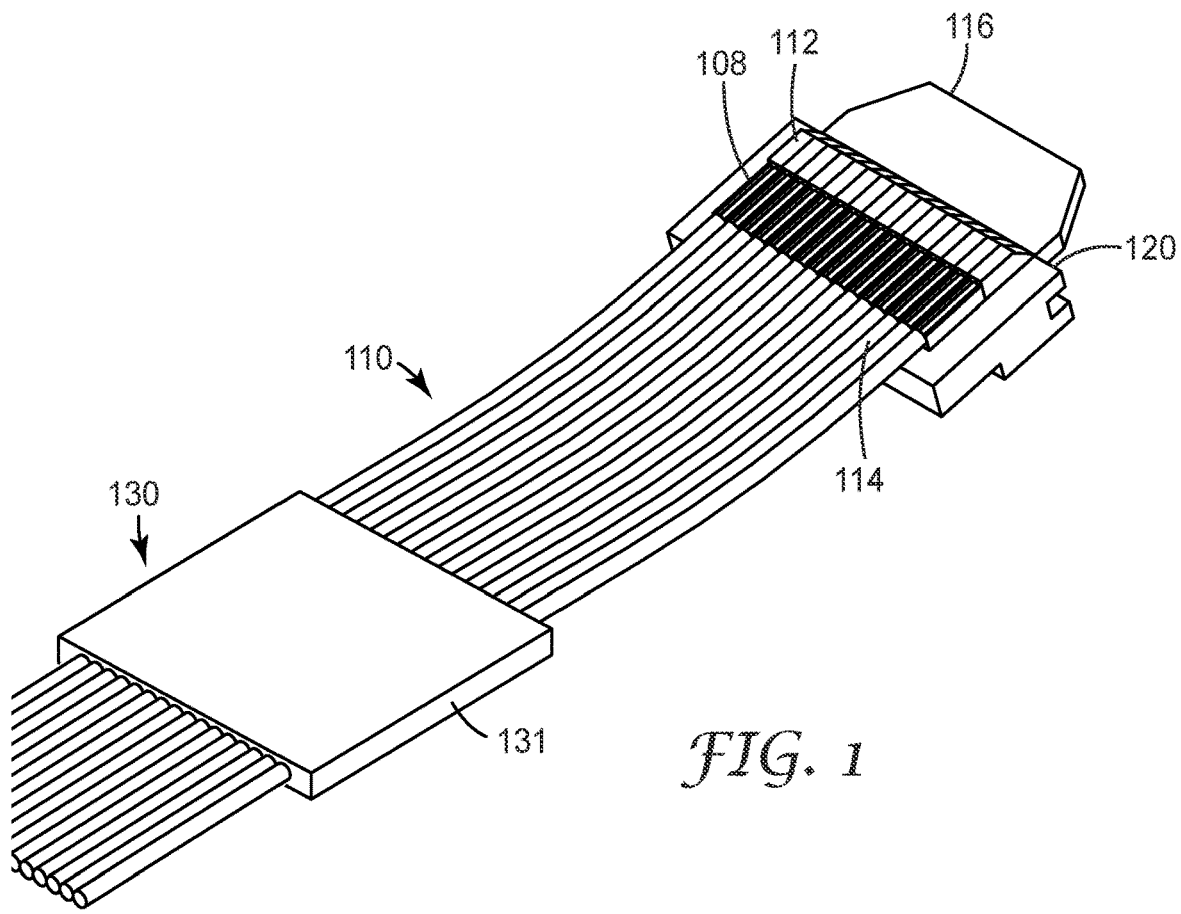
FIG. 1 shows an optical cable subassembly 100 in accordance with some embodiments.

FIG. 1 shows an optical cable subassembly 100 in accordance with some embodiments. The optical cable subassembly 100 includes one or more optical waveguides 110 and a light coupling unit 120 (also referred to herein as an optical ferrule). The term optical waveguide is used herein to refer to an optical element that propagates signal light. An optical waveguide comprises at least one core with a cladding, wherein the core and cladding are configured propagate light within the core, e.g., by total internal reflection. An optical waveguide may be, for example, a single or multi-mode waveguide, a single core fiber, a multi-core optical fiber, or a polymeric waveguide. A waveguide may have any suitable cross sectional shape, e.g., circular, square, rectangular etc.

In some embodiments, discussed in greater detail below, the optical cable subassembly includes a cable retainer 130. The optical waveguides are permanently attached to the light coupling unit 120 at a light coupling unit (LCU) attachment area 108. In embodiments that include a cable retainer 130, the optical waveguides 110 are attached to the retainer 130 at the retainer attachment area 131.

The light coupling unit 120 is configured to mate, e.g., hermaphroditically, with another light coupling unit. The light coupling unit 120 illustrated in FIG. 1 includes a mechanical mating tongue 116 and light redirecting member 112. In some embodiments, the mechanical mating tongue 116 can have a tapering width along at least a portion of a length of the tongue portion as shown in the illustrations. The mechanical mating tongue 116 can extend outwardly from a front of a connector housing (not shown in FIG. 1).

The light coupling unit (LCU) attachment area 108 includes plurality of grooves 114 each groove being configured to accommodate a different optical waveguide of the optical waveguides 110. The grooves are configured to receive an optical waveguide and each optical waveguide 110 is permanently attached to a respective groove 114 at the light coupling unit attachment area 108, e.g., using an adhesive.

Figure 2A:
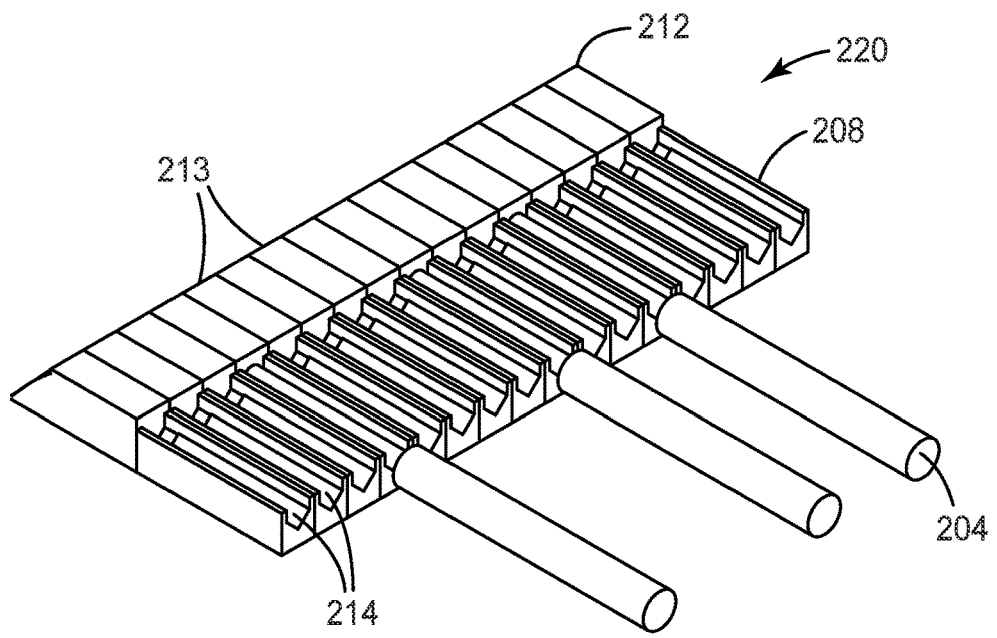
FIGS. 2A and 2B are cutaway views of a portion of an optical cable subassembly focusing on the light redirecting member according to some embodiments.
Figure 2B:
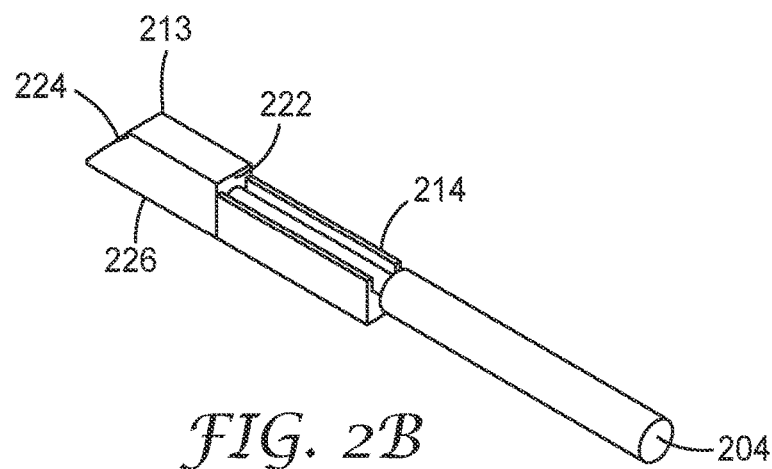

FIGS. 2A and 2B are cutaway views of a portion of an LCU focusing on the light redirecting member. FIG. 2A illustrates the attachment of several optical waveguides 204 to light coupling unit 220. Optical fibers 204 are aligned in grooves 214 to which they are permanently attached. The exit end of optical fibers 204 is situated so as to be able to direct light emanating from the optical fiber into the input side or face of light redirecting member 212. Light redirecting member 212 includes an array of light redirecting elements 213, at least one for each optical waveguide 204 attached to light coupling unit 220. For example, in various embodiments each light redirecting element 213 comprises one or more of a prism, a lens, and a reflecting surface. Light redirecting member 212 includes an array of light redirecting elements 213, one for each optical waveguide of the optical waveguides (optical fibers) 204.

FIG. 2B is a cutaway view of a portion of an LCU that includes just one light redirecting element 213, one waveguide alignment member, e.g., groove 214, and one optical fiber 204. In this illustration, optical fiber 204 is aligned in groove 214 and may be permanently attached to it. At the point of attachment, the fiber buffer coating and protective jacket (if any) have been stripped away to allow only the bare optical fiber to lie aligned and permanently affixed to groove 214. Light redirecting element 213 includes light input side 222 for receiving input light from first optical waveguide (optical fiber) 204 disposed and aligned at first waveguide alignment member 214. Light redirecting element 213 also includes light redirecting side 224 that may include a curved surface for receiving light from the input side along an input direction and redirecting the received light along a different redirected direction. The light redirecting element 213 also includes output side 226 that receives light from light redirecting side 224 of light redirecting element 213 and transmits the received light as output light along an output direction toward a light redirecting member of a mating light coupling unit.

Figure 3:
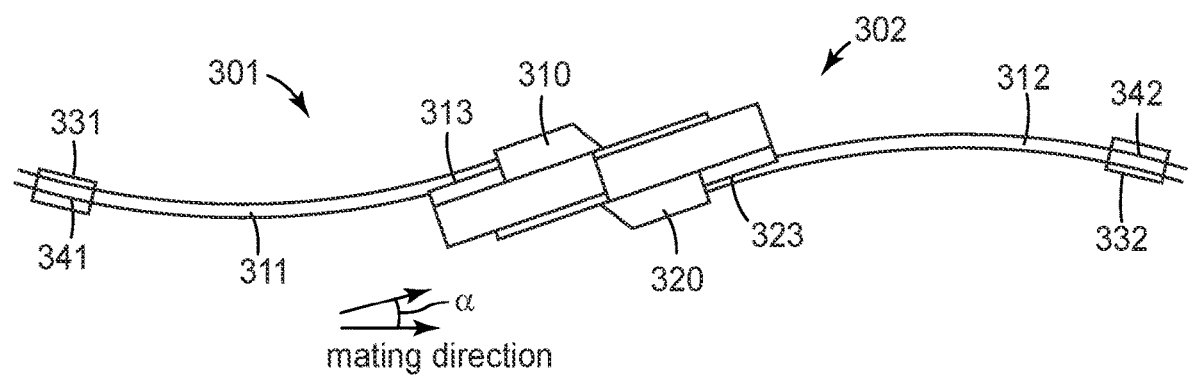
FIG. 3 illustrates a side view of two optical cable subassemblies showing mated light coupling units attached to optical waveguides at light coupling unit attachment areas in accordance with embodiments described herein.

FIG. 3 illustrates a side view of two optical cable subassemblies 301 and 302 showing mated light coupling units 310 and 320 attached to optical waveguides 311, 321 at light coupling unit attachment areas 313, 323. A cable retainer 331, 332 is optionally attached to the optical waveguides 311, 321, at a retainer attachment area 341, 342. The light coupling units 310, 320 may be oriented at a predetermined mating angle, a, with respect to a mating direction. A bend 312, 322 in the optical waveguides 311, 321 between the light coupling unit attachment area 313, 323 and the retainer attachment area 341, 342 (or other attachment area, e.g., in a connector housing) provides a predetermined amount of spring force to maintain the light coupling units 310, 320 in the mated position.

Additional information regarding features and operation of light coupling units, optical cable subassemblies and optical connectors is discussed in commonly owned U.S. Patent Application 61/710,077 filed on Oct. 5, 2012 which is incorporated herein by reference in its entirety.

Figure 4A:
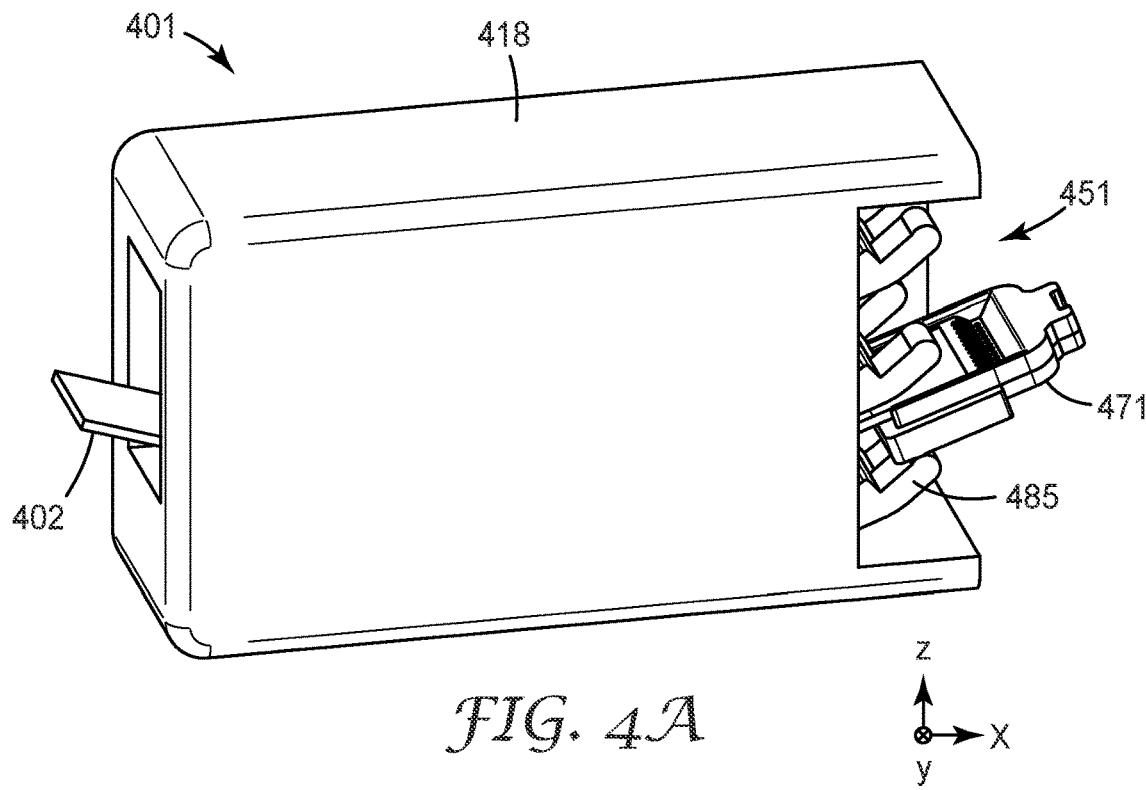
FIGS. 4A, 4B, and 4C provide several views of portions of an optical connector assembly in accordance with some embodiments.
Figure 4B:
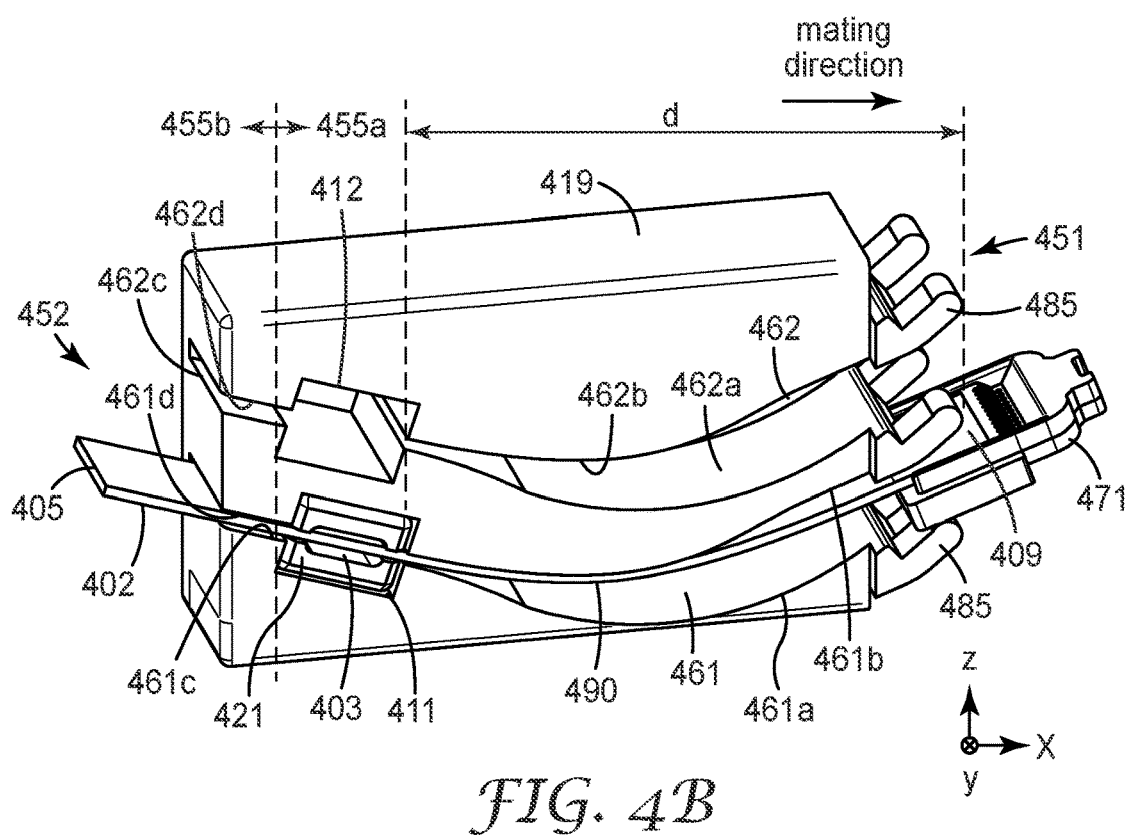
Figure 4C:
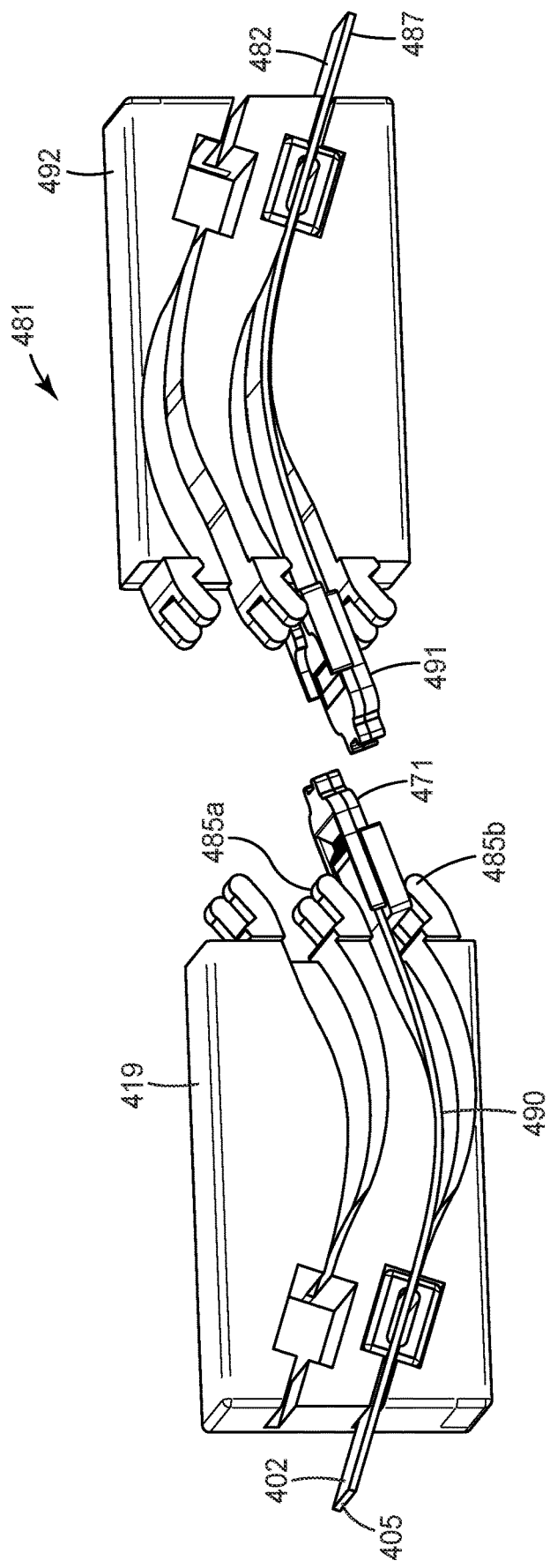

FIGS. 4A through 4C provide several views of portions of an optical connector assembly 401. The optical connector assembly 401 comprises an inner housing 419 (shown in FIGS. 4B and 4C) that can hold one or more optical cable subassemblies 402. The inner housing 419 and a portion of one or more optical cable subassemblies 402 are disposed within an outer housing 418 (shown in FIG. 4A). FIGS. 4B and 4C illustrate one optical cable subassembly 402 placed within the inner housing 419, however, the inner housing 419 in this example is capable of holding two optical cable subassemblies. In general, the inner and outer housings can be configured to hold any convenient number of optical cable subassemblies.

The inner and outer housings, 419, 418, respectively, have a mating end 451 and a non-mating end 452. One or more passageways 461, 462 are disposed between the mating end 451 and the non-mating end 452 of the inner housing 419. Each passageway 461, 462 is dimensioned to receive and contain a section of an optical cable subassembly. Optical cable subassembly 402 is shown within passageway 461. The walls 461a, 461b, 462a, 462b of the passageways 461, 462 between the retainer mount 411 and the mating end 451 can be configured to support the optical cable subassembly 402 while the optical cable subassembly 402 is in an unmated position. The walls 461c, 461d, 462c, 462d of the passageways 461, 462 between the retainer mount 411 and the non-mating end 452 may be configured to support the optical cable subassembly 402 while the optical cable subassembly 402 is in an unmated position or is in a mated position.

In various embodiments, the passageways within the inner housing may have any shape and may have a smaller or a larger volume relative to the volume occupied by the inner housing than the example passageways 461, 462 shown in FIGS. 4A through 4C. The volume of a passageway is sufficient to allow the optical waveguides of the optical cable subassembly to develop the predetermined bend that provides the mating spring force. The bend 490 provides a spring force at the mating angle of the light coupling unit 471 that maintains the light coupling unit 471 in optical communication with a mating light coupling unit 491 when the light coupling unit 471 is mated with a light coupling unit 491 of a mating optical connector assembly 481 as illustrated by FIG. 4C.

The walls 461a, 461b, 461c, 461d, 462a, 462b, 462c, 462d of the passageways 461, 462 may have any convenient shape, and are shown in FIG. 4C as curved walls in the forward section 455a of the inner housing (between the retainer mounts 411, 412 and the mating end 451). The curved walls 461a, 461b, 462a, 462b of passageways 461, 462 accommodate a gentle −z direction bend 490 of the optical waveguides 405. In some implementations, when the light coupling unit 471 is mated with a mating light coupling unit, the light coupling unit 471 and the optical waveguides 405 "float" within the inner housing 419 such that neither the optical waveguides 405 nor the light coupling unit 471 touch the curved walls 464a, 464b or other surfaces of the passageway 461 in forward section 455a of the inner housing 419. The inner housing 419 optionally includes one or more support features 485 at the mating end 451 that support the optical waveguides 405 and/or the light coupling unit 471 so that the light coupling unit 471 is in a position for mating. In some embodiments, the position for mating may be angled with respect to the mating direction of the optical connector assembly 401 as shown in FIG. 4A. The light coupling unit 471 is in a mating position before it mates with another light coupling unit after which (in some embodiments) the light coupling unit is in the "floating" mated position. In some embodiments, when in the mated position, the light coupling unit 471 floats above support feature 485b and below support feature 485a. In the example illustrated in FIGS. 4A-4C, the support features 485 comprise dual support arms that extend outwardly from the passageways 461, 462.

The inner housing 419 includes retainer mounts 411, 412 in passageways 461, 462. Retainer mount 411 is configured to couple with the cable retainer 421 of the optical cable subassembly 402. The section of the inner housing 419 that includes the retainer mounts 411, 412 and the mating end 451, as indicated by arrow 455a, is referred to herein as the forward section of the inner housing 419. In the embodiment illustrated in FIGS. 4A through 4C, the mating end 451 includes light coupling unit support features 485a, 485b. The section of the inner housing 419 that extends just behind retainer mounts 411, 412 and includes the non-mating end 452, indicated by arrow 455b, is referred to herein as the rear section 455b of the inner housing 419. Coupling the cable retainer 421 to the retainer mount 411 within the inner housing 419 fixes the position of the retainer attachment area 403 of the optical cable subassembly 402 within the inner housing 419, or at least fixes the position of the retainer attachment area 403 within the forward section 455a of inner housing 419, when the optical cable subassembly 402 is in the mated position.

In some embodiments, when the cable retainer 421 is installed in the retainer mount 411 and the optical cable subassembly 402 is in the unmated position, there may be some movement (e.g., along the x and or z axes shown in FIG. 4B) of the cable retainer 421. When the optical cable subassembly 402 mates with a compatible optical cable subassembly and is in the mated position, the position of the retainer attachment area 403 of the optical cable subassembly 402 is fixed by the interaction of the cable retainer 421 and the retainer mount 411. Fixing the position of the retainer attachment area 403 provides for developing the spring force in the optical waveguides such that the light coupling unit 471 in the mated position is able to float. The light coupling unit and the optical waveguides are held away from the passageway walls 461a, 461b and/or the supports 485 by the spring force of the optical waveguides 405 and the optical waveguides 487 of a mating optical cable subassembly 482 of a mating connector assembly 481 (as shown in FIG. 4C). In some embodiments, when the cable retainer 421 is coupled with the retainer mount 411, the retainer attachment area 403 may be the only point of attachment of the optical cable subassembly 402 to the inner housing 419 that fixes the position of the optical cable subassembly 402. In the mated position, the cable retainer 421 and the retainer mount 411 support the optical cable subassembly 402 and attach the optical cable subassembly 402 to the inner housing 419, fixing the position of the retainer attachment area 403 within the inner housing 419.

As illustrated in FIG. 4B, the retainer mount 411, 412 can be a slot in the passageway 461, 462 dimensioned to hold the cable retainer 421, 422 within the inner housing 419. The optical waveguides 405 of the optical cable subassembly 402 bend, e.g., downwards in the passageway 461 in the orientation of FIGS. 4A-4C, in response to a force applied by a mating LCU. In some embodiments, the section of optical waveguides enclosed within the cable retainer 411 may be disposed at an angle with respect to the mating direction of the inner housing 419 when the optical cable subassembly 402 is installed in the inner housing 419.

Figure 5:
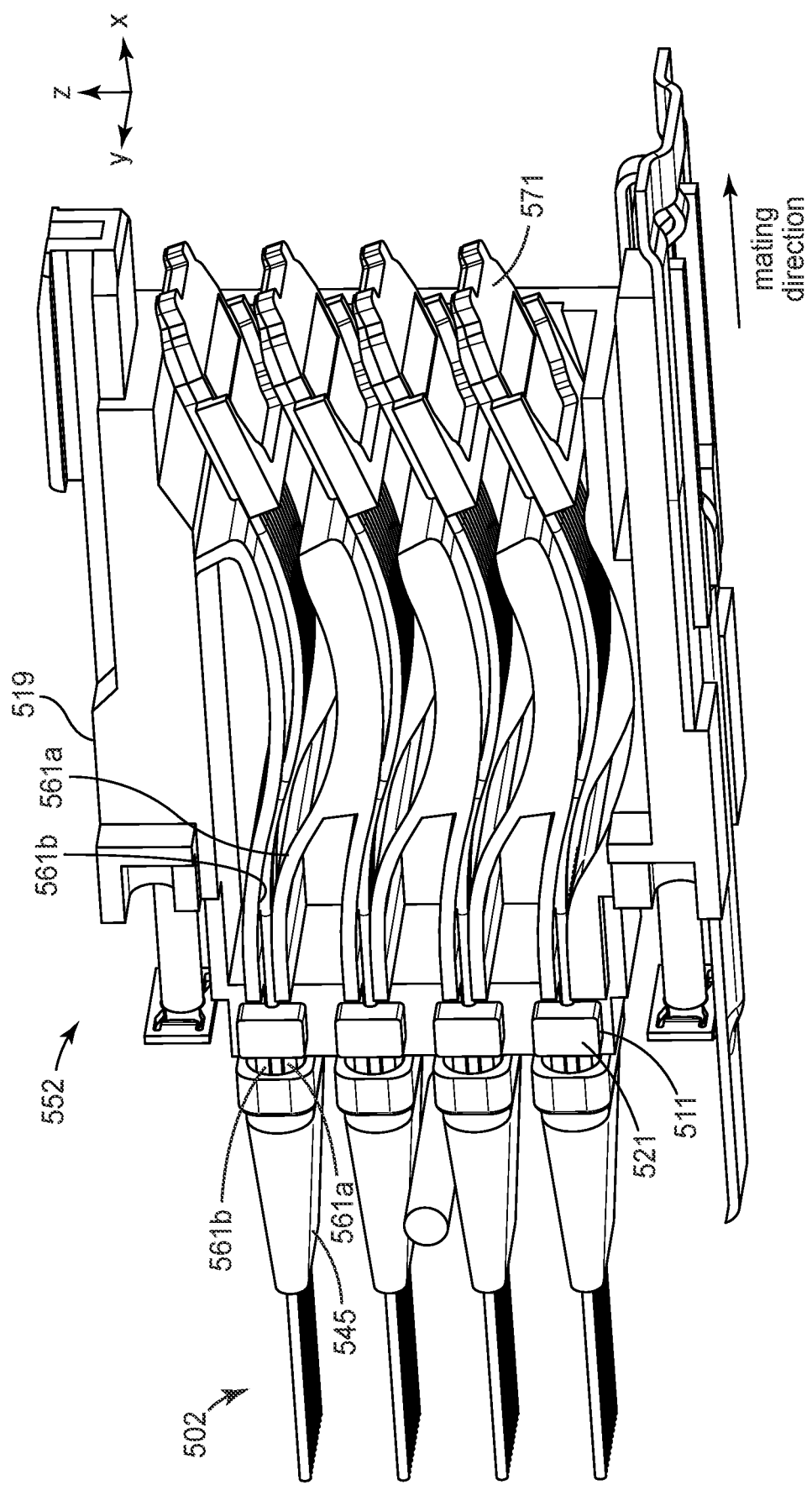
FIG. 5 depicts an embodiment of an inner housing including four optical cable subassemblies installed in the inner housing.

FIG. 5 depicts an embodiment of an inner housing 519 including four optical cable subassemblies 502 installed in the inner housing 519. In this embodiment, the cable retainers 521 are installed in complementary retainer mounts 511 disposed near the non-mating end 552 of the inner housing 519. Each of the optical cable subassemblies 502 include a strain relief boot 545 disposed outside the inner housing 519. In this embodiment, the cable retainer 521 of each optical cable subassembly 502 is arranged between the strain relief boot 545 and the light coupling unit 571. The cable retainer 521 includes an extension 561a that extends into the strain relief boot 545. In this example, the cable retainer 521 and complementary retainer mount 511 are arranged so that the section of the optical waveguides within the cable retainer 521 is disposed about parallel with a mating direction of the optical connector. The cable retainer and retainer mount can take on various complementary shapes. FIGS. 4A-4C and 5 illustrate the retainer mount as a slot with the cable retainer dimensioned to fit within the slot. FIGS. 6A, 6B and 7A and 7B illustrate x-z plane cross sectional views of inner housings 619, 719 with retainer mounts 611, 711 comprising groups of pegs 612, 712 that extend laterally (along the y-axis) within a passageway 661, 761. In these embodiments, optical cable subassemblies 605, 705 are disposed within a passageway 661, 761 of the inner housing 619, 719 that is shared by multiple optical cable subassemblies 605, 705. The cable retainers 621, 721 have holes 622 or slots 722 that fit the pegs 612, 712 such that when the optical cable subassembly 605, 705 is installed within the inner housing 619, 719, the retainer attachment area 603, 703 is at a fixed position within the passageway 661, 761 of the inner housing, at least when the light coupling unit 671, 771 is in the mated position.

Figure 6A:
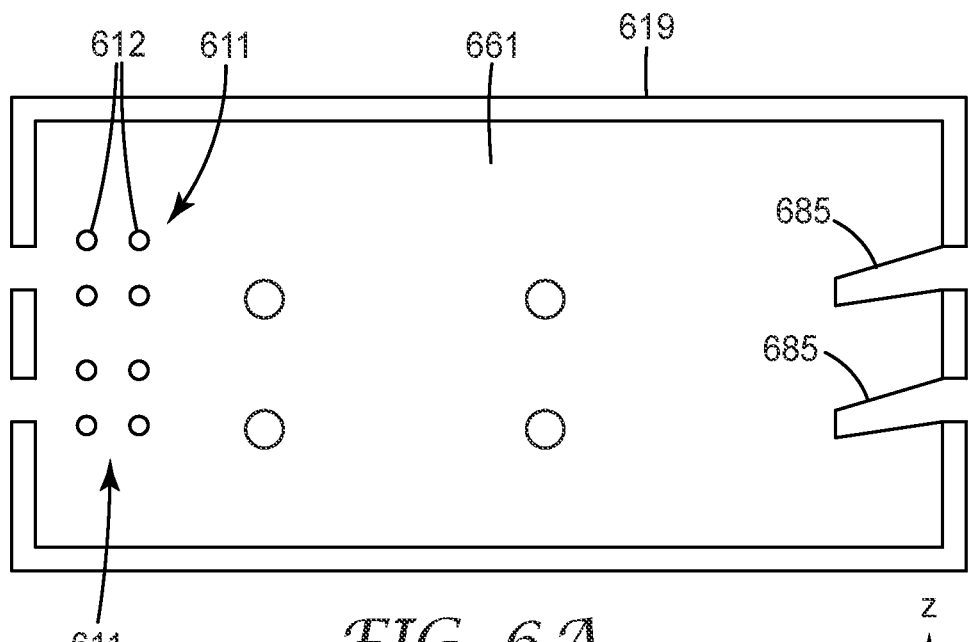
FIG. 6A illustrates an inner housing having retainer mounts comprising a group of four pegs disposed within the shared passageway in accordance with some embodiments.
Figure 6B:
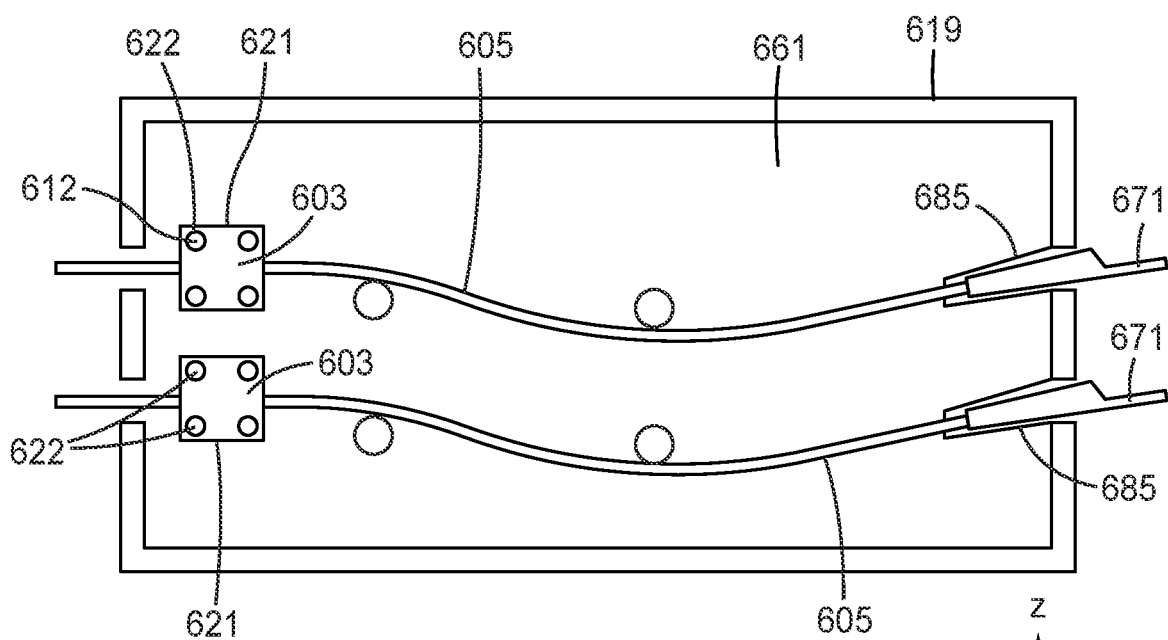
FIG. 6B illustrates the inner housing of FIG. 6A after the optical cable subassemblies have been installed.

FIG. 6A illustrates an inner housing 619 having retainer mounts 611, each retainer mount comprising a group of four pegs 612 disposed within the shared passageway 661. The cable retainers 621 of the optical cable subassembly 605 comprise holes 622 that fit the pegs 612. FIG. 6B illustrates the inner housing 619 after the optical cable subassemblies 605 have been installed. The light coupling unit support features 685 comprise indentations in the sidewalls of the passageway 661 of the inner housing 619 which are dimensioned to receive the light coupling units 671 and to support the light coupling units 671 at least when the light coupling units 671 are in the position for mating. Other support features (not shown) in inner housing 619 may be provided to position the optical cable assembly.

Figure 7A:
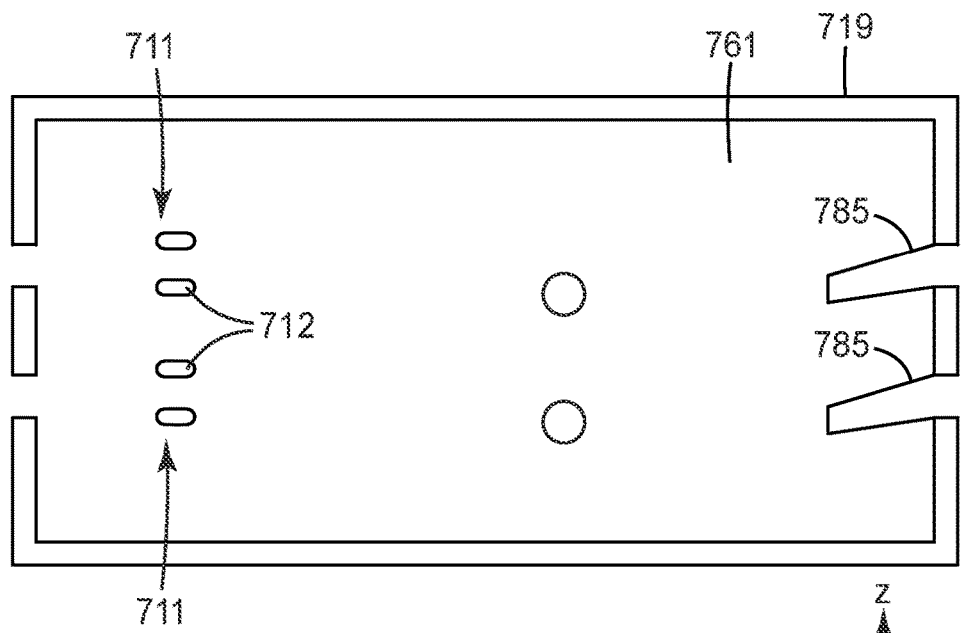
FIG. 7A illustrates an inner housing having retainer mounts, each retainer mount comprising a group of two pegs disposed within a shared passageway in accordance with some embodiments.
Figure 7B:
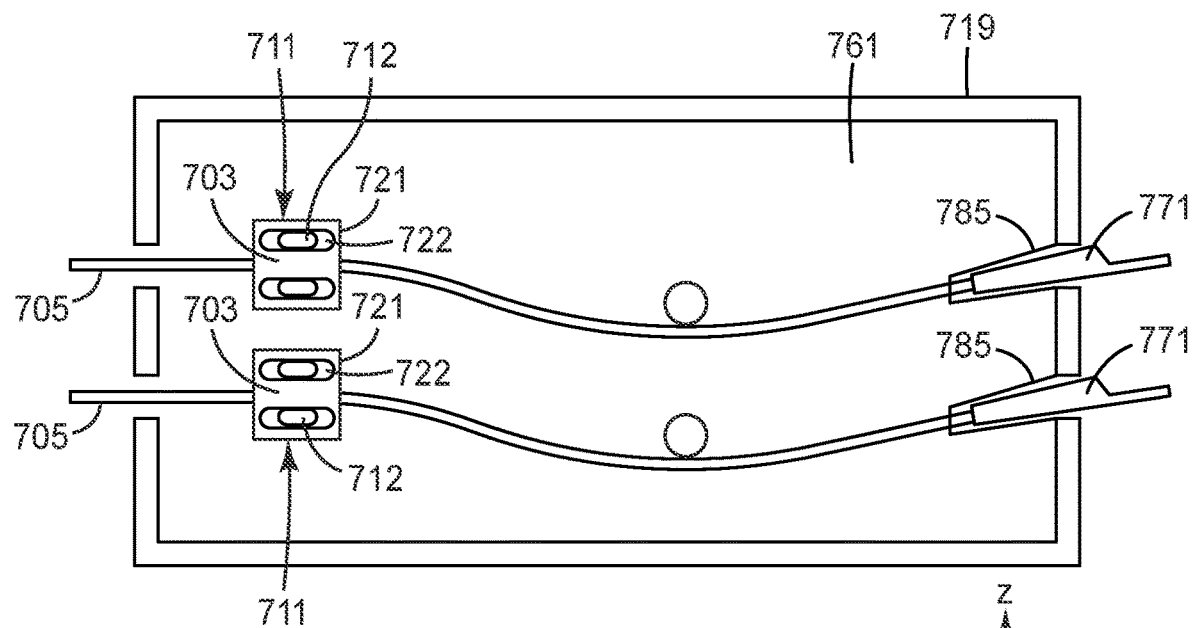
FIG. 7B illustrates the position of the optical cable subassemblies in the mated position within the inner housing of FIG. 7A.

FIG. 7A illustrates an inner housing 719 having retainer mounts 711, each retainer mount comprising a group of two pegs 712 disposed within the shared passageway 761. The cable retainers 721 (shown in FIG. 7B) of the optical cable subassemblies 705 comprise slots 722 that fit the pegs 712. FIG. 7A illustrates the retainer mounts 711 prior to insertion of the optical cable subassemblies 705. FIG. 7B illustrates the optical cable subassemblies 705 installed in the shared passageway 761 of the inner housing 719. As also illustrated in FIGS. 6A and 6B, the light coupling unit support features 785 shown in FIGS. 7A and 7B comprise indentations in the sidewalls of the passageway 761 of the inner housing 719 that are dimensioned to receive the light coupling units 771.

FIGS. 6A, 6B, 7A, and 7B depict cable retainers comprising holes or slots and retainer mounts comprising pegs, however, it will be appreciated that the reverse could also be implemented wherein the cable retainers comprise pegs and the holes or slots are disposed in the housing.

An optical cable subassembly may be formed by attaching one or more optical waveguides at the attachment area of a light coupling unit, the light coupling unit attachment area configured for receiving and permanently attaching to the optical waveguides. The optical waveguides are also attached to a cable retainer comprising a retainer attachment area for receiving and attaching to the optical waveguides. In some embodiments, attaching the optical waveguides to the cable retainer comprises inserting the waveguides, e.g., a linear array of waveguide, into a channel of the cable retainer by motion primarily along a direction parallel to the plane of the array of waveguides, and orthogonal to the direction of the waveguide axes. In some embodiments, attaching the optical waveguides to the cable retainer comprises inserting the waveguides, e.g., a linear array of waveguides, into a channel of the cable retainer by motion primarily along a direction perpendicular to the plane of the array of waveguides, and orthogonal to the direction of the waveguide axes.

A length of the optical waveguides between the light coupling unit attachment area and the retainer attachment area is configured to allow a bend to develop in the optical waveguides that provides a predetermined mating spring force at a predetermined angle and location of the light coupling unit. In some embodiments, the optical cable subassembly includes a boot that may be attached to the optical waveguides such that the cable retainer is disposed between the light coupling unit and the boot. In some embodiments, the boot may be configured to attach to the optical cable in a way that provides strain relief for the optical cable.

Figure 8A:
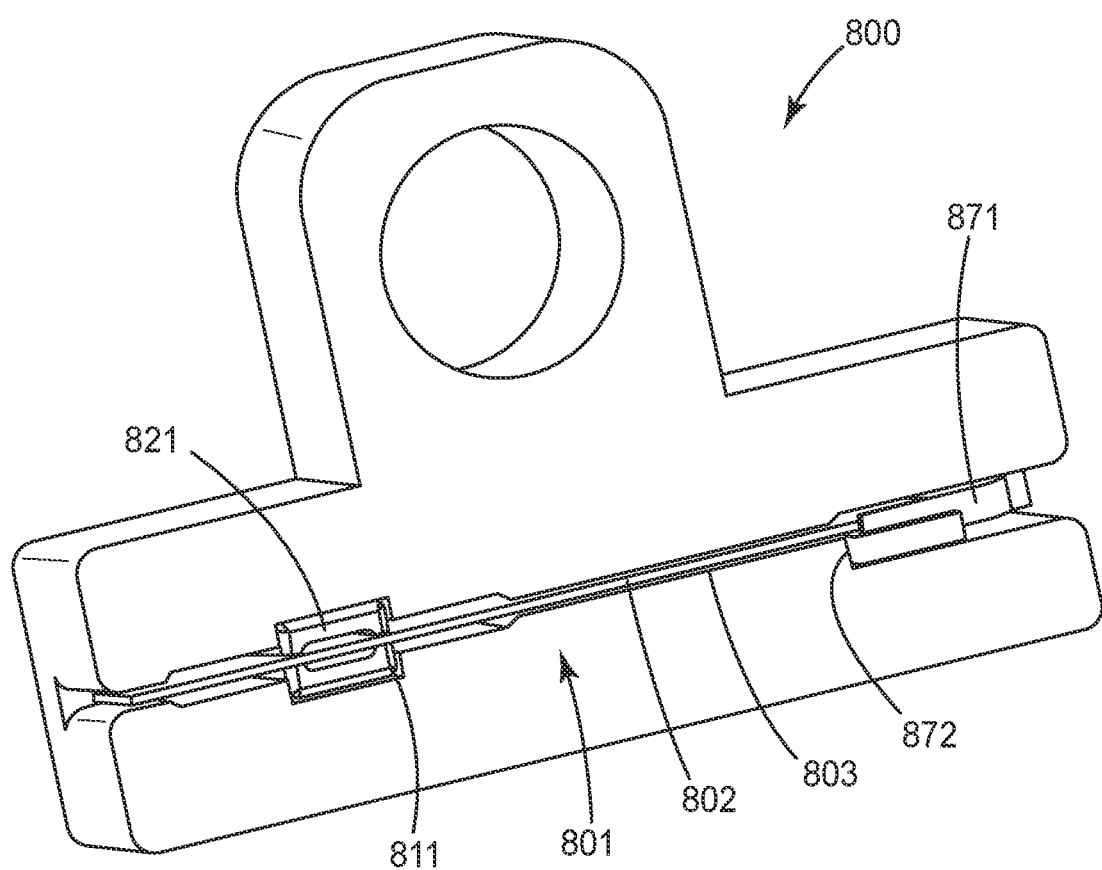
FIG. 8A shows an example of a jig made to facilitate fabrication of an optical cable subassembly in accordance with some embodiments.

FIG. 8A shows an example of a jig 800 made to facilitate fabrication of an optical cable subassembly 801 including precise positioning of the retainer 821 on the optical waveguides 803. The light coupling unit 871 is first attached to the end of the optical waveguides 803, with the fibers aligned to the optical features of the light coupling unit with v-grooves, or other appropriate means. A cable retainer 821 is inserted into a socket 811 in the jig 800, and the optical waveguides 803 with light coupling unit 871 attached is then inserted into a groove 802 in the jig 800 and the groove or other feature 822 in the cable retainer 821. The optical waveguides 803 are gently pulled axially until the light coupling unit 871 rests against a mechanical stop 872 in the jig 800. Adhesive is then applied to the interior of the cable retainer 821, attaching the waveguides 803 to the cable retainer 821.

In some embodiments, the cable retainer may be attached to the optical waveguides first. Then the optical waveguides may be stripped and cleaved to a precise length before being attached to the light coupling unit. In yet other embodiments, the optical waveguides may be first stripped and cleaved before the cable retainer is attached at a precise distance from the cleaved end. The light coupling unit may be subsequently attached.

The cable retainer may be attached to the optical waveguides by any suitable means, including adhesive bonding to the jacket of the optical waveguides and/or to the optical waveguide buffers, adhesive bonding to bare fiber in a section where the jacket and buffer have been removed, mechanical clamping or crimping of the retainer onto the optical waveguides, welding or soldering to a metallized section of the fiber, or any combination of the above techniques. A strain relief boot may be attached to the cable retainer before the cable retainer is assembled into the connector housing.

Figure 8B:
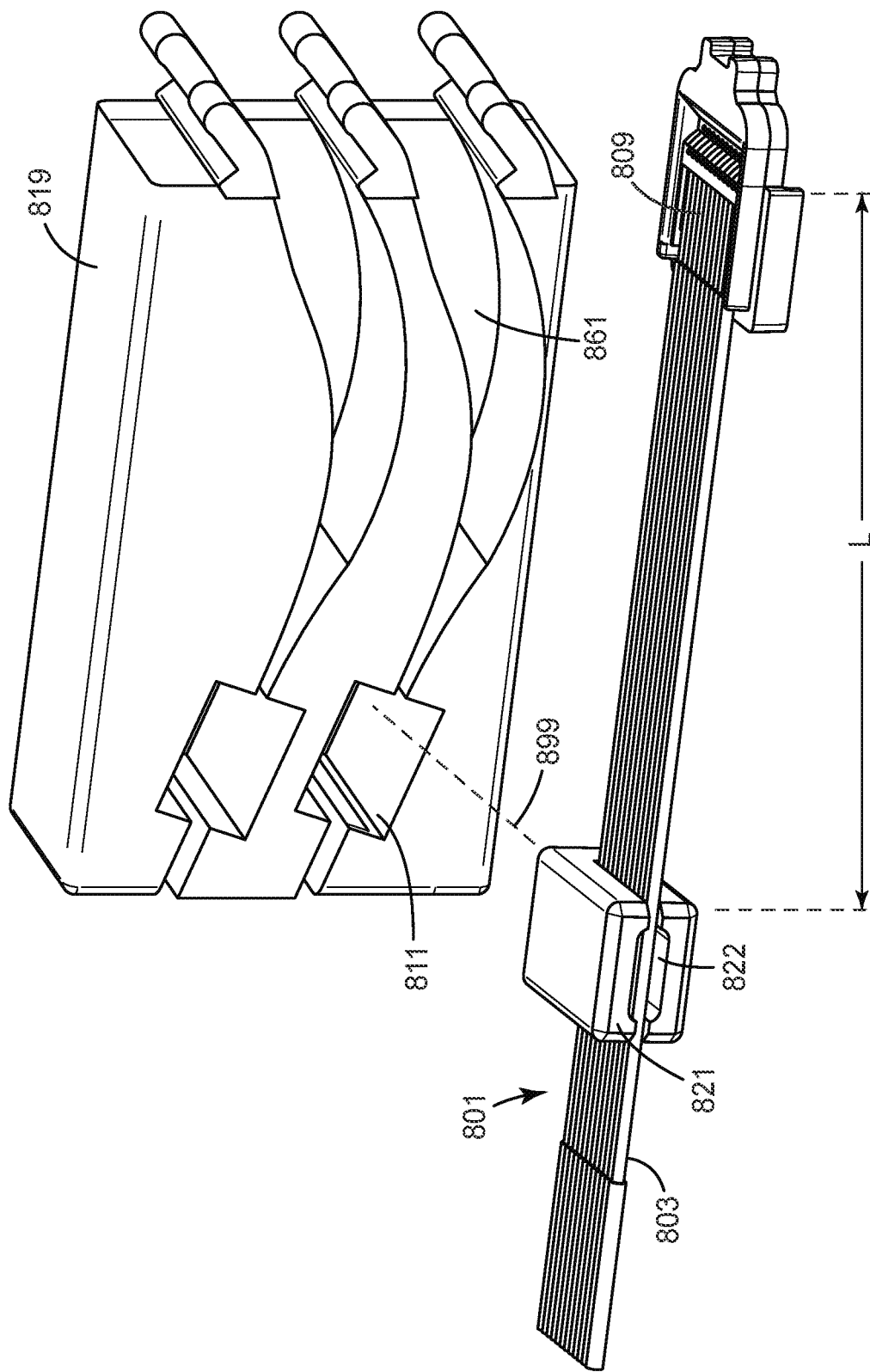
FIG. 8B illustrates a process of making an optical connector assembly in accordance with some embodiments.

FIGS. 8B, 4B and 4A illustrate a process of making an optical connector assembly in accordance with some embodiments. After the optical cable subassembly 801 is fabricated, e.g., as discussed above, the length of the optical waveguides between the light coupling unit attachment area 809 and the retainer attachment area 822 is L as shown in FIG. 8B. The optical cable subassembly 801 is installed into a connector inner housing 819 as indicated by dashed line 899. In some embodiments, the optical cable subassembly 801 is configured to be installed in and subsequently removed from the housing 819 without damage to the inner housing 819 or to the subassembly 801. The retainer 821 is coupled to a complementary retainer mount 811 in the housing 819 such that the cable retainer 821 coupled with the complementary retainer mount 811 fixes a position of the optical cable subassembly 801 within the housing 819 at least when the optical cable subassembly 801 is in the mated position. The optical waveguides 803 are inserted into a passageway 861 of the inner housing 819 wherein the passageway 861 is shaped to constrain the optical waveguides to bend within the housing 819 between the light coupling unit attachment area 809 and the retainer attachment area 822. As shown in FIGS. 4B and 4A, after the optical cable subassembly 402 is inserted into the housing 419, the straight-line distance, d, between the light coupling unit attachment area 409 and the retainer attachment area 403 is less than L due to the bend that develops in the optical waveguides 405 when the optical cable subassembly 402 is installed in the connector inner housing 419. After the optical cable subassembly 402 is installed in the connector inner housing 419, an outer housing 420 is disposed over the inner housing 419 as illustrated in FIG. 4A.

Figure 9A:
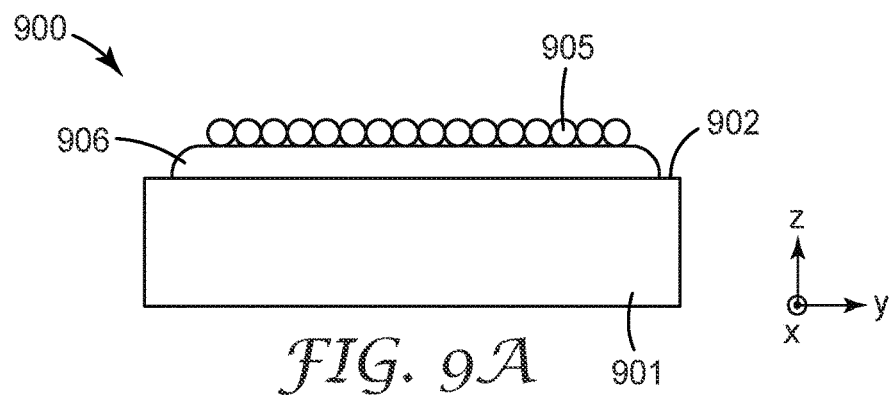
FIGS. 9A, 9B, and 9C illustrate a lateral cross sectional view, a perspective view, and a longitudinal cross sectional view, respectively, of a cable retainer in accordance with some embodiments.
Figure 9B:
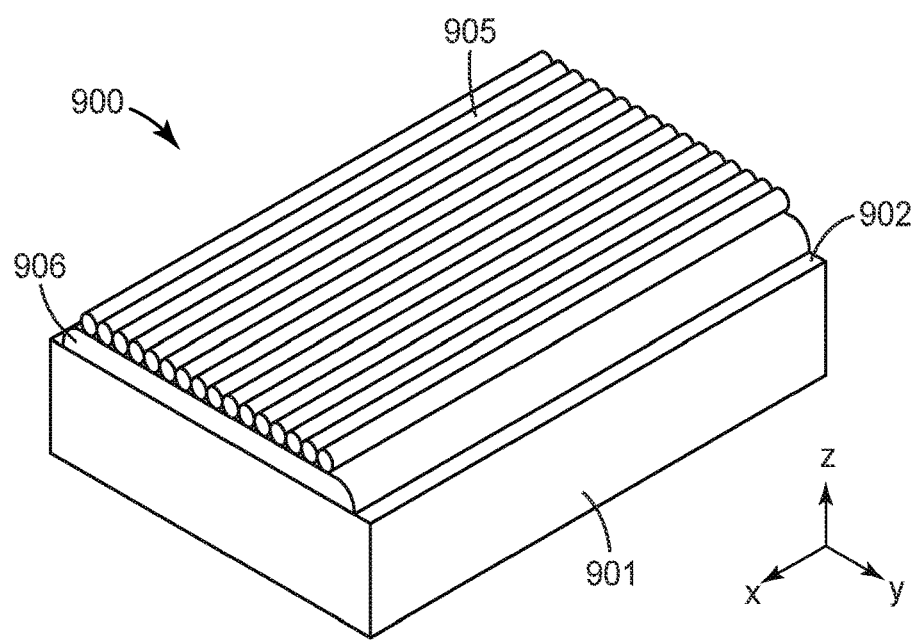
Figure 9C:
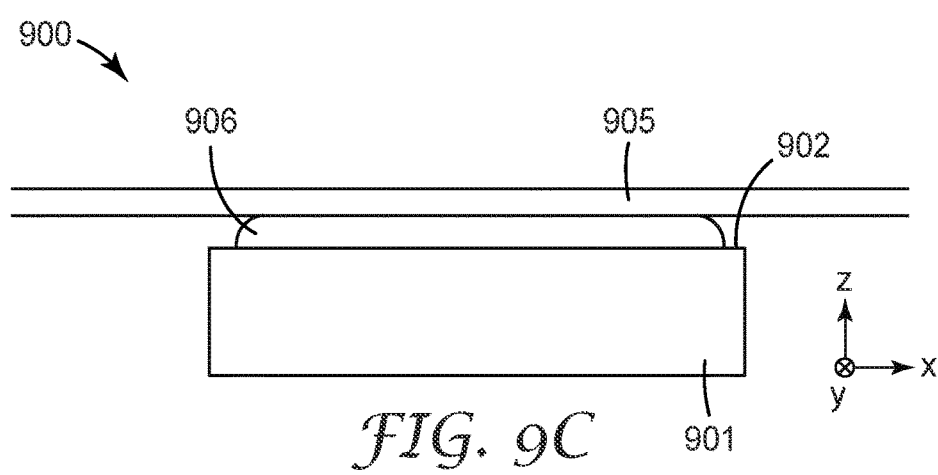

The cable retainer and the complementary retainer mount can take on a variety of shapes, a few of which are illustrated by FIGS. 9 through 25. FIGS. 9A through 9C illustrate a lateral cross sectional view, a perspective view, and a longitudinal cross sectional view, respectively, of cable retainer 900 in accordance with some embodiments. In the illustrated embodiment of FIGS. 9A through 9C, the cable retainer 900 comprises a block 901 having an attachment surface 902 upon which the optical waveguides 905 are bonded by an adhesive layer 906. As shown in FIGS. 9A through 9C, the adhesive layer 906 may be disposed between the block surface 902 and the optical waveguides 905. In this example, and other examples where an adhesive is used to attach the optical waveguides to the cable retainer, the adhesive may be applied to the jacket, the buffer coating, and/or the cladding of the optical waveguides. In some configurations, the adhesive may be applied over the optical waveguides and/or along the sides of the optical waveguides. FIGS. 9A through 9C provide an example of a unitary, single piece cable retainer.

Figure 10A:
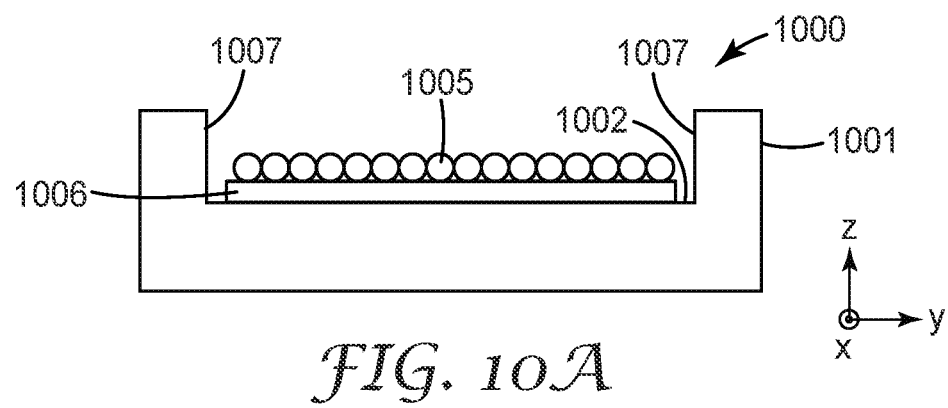
FIGS. 10A and 10B are cross sectional views that illustrate a version of a unitary, single piece cable retainer in accordance with some embodiments.
Figure 10B:
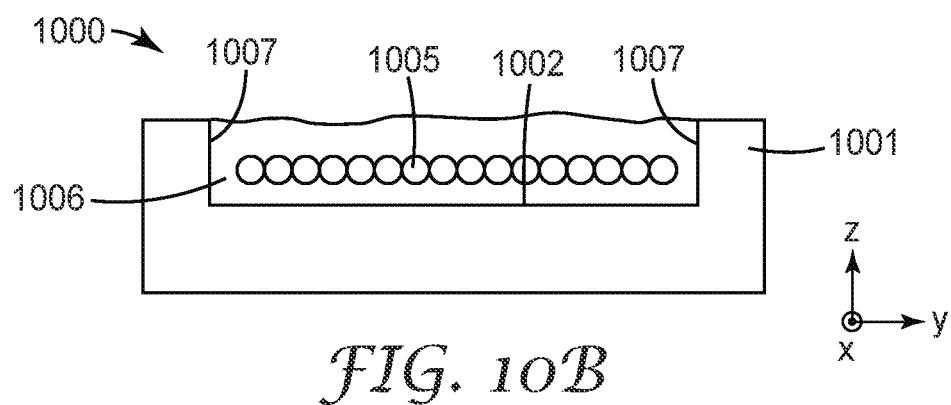

FIGS. 10A and 10B are cross sectional views that illustrate another version of a unitary, single piece cable retainer. In the illustrated embodiment, the cable retainer 1000 comprises a U-shaped piece 1001 having sidewalls 1007 and an attachment surface 1002 between the sidewalls 1007. In the embodiment of FIG. 10A, the optical waveguides 1005 are attached to the attachment surface 1002 by an adhesive layer 1006 disposed between the attachment surface 1002 and the optical waveguides 1005. In the embodiment of FIG. 10B, the adhesive 1006 is disposed under and over the optical waveguides 1005, e.g., substantially filling the interior of the U-shaped piece 1001.

FIG. 11A is a perspective view of an embodiment of a unitary, single piece cable retainer 1100 and FIG. 11B shows an optical cable subassembly 1190 that includes the cable retainer 1100. In the illustrated embodiment, the cable retainer 1100 comprises a C-shaped piece 1101 having attachment surfaces 1103a, 1103b. In some embodiments, the optical waveguides 1105 may be adhesively attached to one or both of the attachment surfaces 1103a, 1103b. The C-shaped piece 1101 can have an inner volume 1107 that is shaped to facilitate placement of adhesive between the optical waveguides 1105 and one or both of the inner attachment surfaces 1103a, 1103b.

FIG. 11B depicts an optical cable subassembly 1190 comprising a light coupling unit 1191 attached to the optical waveguides 1105 at light coupling unit attachment area 1192. The optical waveguides 1105 are attached to the cable retainer 1100 at a retainer attachment area 1103. As shown in FIG. 11B, the cable retainer 1100 may be attached to the buffer coatings 1106 of the individual optical waveguides 1105a-11051. The jacket 1194 that encloses the optical waveguides 1105 has been stripped back but is still visible in FIG. 11B. In alternative embodiments, the retainer 1100 may be attached to the jacket of the optical waveguides rather than the buffer coatings. In some embodiments, both the jacket and the buffer coatings may be stripped back and the retainer is attached to the cladding of the individual optical waveguides 1105a-11051.

Figure 11C:
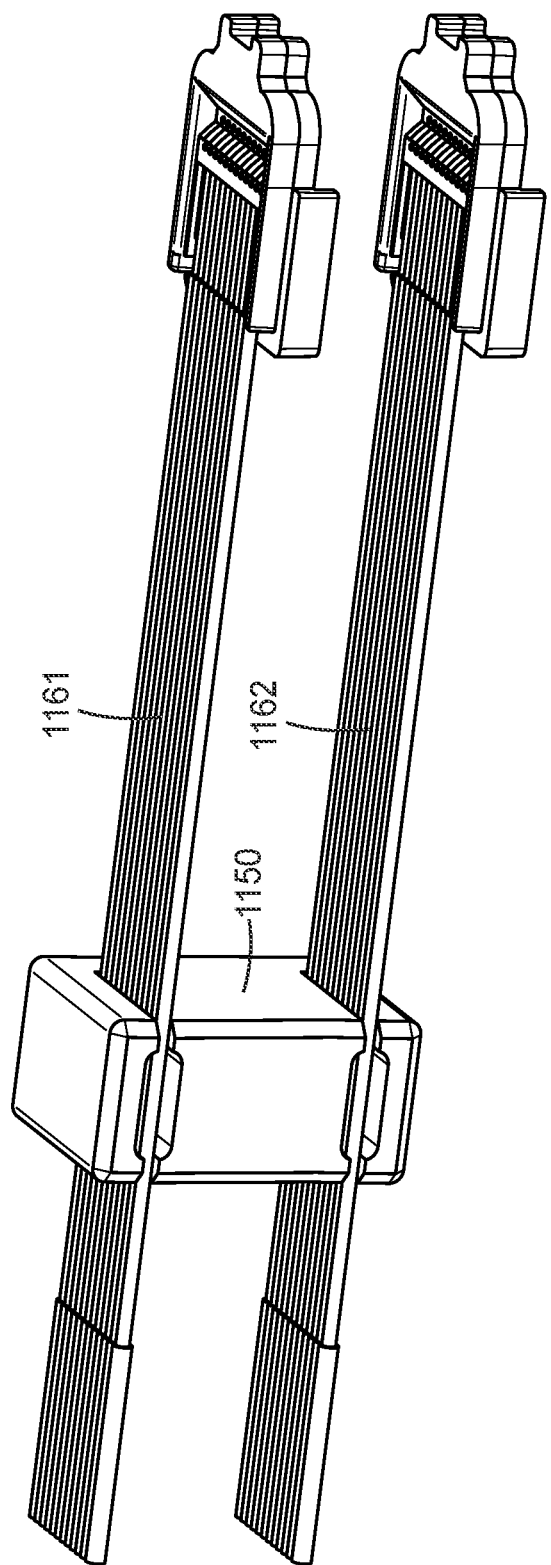
FIG. 11C illustrates a single cable retainer attached to multiple optical waveguides in accordance with some embodiments.

In some embodiments, as illustrated by FIG. 11C, a single cable retainer 1150 may be configured for attachment to two or more waveguides or waveguide arrays 1161, 1162.

If the retainer is attached to the jacket of the optical waveguides, the waveguides may move axially within the jacket and/or within their individual buffer coatings. If the jacket is stripped back and the retainer is attached to the buffer coatings, the axial movement of the optical waveguides is decreased relative to the embodiment wherein the retainer is attached to the jacket. Attaching the retainer to the cladding of the optical waveguides provides the least amount of axial movement of the waveguides and so is desirable in some circumstances.

Figure 12:
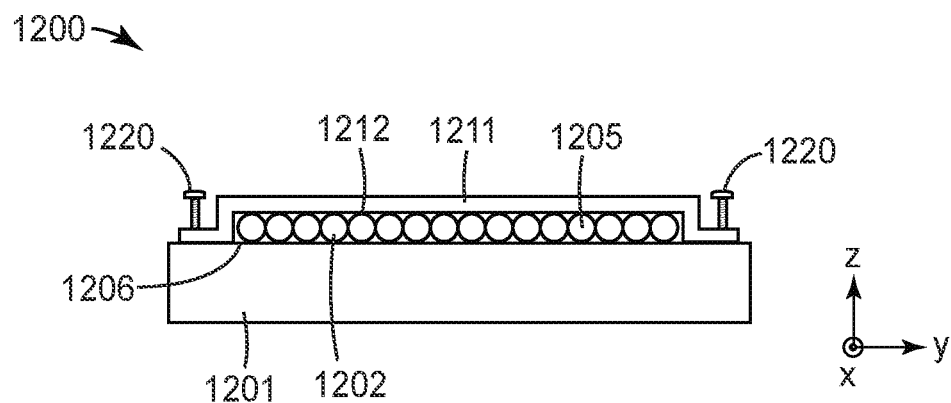
FIGS. 12, 13 and 14 illustrate cable retainers that are multi-piece structures in accordance with various embodiments.
Figure 13:
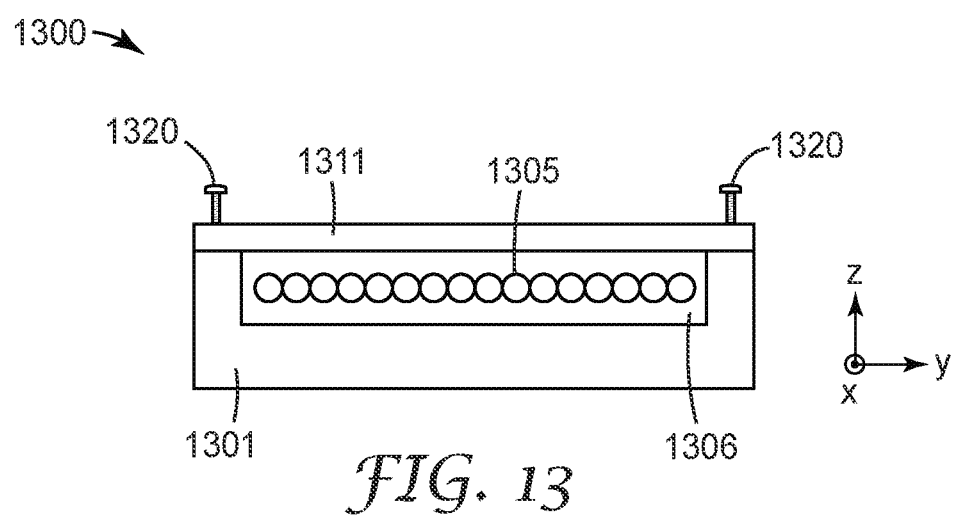
Figure 14:
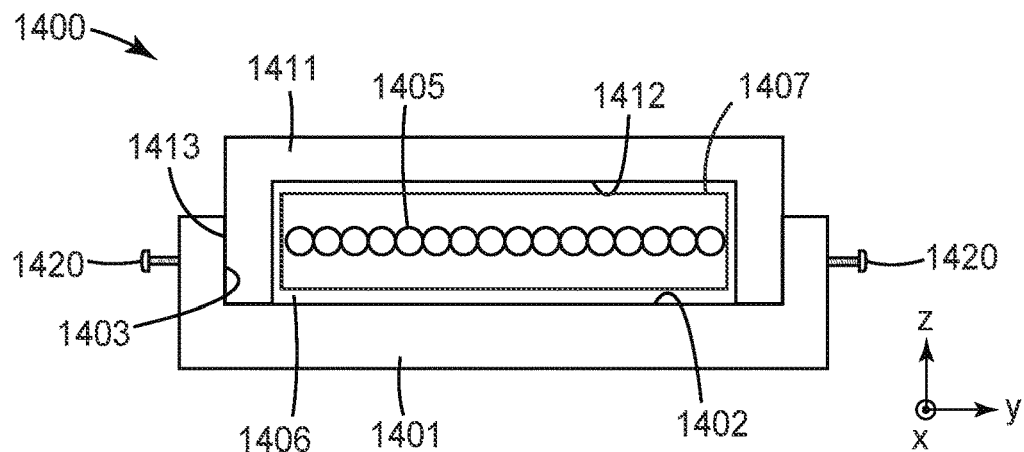

In some embodiments, the cable retainer may be a multi-piece structure with separate pieces as illustrated by FIGS. 12-14. FIG. 12 illustrates a cross section in the x-y plane of a cable retainer 1200 comprising two separate pieces including a first piece 1201 having a surface 1202 facing the optical waveguides 1205 and a second piece 1211 having a surface 1212 facing the optical waveguides 1205. The first and second pieces 1201, 1211 are configured to attach together so that the optical waveguides 1205 are disposed between the first piece 1201 and the second piece 1211. In some embodiments, the first piece 1201 and the second piece 1211 may operate together as a clamp so that the optical waveguides 1205 are held in place by friction between the optical waveguides 1205 and surfaces 1202, 1212 of the first and second pieces 1201, 1211. In some embodiments, the first piece 1201 and second piece 1210 may be attached together by a mechanical fastener 1220, e.g., one or more screws, rivets, clips, etc. In some embodiments, the first and second pieces 1202, 1212 may be adhesively attached together. Additionally or alternatively, the optical waveguides 1205 may be adhesively attached to one or both surfaces 1202, 1212 of the first and second pieces 1201, 1211. In some embodiments, the first and/or second pieces may be attached together by latch parts (not shown in FIG. 12) disposed on the first and second pieces and configured to latch the first and second pieces together.

FIG. 13 provides another example of a cable retainer 1300 comprising two separate pieces including a first U-shaped piece 1301 and a second plate-shaped piece 1311. As illustrated in the x-y cross sectional diagram of FIG. 13, the first and second pieces 1301, 1311 may be attached together by one or more of mechanical fasteners 1320, adhesive 1306, latching parts (not shown in FIG. 13), etc. In some embodiments, the optical waveguides 1305 may be adhesively attached to the U shaped piece 1301 in a manner similar to that described above in connection with FIG. 10A or 10B before the first 1301 and second 1311 pieces are attached together.

The cable retainer may comprise two separate U-shaped pieces 1401, 1411 as shown in the x-y cross sectional diagram of FIG. 14. In this embodiment, the cable retainer 1400 comprises first 1401 and second 1411 U-shaped pieces wherein the second U-shaped piece 1411 fits inside the first U-shaped piece 1401. The first and second pieces 1401, 1411 may attach together and grip and hold the optical waveguides 1405 due to a snap fit or press fit that provides friction between the inner surfaces 1403 of the sides of the first piece 1401 and the outer surfaces 1413 of the sides of the second piece 1411. Gripping of the fiber may be improved by adding a compliant (e.g. elastomeric) pad or grommet 1407 inside the U-shaped pieces which is pressed into contact with the optical waveguides. The compliant structure may allow more secure gripping without damage to the waveguides, or inducing micro-bending loss. Additionally or alternatively, the first and second pieces 1401, 1411 may be attached together by mechanical fasteners 1420, by adhesive 1406, or by latching parts (not shown in FIG. 14). In some configurations, the optical waveguides 1405 may be adhesively attached to the attachment surface 1402 of the first piece 1401 and/or the attachment surface 1412 of the second piece 1411.

Figure 15A:
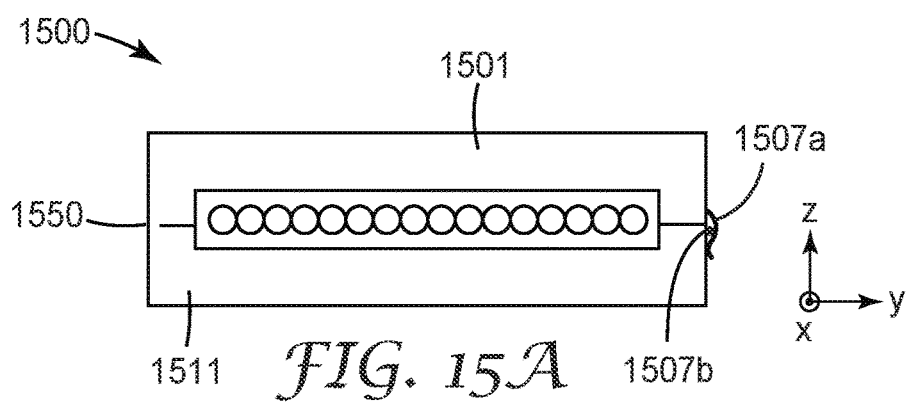
FIGS. 15A and 15B illustrate closed and open views of a cable retainer having a single piece construction with two portions that can move relative to one another in accordance with some embodiments.
Figure 15B:
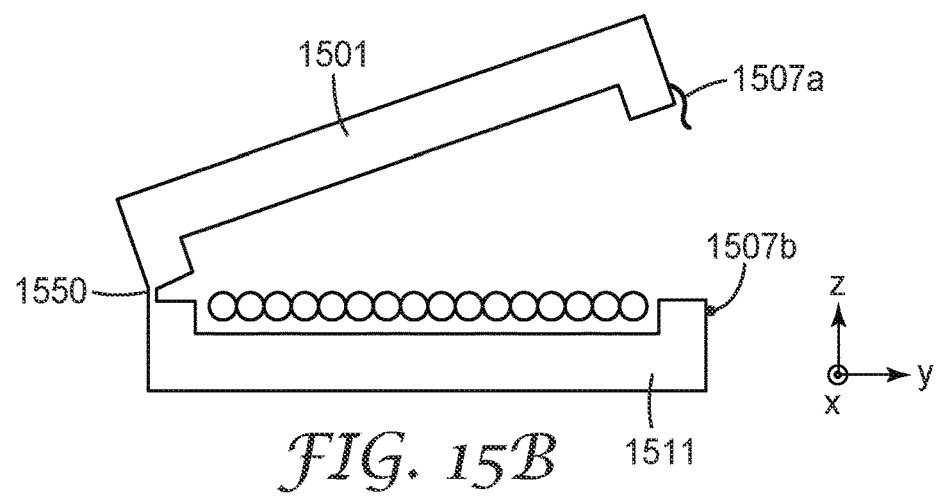

In some implementations, as illustrated in the cross sectional diagrams of FIGS. 15A and 15B, the cable retainer 1500 may have a single piece construction with two portions that can move relative to one another. FIGS. 15A and 15B show, in x-y cross section, closed and open views, respectively, of a hinged cable retainer 1500 that includes a first portion 1501 and a second portion 1511 connected by a hinge 1550 that allows the first and second portions 1501, 1511 to move relative to one another. The hinge may comprise a "living hinge" comprising a thin flexible hinge made from the same material as the retainer pieces. As above, gripping of the fiber may be improved by adding a compliant (e.g. elastomeric) pad or grommet inside the U-shaped pieces which is pressed into contact with the optical waveguides.

In some embodiments, in the closed position, the optical waveguides 1505 are clamped and held between the first and second portions 1501, 1511 by friction. In some embodiments, the cable retainer 1500 includes complementary latch parts 1507a, 1507b, e.g., on a side of the cable retainer opposite the hinge 1550 as shown in FIGS. 15A and 15B, to facilitate clamping the optical waveguides 1505 between the first and second portions 1501, 1511. Alternatively or additionally, the optical waveguides 1505 may be adhesively attached to the first and/or second portions 1501, 1511.

In some embodiments, illustrated by FIGS. 16A, 16B, 17A, 17B, 17C and 18, the retainer may comprise a collet with fingers configured to grip the optical waveguides when the collet is pushed into a slot or sleeve. To ensure a strong mechanical bond to the glass waveguides, the shapes of the collet and the collet slot or sleeve may be tapered such that when the collet is inserted into the inner housing, the collet is compressed, causing it to clamp the optical waveguides. Gripping of the fiber may be improved by adding a compliant (e.g. elastomeric) pad or grommet inside the U-shaped pieces which is pressed into contact with the optical waveguides.

Figure 16A:
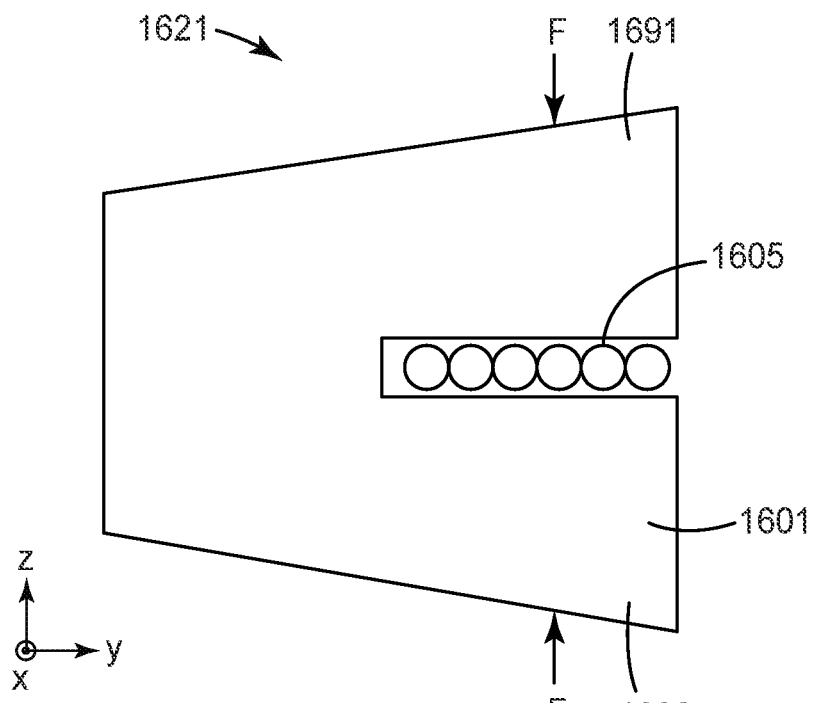
FIGS. 16A and 16B depict a retainer comprising a C-shaped collet piece in accordance with some embodiments.
Figure 16B:
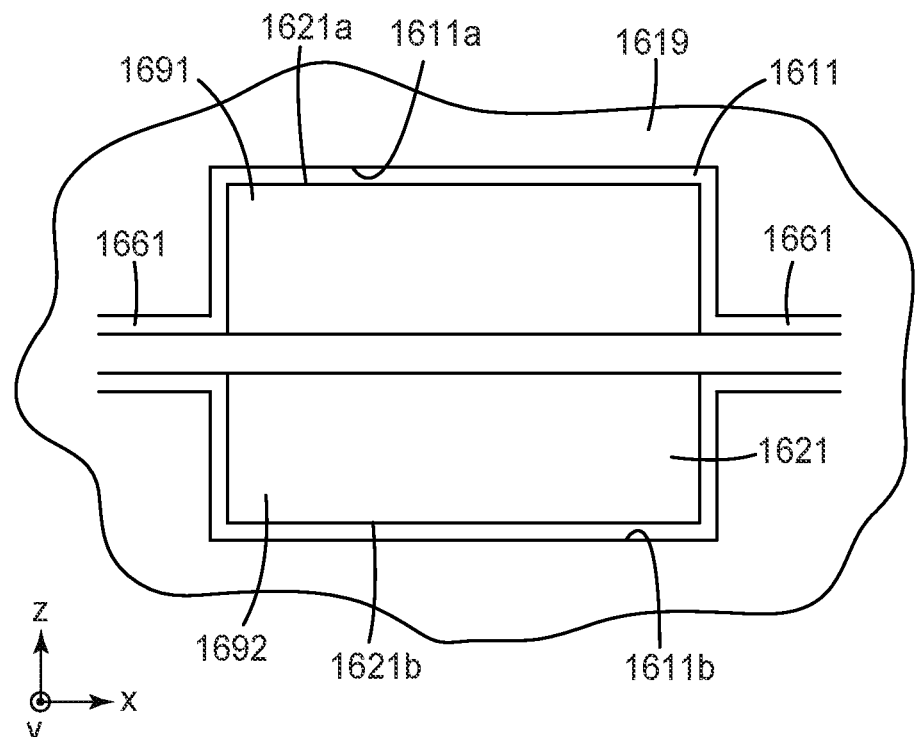

In some embodiments, illustrated by FIGS. 16A and 16B, the retainer 1621 includes a C-shaped collet piece 1601 with two or more collet fingers 1691, 1692 that can flex in the z direction under force F. The optical waveguides 1605 are positioned within the collet piece 1601 and the collet fingers 1691, 1692 extend laterally in the y-direction across waveguides 1605. The retainer mount (shown in FIG. 16B), is a tapered slot 1611 formed in the passageway 1661 of an inner housing 1619 (only a portion of the inner housing 1619 is shown in FIG. 16B) such that when the cable retainer 1621 is inserted into the retainer mount 1611 the inner surfaces 1611a, 1611b of the slot 1611 exert a force on the outer surfaces 1621a, 1621b of the fingers 1691, 1692, causing the fingers 1691, 1692 to flex toward and grip the optical waveguides 1605 between the fingers 1691, 1692. In some embodiments, the optical waveguides 1605 may be additionally affixed to the cable retainer 1621 by an adhesive, or other means.

Figure 17A:
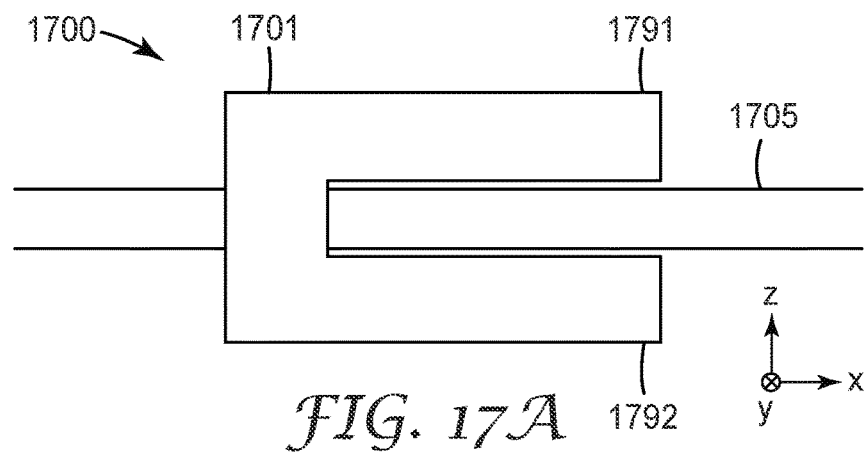
FIGS. 17A, 17B, and 17C provide an example of a collet-type cable retainer in accordance with some embodiments.
Figure 17B:
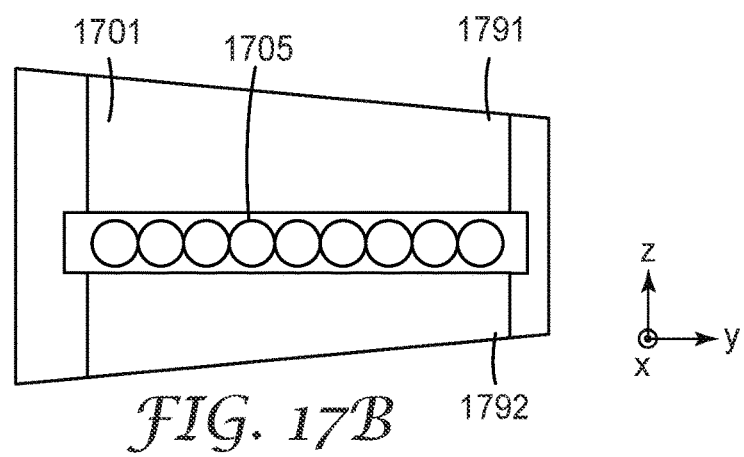
Figure 17C:
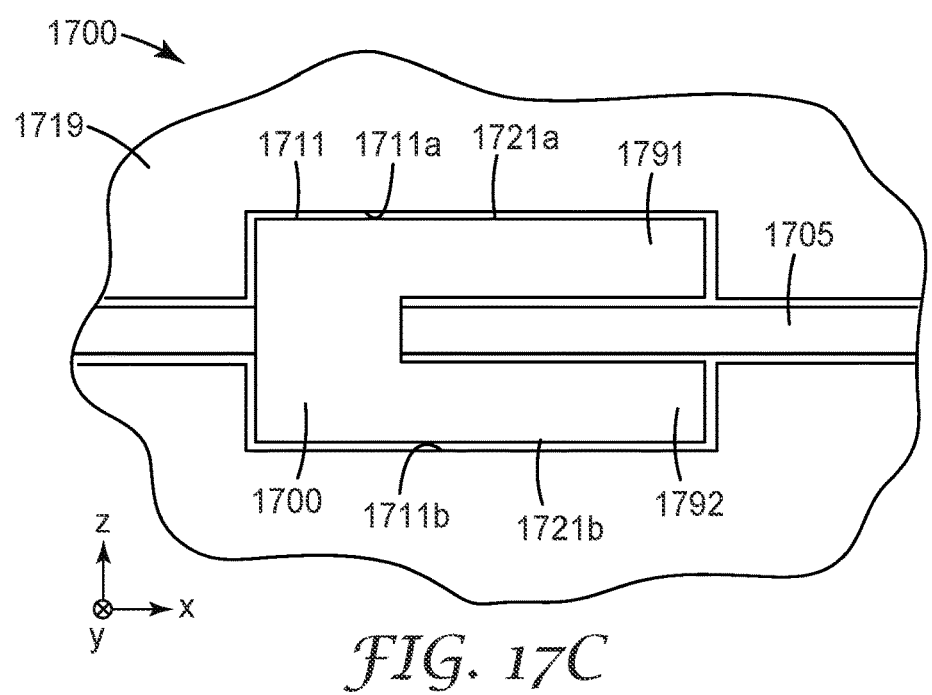

FIGS. 17A through 17C provide another example of a collet-type cable retainer 1700. FIG. 17A provides an x-z side view of the of the retainer 1700, FIG. 17B shows a y-z end view of the retainer 1700, and FIG. 17C shows an x-z side view of the retainer 1700 disposed in a slot 1711 in an inner housing 1719.

Figure 18A:
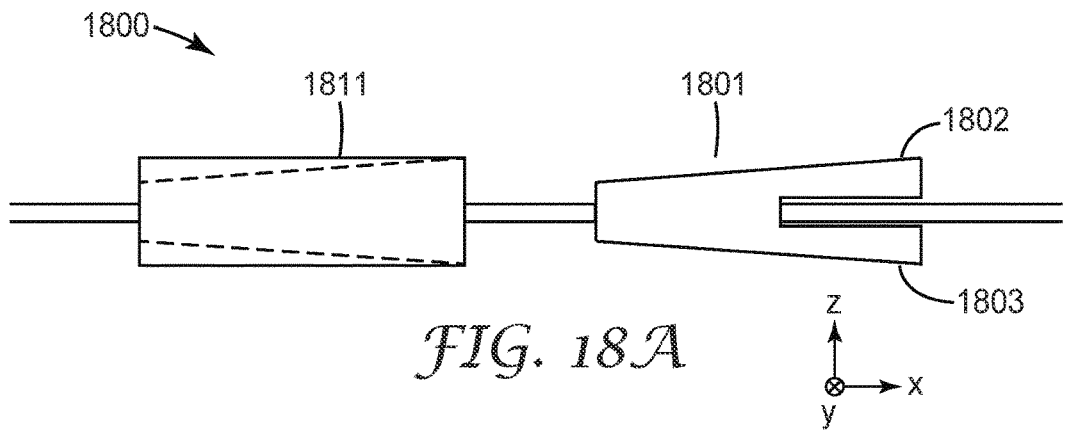
FIGS. 18A and 18B illustrate a collet-type retainer comprising a collet piece and a tapered piece in accordance with some embodiments.
Figure 18B:
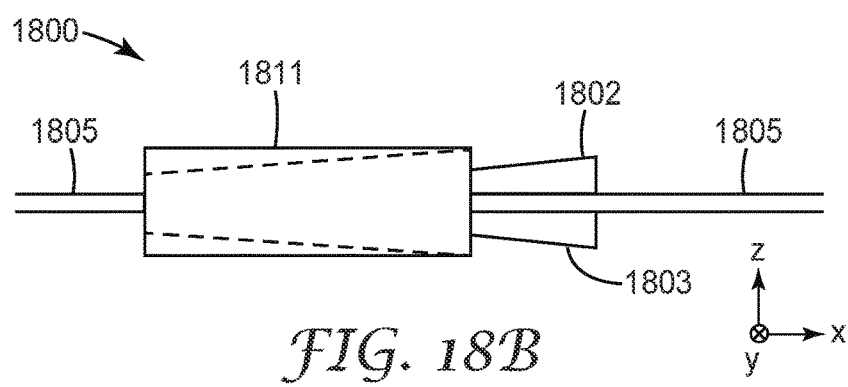

The retainer 1700 includes a collet piece 1701 with two or more fingers 1791, 1792 that can flex in the z direction under force F. The optical waveguides 1705 are positioned within the collet piece 1701 so that the fingers 1791, 1792 extend longitudinally in the x-direction along waveguides 1705. The retainer mount (shown in FIG. 17C), is a slot 1711 formed in the passageway of an inner housing 1719 (only a portion of the passageway and inner housing 1719 is shown in FIG. 17C) such that when the cable retainer 1700 is inserted into the retainer mount 1711, the inner surfaces 1711a, 1711b of the slot 1711 exert a force on the outer surfaces 1721a, 1721b of the fingers 1791, 1792 of the cable retainer 1700, causing the fingers 1791, 1792 to flex toward and grip the optical waveguides 1705 between the fingers 1791, 1792. In some embodiments, the optical waveguides 1705 may additionally affixed to the cable retainer 1700 by an adhesive In yet another example of a collet type retainer, the retainer 1800 illustrated in FIGS. 18A and 18B includes a tapered collet piece 1801 and a tapered sleeve piece 1811. The collet piece 1801 includes two or more fingers 1802, 1803 configured to flex under force F. The optical waveguides 1805 are inserted through the collet piece 1801 and through the sleeve piece 1811 which are initially separated as shown in FIG. 18A. When the collet piece 1801 is inserted into the tapered sleeve 1811, as shown in FIG. 18B, the sleeve 1811 applies a force on the fingers 1802, 1803 causing the fingers 1802, 1803 to flex toward and grip the optical waveguides 1805 between the fingers 1802, 1803. In some embodiments, the optical waveguides 1805 may alternatively or additionally affixed to the collet piece 1801 by an adhesive. In various embodiments, the inside of the sleeve may be tapered, or both the inside of the sleeve and outside of the collet may be tapered.

In some embodiments, e.g., wherein the retainer is configured to attach to the optical waveguides by a friction grip, the optical waveguides may slide longitudinally along the x-axis through the retainer until the appropriate length of the optical waveguides is reached. When the appropriate length is reached, the optical waveguides are fixedly attached to the retainer by a clamping action of the retainer. Initially allowing the optical waveguides to slide until the retainer clamps and grips the waveguides, thus fixing the position of the retainer on the waveguides, may facilitate fabrication of the optical cable subassembly and/or optical connector assembly in some circumstances.

Figure 19:
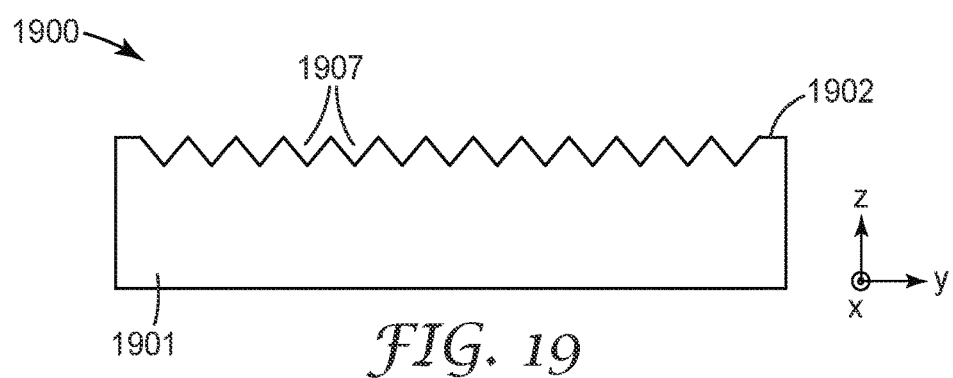
FIG. 19 shows a cable retainer that includes surface features to facilitate alignment of the individual optical waveguides in accordance with some embodiments.

In some embodiments, the cable retainer may include surface features that facilitate alignment of the individual optical waveguides. One example of a cable retainer with surface features is shown in FIG. 19. FIG. 19 depicts a cross sectional y-z view of a retainer 1900 comprising a block 1901 having an attachment surface 1902 for attaching to a optical waveguides which are not shown in FIG. 19. The attachment surface 1902 includes grooves 1907, e.g., U, V, and/or Y shaped grooves, wherein each groove 1907 is dimensioned to accommodate one optical waveguide. The grooves 1907 facilitate alignment of the individual optical waveguides in the retainer 1900. The optical waveguides 1905 may be gripped by the retainer and/or adhesively attached to the retainer 1900.

Figure 20:
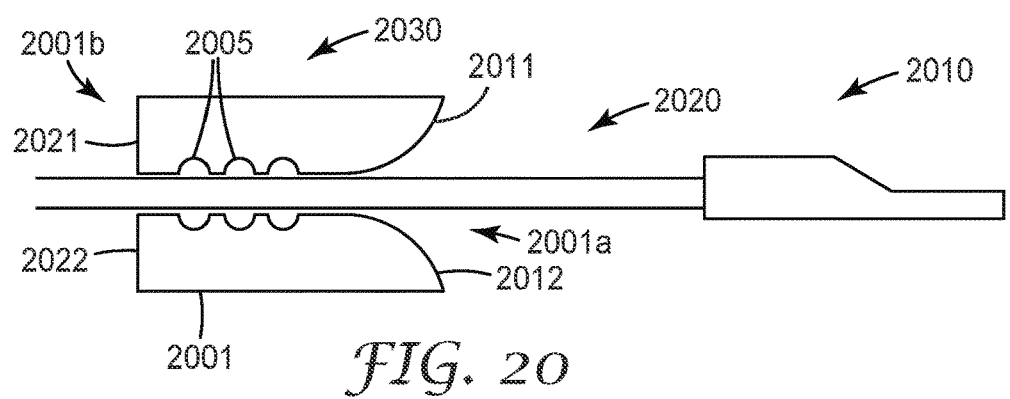
FIG. 20 depicts a cable retainer having rounded exit surfaces in accordance with some embodiments.
Figure 21:
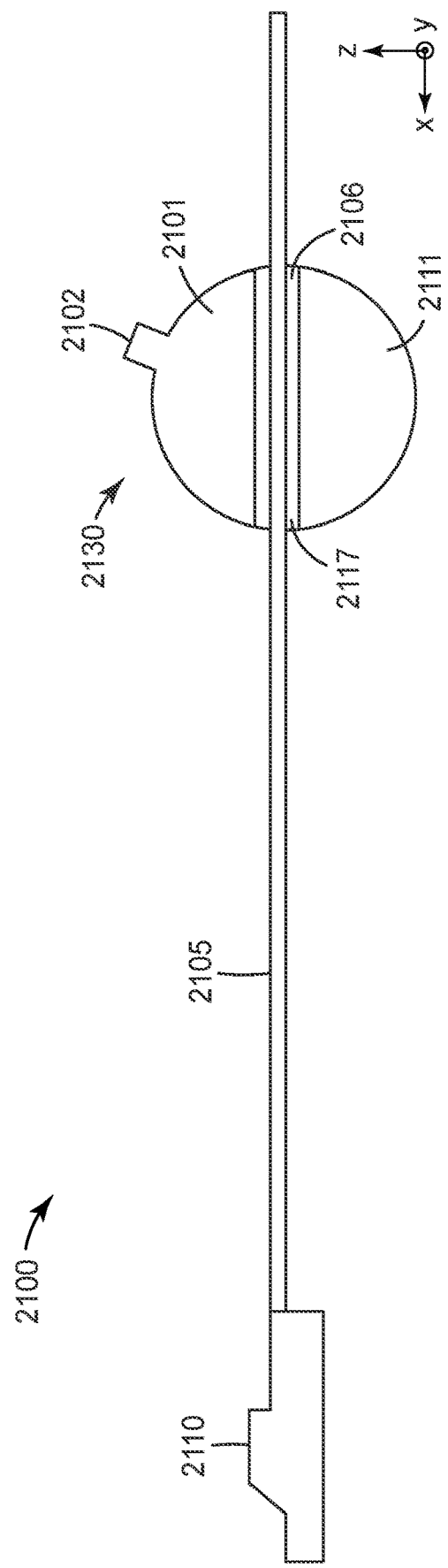
FIG. 21 depicts an optical cable subassembly comprising a keyed peg cable retainer in accordance with some embodiments.

In some embodiments, one or both exit surfaces of one or both ends of the cable retainer may have a particular shape, e.g., rounded, squared, beveled, etc. Rounded or beveled exit surfaces may be used to accommodate a bend in the optical waveguides. FIG. 20 illustrates a cross section in the x-z plane of an optical cable subassembly 2000 comprising a light coupling unit 2010, one or more optical waveguides 2020, and a cable retainer 2030. The cable retainer 2030 comprises a retainer piece 2001 having first end 2001a and a second end 2001b. At the first end 2001a, the retainer piece 2001 has first exit surface 2011 with a rounded edge and a second exit surface 1612 with a rounded edge. The first and exit surfaces 2021, 2022 at the second end 1601b of the retainer piece 1601 have square edges. In some embodiments, the cable retainer piece (or multiple pieces) may include grooves or recess features that provide a bonding space for adhesive, as illustrated by features 2005 of FIG. 20. Bonding spaces 2005 as shown in FIG. 20, for example, may be used in any of the cable retainers described herein that rely on adhesive bonding to secure the optical waveguides to the retainer. These bonding spaces can improve the strength of the adhesive bond to the cable retainer by increasing the surface area of the bonded region, and/or by creating a mechanical interlock between the adhesive and the cable retainer. The bonding spaces can also be used to control the flow of excess adhesive and prevent it from contaminating the outside surface of the cable retainer, thus interfering with its intended fit into the retainer mount. FIG. 21 depicts an optical cable subassembly 2100 comprising a light coupling unit 2110, a plurality of optical fibers 2105 and a keyed cable retainer 2130. The cable retainer 2130 includes a peg, e.g., a cylindrical peg, having a first side or portion 2101, a second side or portion 2111, wherein the first side 2101 includes a key 2102. The optical waveguides 2105 are attached between the first side 2101 and the second side 2111. The optical waveguides 2105 may be held in the cable retainer 2130 between the first and second sides 2101, 2111 by adhesive 2106 and/or friction grip. When an adhesive is used, the cable retainer 2130 includes an adhesive slot 2117 between the retainer sides or portions 2101, 2111 where the optical waveguides 2105 are adhesively attached to the cable retainer 1230. The cable retainer 2130 is configured to fit into a complementary keyed slot of the inner housing (not shown in FIG. 21).

Figure 22:
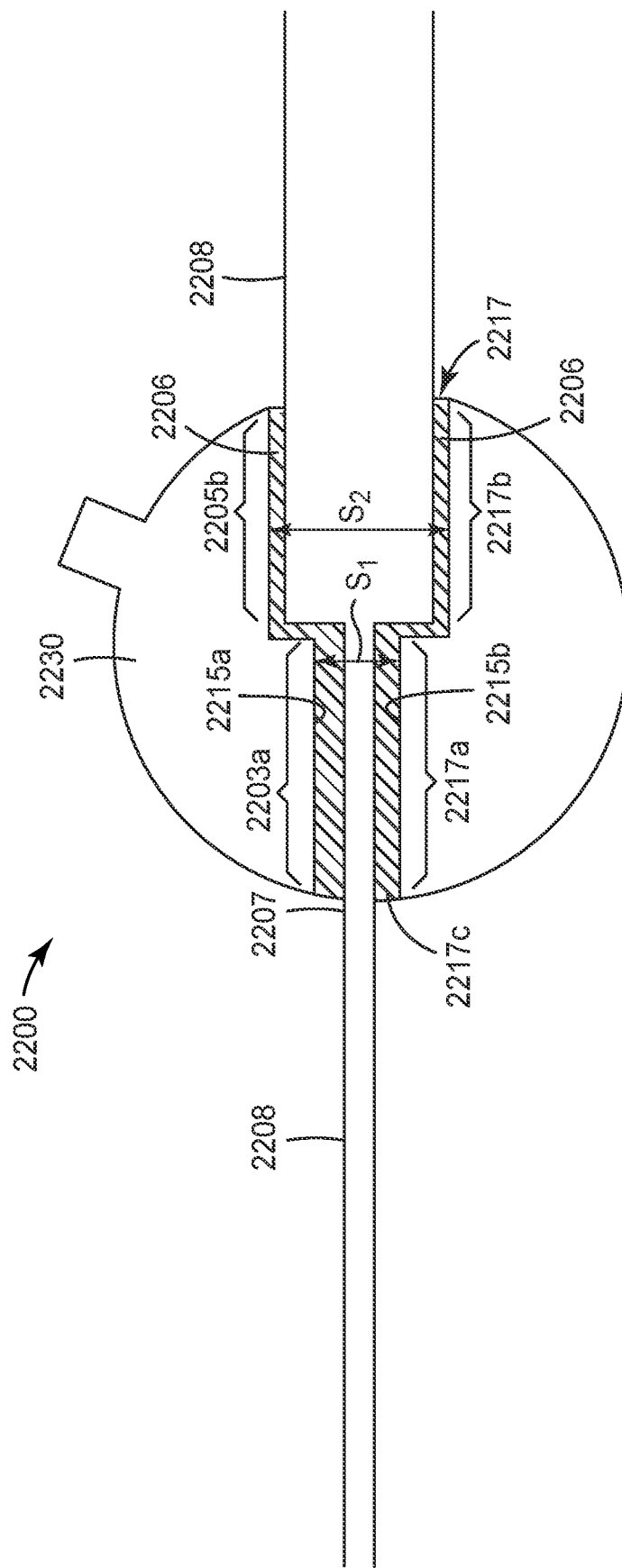

In some embodiments, the cable retainer can serve as both a strain relief and an optical waveguide retainer. In these embodiments, the cable retainer includes first and second regions, a first region of the cable retainer, which is the strain relief section, is attached to the jacket of the plurality of the optical waveguides. A second region of the cable retainer is attached to the cladding and/or buffer coating of the optical waveguides. To facilitate attaching to both the jacket and the cladding and/or buffer coatings, some embodiments, illustrated by FIGS. 22 and 23, include an adhesive attachment space wherein the width (along the z axis) of the adhesive attachment space between the pieces or portions of the cable retainer that adhesively attach to the optical waveguides may vary. An example of a variable width attachment space 2217 is shown in FIG. 22. FIG. 22 depicts a portion of an optical cable subassembly 2200 including optical waveguides 2205 and a cable retainer 2230. The optical waveguides 2205 are disposed within the variable width adhesive attachment space 2217 of the cable retainer 2230. The adhesive attachment space includes a first region 2217a, having a width Si, and a second region 2217b, having a width $s_2$, wherein $s_1$ is less than $s_2$.

The first region 2217a of the adhesive attachment space 2217 is configured to adhesively attach to first regions 2205a of the optical waveguides 2205 that have the jacket 2208 stripped away from the optical waveguides 2205. In the first regions 2205a of the optical waveguides 2205, the buffer coating 2207 of the optical waveguides 2205 is exposed and adhesive 2206 is disposed between the buffer coating 2207 and the inner surfaces 2217a, 2217b of the adhesive attachment space 2217 of the cable retainer 2230. The height $s_1$ of the adhesive attachment space 2217 at the opening 2217c of the adhesive attachment space 2217 is relatively narrow which controls the angle of the optical waveguides 2205 at the opening 2217c.

The second region 2217b (strain relief region) of the adhesive attachment space 2217 is configured to adhesively attach to second regions 2205b of the optical waveguides 2205. In the second regions 2205b of the optical waveguides 2205, the jacket 2208 of the optical waveguides 2205 has not been stripped away from the optical waveguides 2205. In the second region 2205b of the optical waveguides 2205, adhesive 2206 is disposed between the jacket 2208 of the optical waveguides 2205 and the inner surfaces 2218a, 2218b of the adhesive attachment space 2217 of the cable retainer 2230.

In other embodiments (not shown) the width of the adhesive attachment space 2217 does not substantially vary.

Another example of a cable retainer having a strain relief section facilitated by a variable height attachment space 2317 is shown in FIG. 23. FIG. 23 depicts a portion of an optical cable subassembly 2300 including optical waveguides 2305 and a cable retainer 2330. The optical waveguides 2305 are disposed within the variable width adhesive attachment space 2317 of the cable retainer 2330. The adhesive attachment space includes a first region 2317a, having a height $s_3$, and a second region 2317b (the strain relief section) having a height $s_4$, where $s_4$ is greater than $s_3$.

The first region 2317a of the adhesive attachment space 2317 is adhesively attached to regions of the optical waveguides that have the jacket removed and/or to regions of the optical waveguides that have both the jacket 2308 and the buffer coating 2307 stripped away exposing the cladding 2309 of the optical waveguides 2305. In the first region 2317a, adhesive 2306 is disposed between the buffer coating 2307 and/or cladding 2309 of the optical waveguides 2305 and the inner surfaces 2317a, 2317b of the adhesive attachment space 2317 of the cable retainer 2330.

In some implementations, bonding the cable retainer 2330 to the cladding 2309 of the optical waveguides may provide a more reliable bond and/or may reduce the amount of longitudinal movement of the individual optical waveguides within their buffer coating 2307 and/or the jacket 2308 of the optical waveguides.

The second (strain relief) region 2317b of the adhesive attachment space 2317 is configured to adhesively attach to a region of the optical waveguides 2305 where the jacket is intact. In the second region 2317b, adhesive 2306 is disposed between the jacket 2308 of the optical waveguides 2305 and the inner surfaces 2317a, 2317b of the adhesive attachment space 2317 of the cable retainer 2330.

In other embodiments (not shown) the width adhesive attachment space 2317 does not substantially vary.

In some embodiments, the optical cable subassembly includes a boot that covers a portion of the optical waveguides. The boot is often positioned outside the connector housing at or near the non-mating end of the connector housing. The cable retainer is positioned between the boot and the light coupling unit. The boot may be made of a flexible material which protects the optical waveguides from breakage or damage due to over flexing.

Figure 24A:
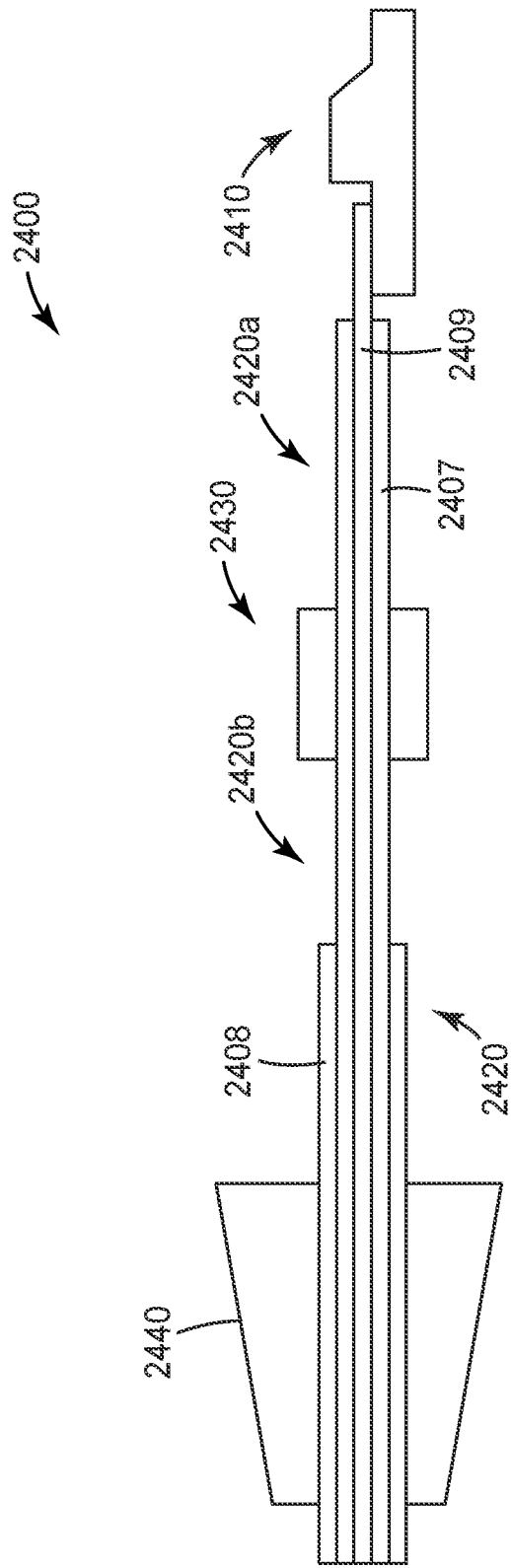
FIG. 24A is a cross sectional diagram of an optical cable subassembly that includes a boot in accordance with some embodiments.

FIG. 24A is a cross sectional diagram of an optical cable subassembly 2400 that includes a light coupling unit 2410, one or more optical waveguides 2420, a cable retainer 2430, and a boot 2440. In the illustrated embodiment, the boot 2440 and the cable retainer 2430 are spaced apart along the optical waveguides 2420. Each optical waveguide 2420 has a cladding 2409 surrounding an optical core with a buffer coating 2407 disposed over the cladding 2409. A jacket 2408 is disposed over the optical waveguides 2420. In some sections 2420a, 2420b of the optical waveguides 2420, the jacket 2408, the buffer coating 2407, or both are stripped away to facilitate attachment of the optical waveguides 2420 at the light coupling unit attachment area 2411 and/or the retainer attachment area 2431.

Figure 24B:
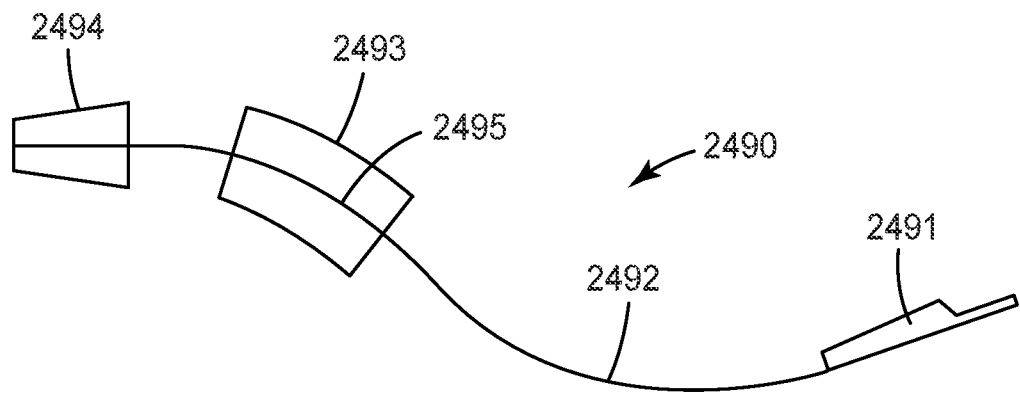
FIGS. 24B and 24C depict an optical cable subassembly including a cable retainer that is shaped so that the optical waveguides bend within the cable retainer in accordance with some embodiments.

In some embodiments, the optical cable subassembly may include a cable retainer that is shaped or angled such that the optical waveguides are bent or angled within the retainer. FIG. 24B depicts an optical cable subassembly 2490 comprising a light coupling unit 2491, a boot 2494 and a cable retainer 2493 disposed between the light coupling unit 2491 and the boot 2494. The cable retainer 2493 is shaped so that the optical waveguides 2492 include a bend 2495 within the cable retainer 2493.

Figure 24C:
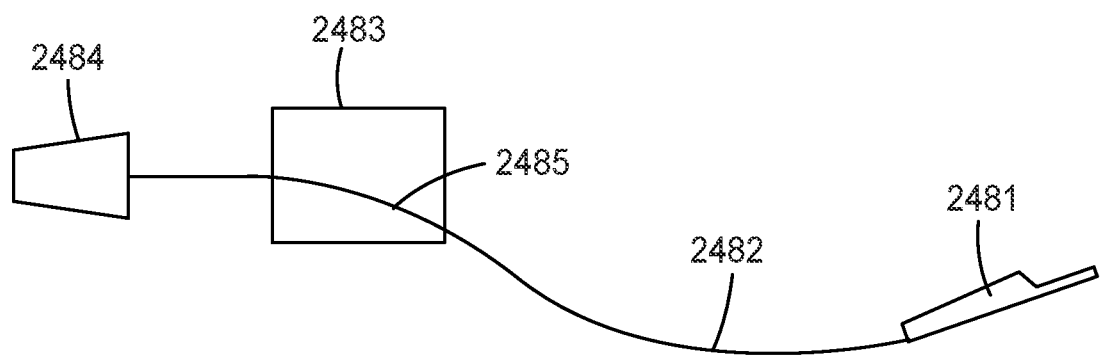

FIG. 24C depicts an optical cable subassembly comprising a light coupling unit 2481, a boot 2484 and a cable retainer 2483 disposed between the light coupling unit 2481 and the boot 2484. The cable retainer 2483 is shaped so that the portion 2485 of the optical waveguides 2482 within the cable retainer 2483 is angled.

Figure 25:
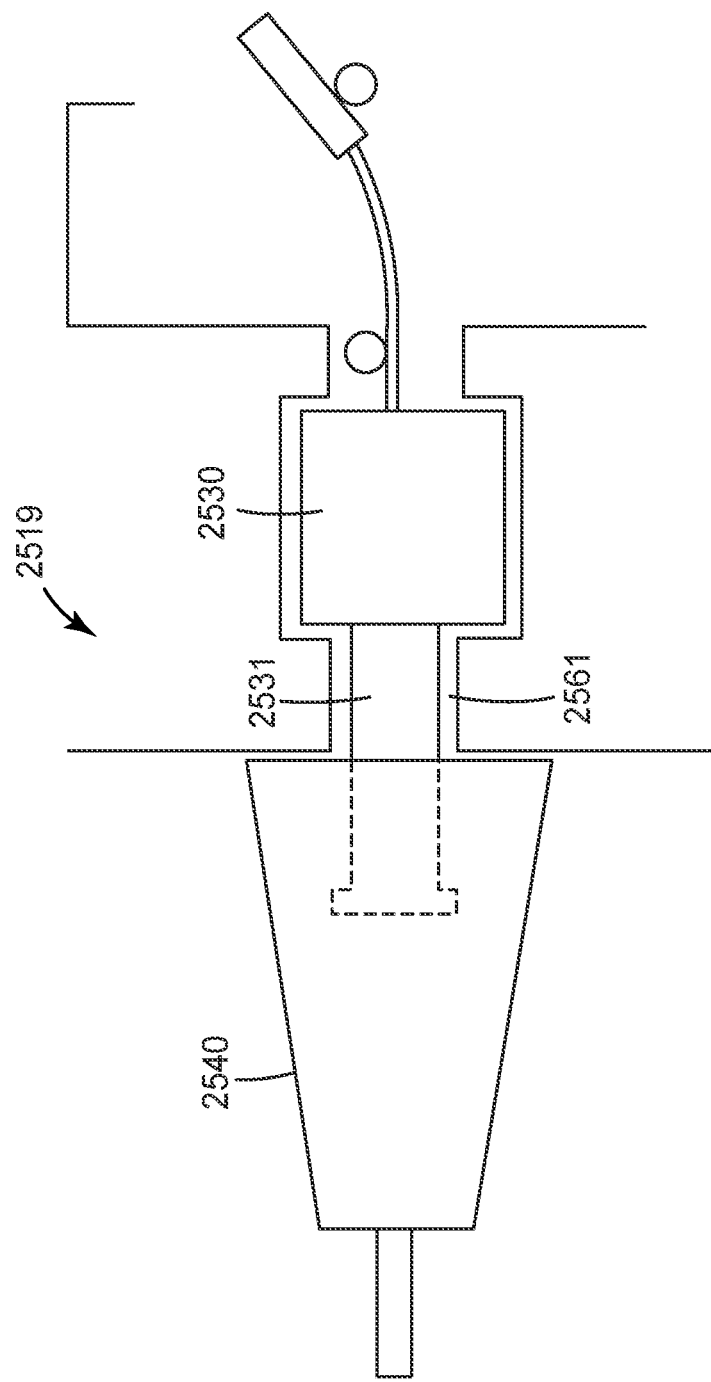
FIG. 25 illustrates an embodiment wherein the cable retainer includes an extension that extends inside the boot in accordance with some embodiments.

In some embodiments, as shown in FIG. 25, the boot and the cable retainer may be overlapping and/or may be attached together. FIG. 25 illustrates an embodiment wherein the cable retainer 2530 includes an extension 2531 that extends through the passageway 2561 of the inner housing, outside the inner connector housing 2519, and inside the boot 2540.

Figure 26:
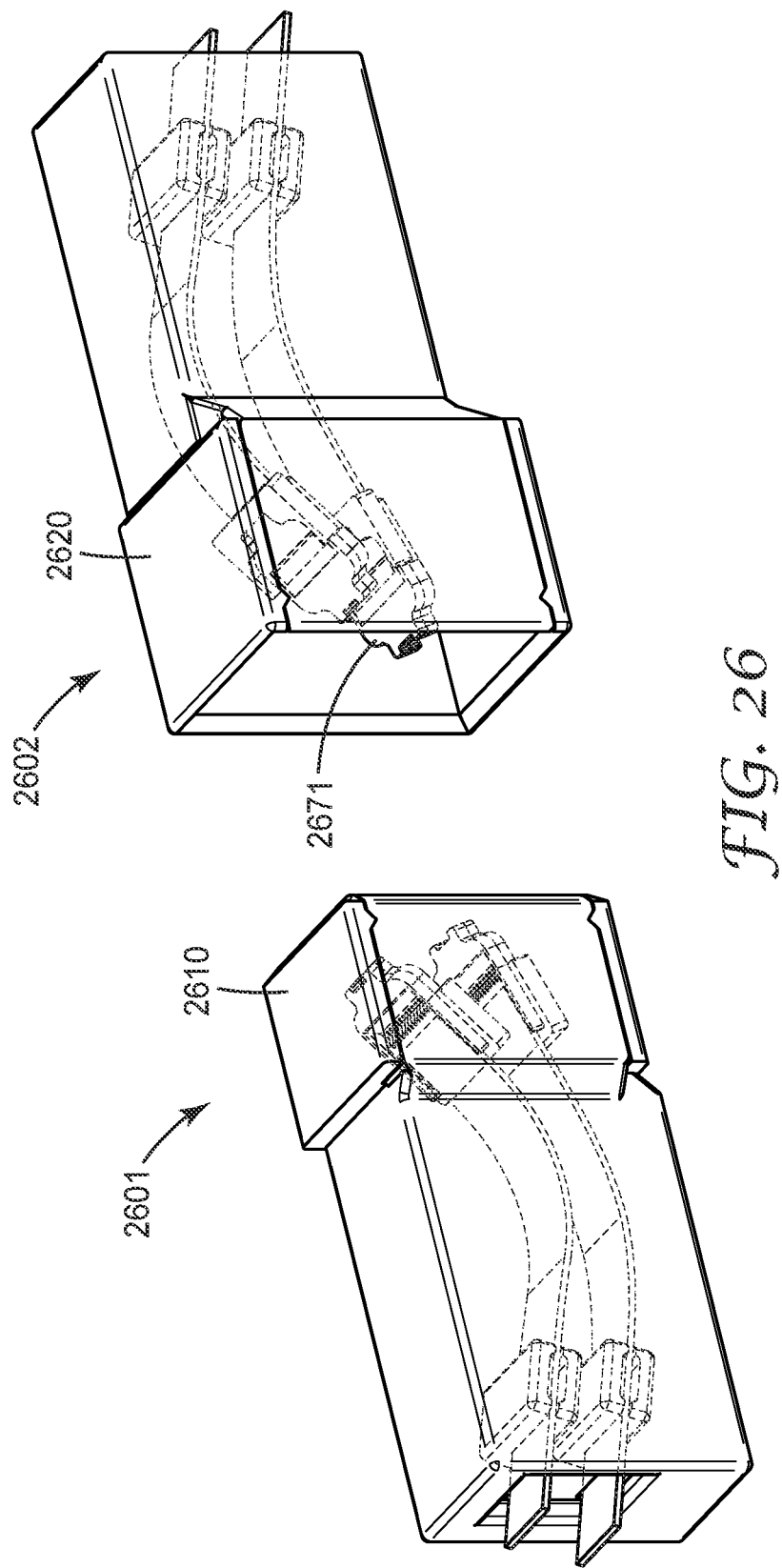
FIG. 26 shows mating optical connector assemblies having male and female covers on the outer housings that extend over the light coupling units in accordance with some embodiments.

In various embodiments, the optical connector assembly may include a protective cover to protect the light coupling units from damage or contamination. FIGS. 26 through 29 illustrate several protective cover configurations. FIG. 26 shows mating optical connector assemblies 2601, 2602 having male 2610 and female 2620 protective covers on the outer housings that extend over the light coupling units 2671. In the illustrated embodiment, the protective covers are fixed on the connectors, and do not move during mating, e.g., the female cover does not move relative to the female connector.

Figure 27:
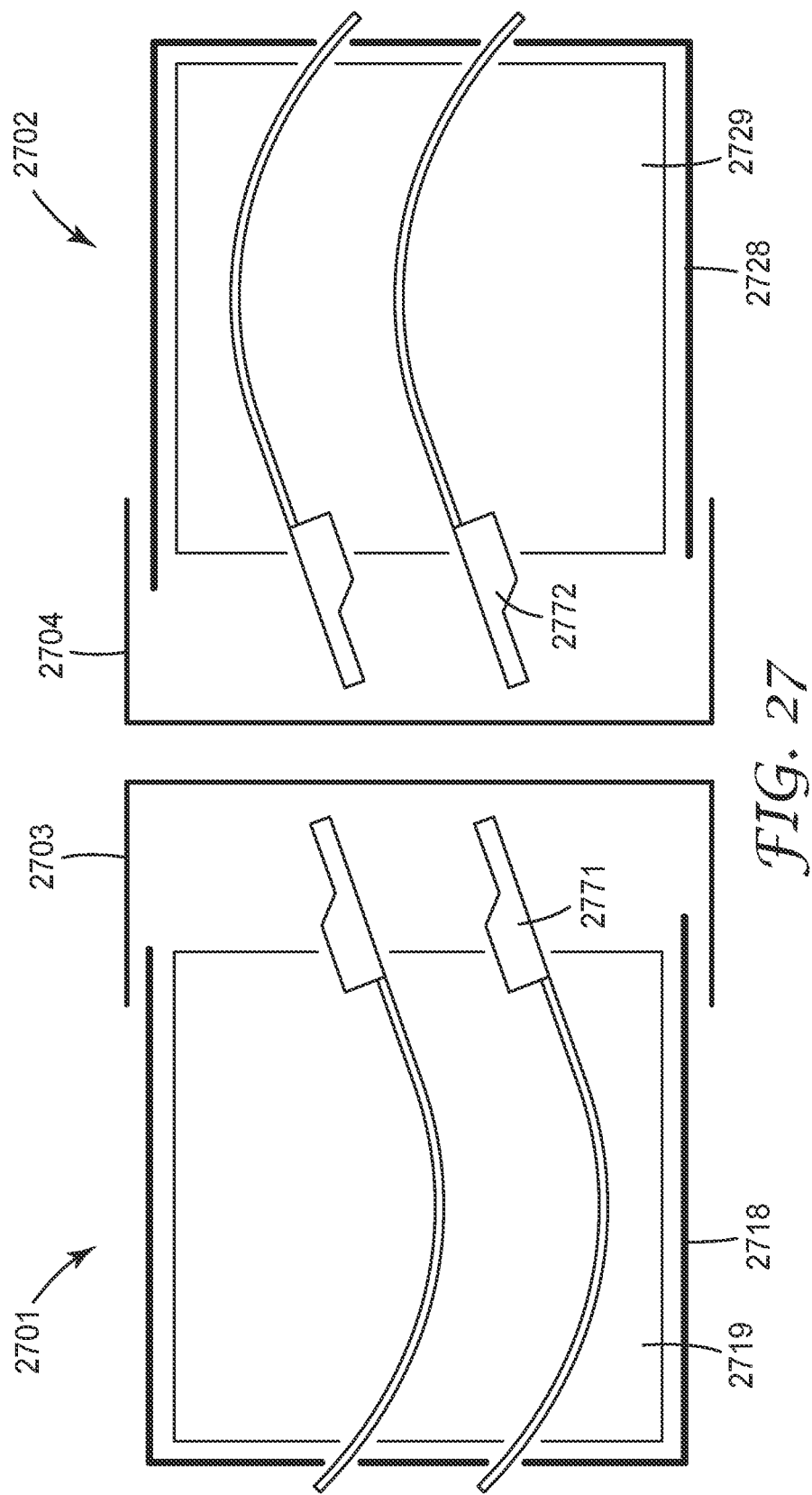
FIG. 27 provides a side view of mating hermaphroditic connector assemblies which includes separate, removable covers in accordance with some embodiments.

FIG. 27 provides a side view of mating hermaphroditic connector assemblies 2701, 2702 having inner 2719, 2729 and outer housings 2718, 2728. The light coupling units 2771, 2772 are shown disposed within the inner housings 2719, 2729. Each connector assembly 2701, 2702 includes a separate, removable protective cover 2703, 2704 that is disposed over the mating end of the outer housing 2718, 2728. The protective covers 2603, 2704 are configured to be manually removed before the connector assemblies 2701, 2702 are mated.

Figure 28:
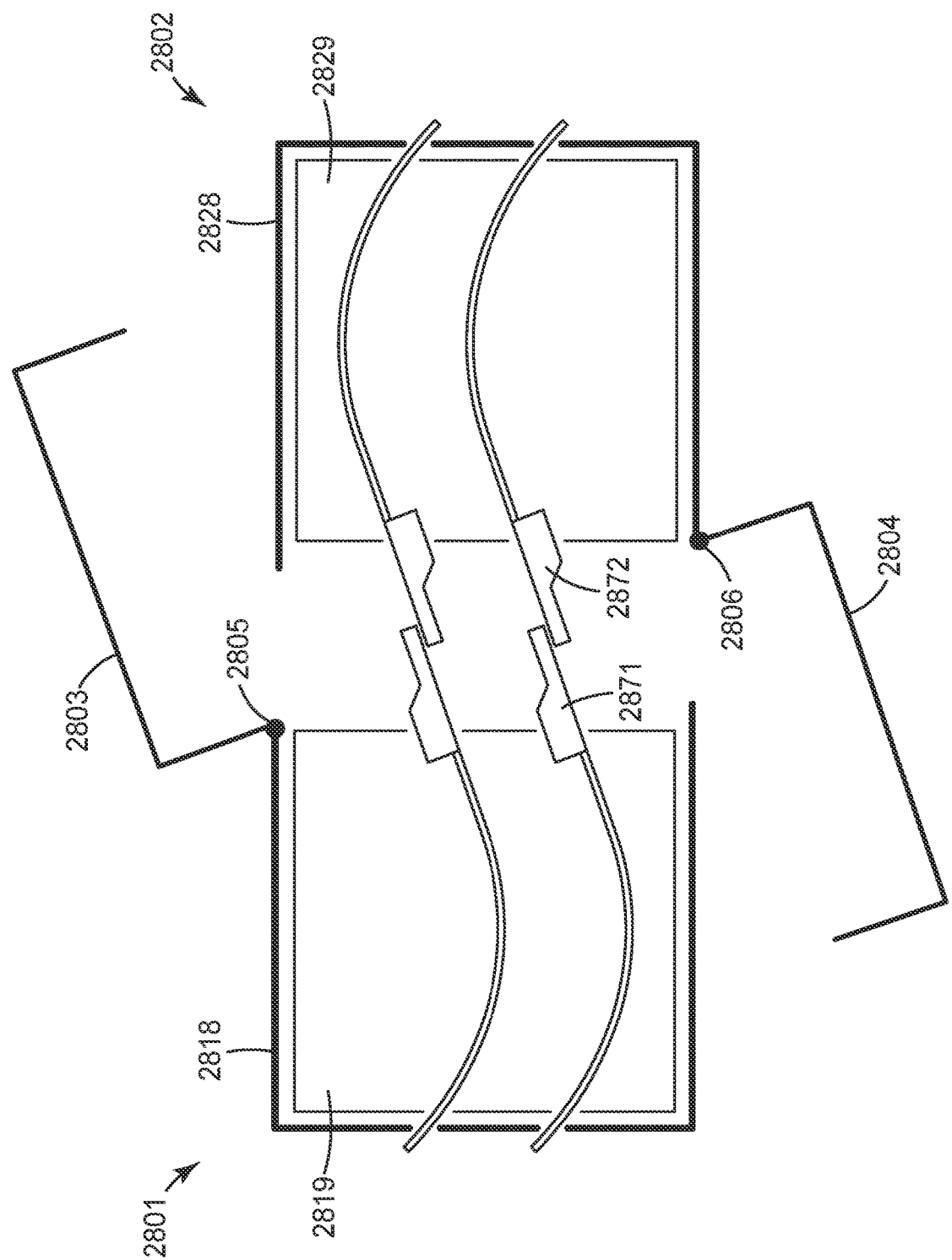
FIG. 28 provides a side view of mating hermaphroditic connector assemblies having hinged covers in accordance with some embodiments.

FIG. 28 provides a side view of mating hermaphroditic connector assemblies 2801, 2802 having inner 2819, 2829 and outer housings 2818, 2828. The light coupling units 2871, 2872 are shown disposed within the inner housings 2819, 2829. Each connector assembly 2801, 2802 includes a protective cover 2803, 2804 coupled to the outer housing 2718, 2728 by a hinge 2705, 2706. The protective covers 2803, 2805 are moved via the hinges 2805, 2806 to expose the light coupling units 2871, 2872 before the connector assemblies 2801, 2802 are mated.

Figure 29B:
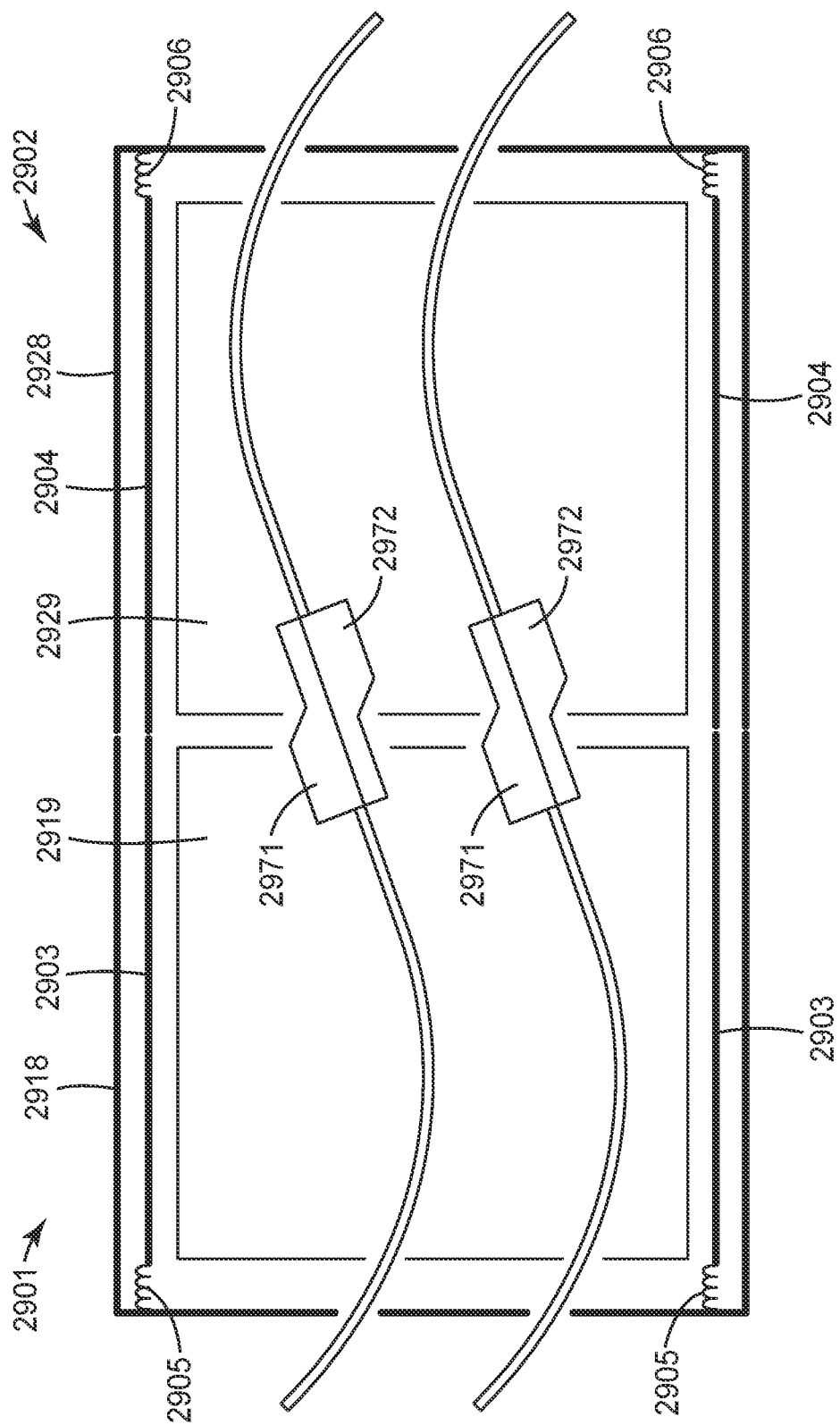

FIGS. 29A and 29B depict side views of hermaphroditic connector assemblies 2901, 2902 having spring actuated retractable protective covers. FIG. 29A shows the position of the protective cover 2903 of connector assembly 2901 prior to mating. FIG. 29B shows the position of protective covers 2903, 2904 after mating. The hermaphroditic connector assemblies 2901, 2902 have inner 2919, 2929 and outer housings 2918, 2928. The light coupling units 2971, 2972 are shown disposed within the inner housings 2919, 2929. Each connector assembly 2901, 2902 includes a retractable protective cover 2903, 2904 actuated by a spring 2905, 2906. The protective covers 2903, 2905 are pushed back, compressing the springs 2905, 2906 as the connector assemblies 2901, 2902 are mated.

Expanded-beam optical interconnect devices, such as single mode light coupling units, are sensitive to angular errors on the order of 0.1 degrees. For example, the planar interface between light coupling units of the present disclosure can be about 3 mm long. If a single 50 µm diameter dust particle is trapped in the interface between two mated light coupling units, the dust particle would generate an angular error of 1 degree or larger, thereby decreasing optical transmission efficiency. Embodiments are directed to a light transmitting surface, such as a mating surface of a light coupling unit, that incorporates a series of grooves, posts or other features or patterns configured to capture particulate contaminates, such as dust, when the mating surface contacts a corresponding mating surface of a mating light coupling unit. In order to make mating between light transmitting surfaces less sensitive to dust, a series of small lands with grooves between them (or posts with spacing therebetween) can be added to the planar sections of the light transmitting surface so that there is a place for the dust or other particulate contaminate to fall into. Although the following discussion is directed to a light coupling unit or units, it is understood that any light transmitting surface or surfaces are contemplated.

Turning now to FIGS. 30-34, there are illustrated different views of an LCU 3000 which incorporates a feature for capturing particulate contaminants in accordance with various embodiments. The LCU 3000 illustrated in FIGS. 30 and 32 includes a first major surface 3001 on which an LCU attachment area 3002 is provided. The LCU 3000 further includes sidewalls 3022 and rear wall 3024. The LCU attachment area 3002 is shown positioned between the sidewalls 3022 and includes a plurality of substantially parallel first grooves 3010 oriented along a first direction. A light redirecting member 3004 is provided at the end of each of the first grooves 3010. The first grooves 3010 are configured to receive a optical waveguides (not shown). The first major surface 3001 also includes a mating tongue 3012 that projects outwardly from the LCU attachment area 3002. The mating tongue 3012 includes a first surface 3013 and an opposing second surface 3015. Adjacent the LCU attachment area 3002 is the rear wall 3024 which includes a coupling member 3014. The coupling member 3014 is configured to receive a mating tongue 3012 of a mating light coupling unit.

Figure 30:
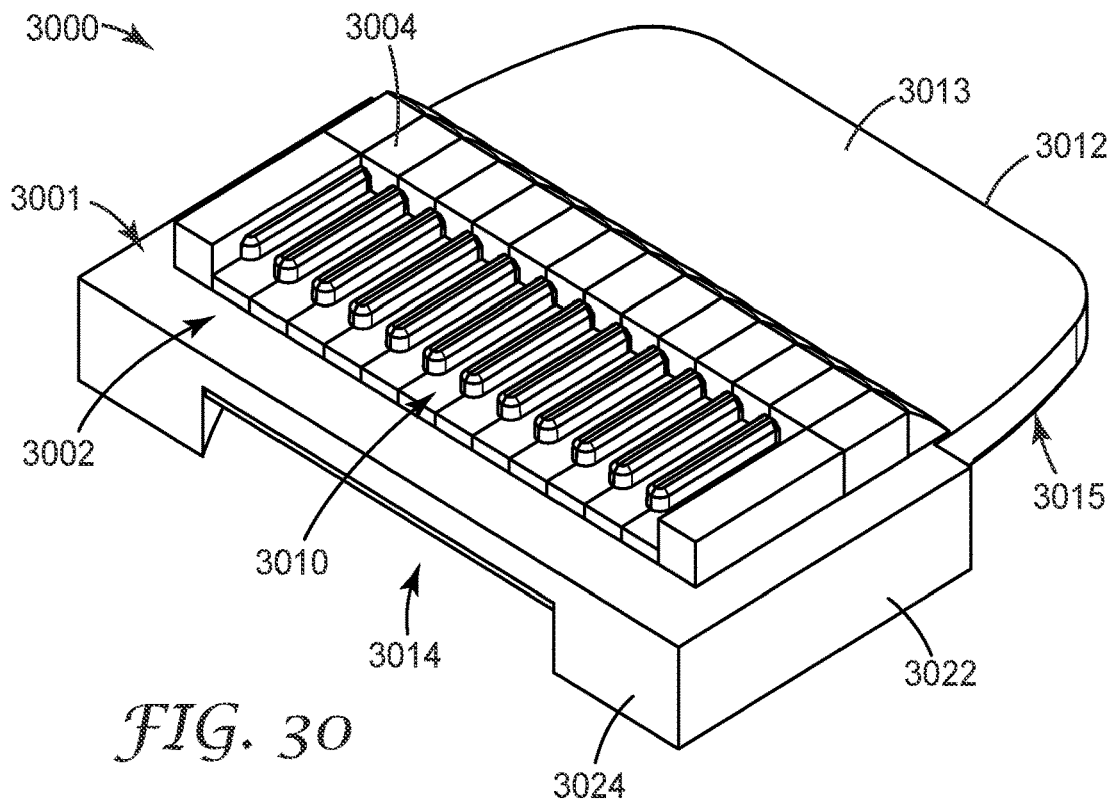
FIGS. 30 and 32 illustrate various features provided on a first major surface of an LCU in accordance with various embodiments.
Figure 31:
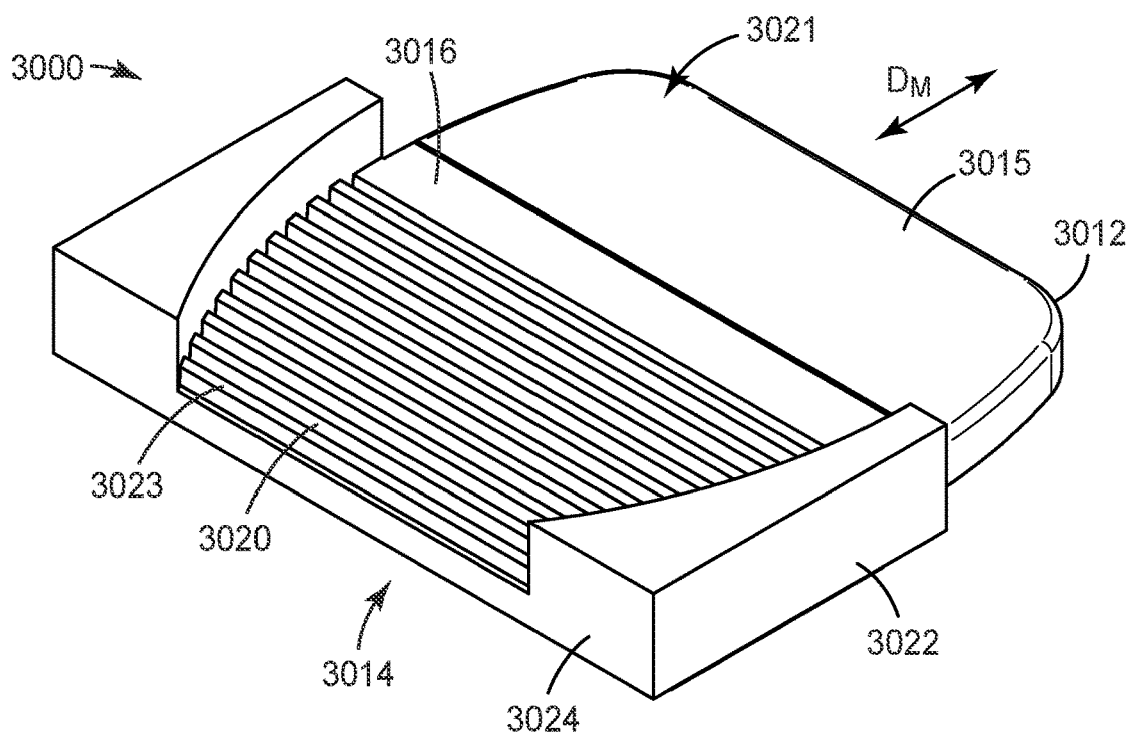
FIGS. 31 and 33 illustrate various features provided on a second major surface of the LCU shown in FIGS. 30 and 32.
Figure 32:
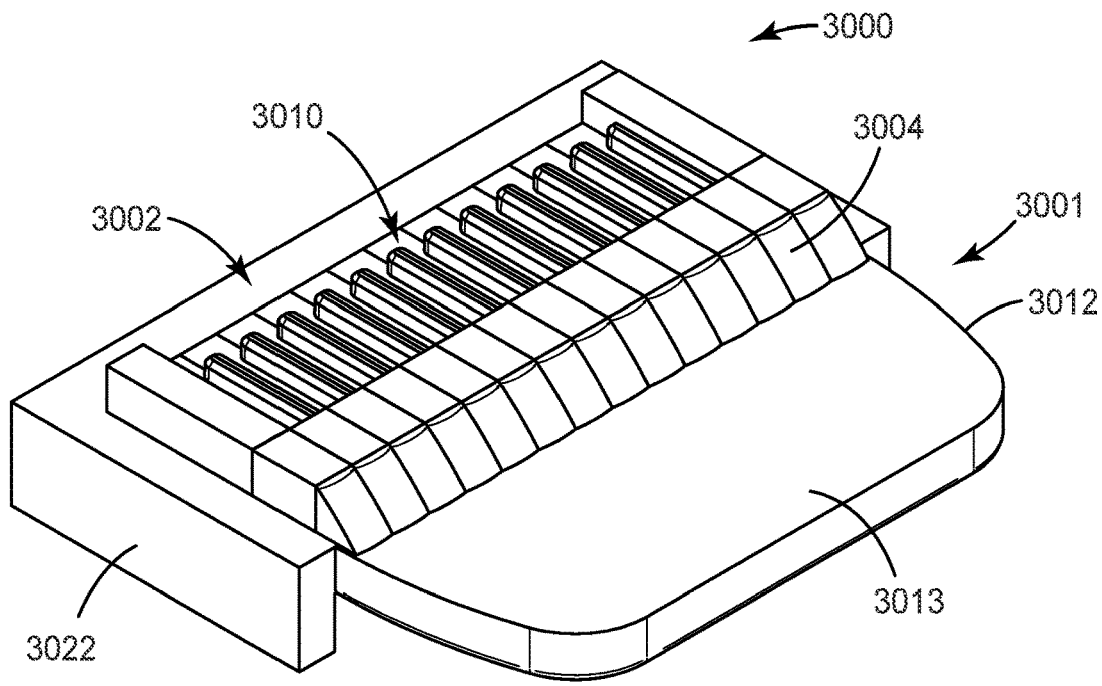
Figure 33:
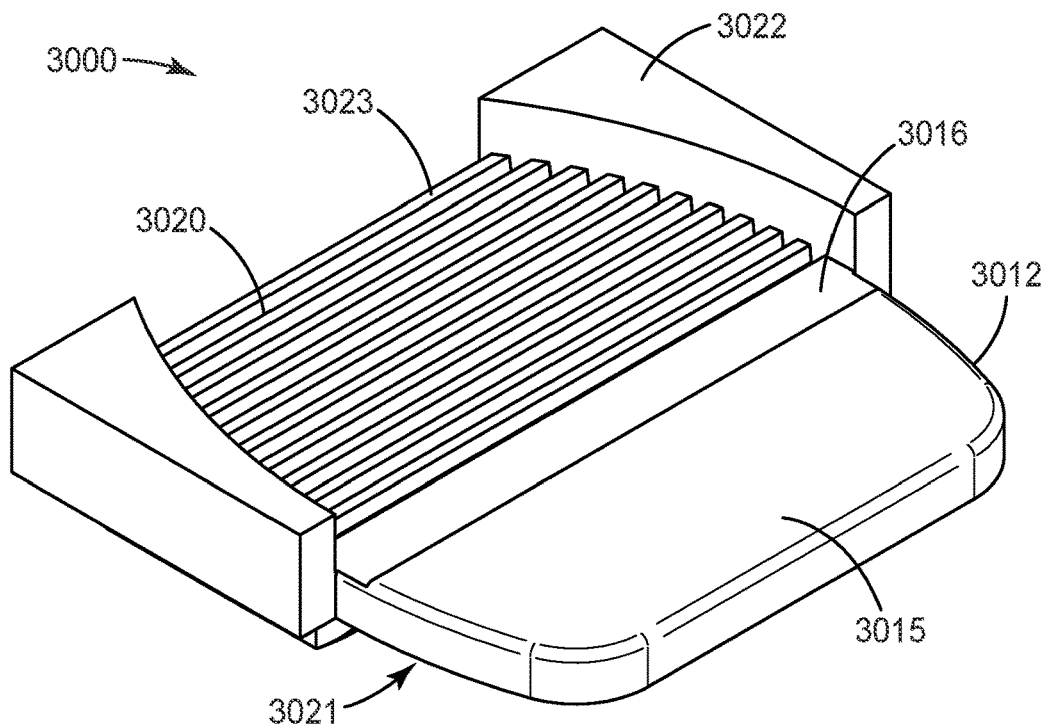
Figure 34:
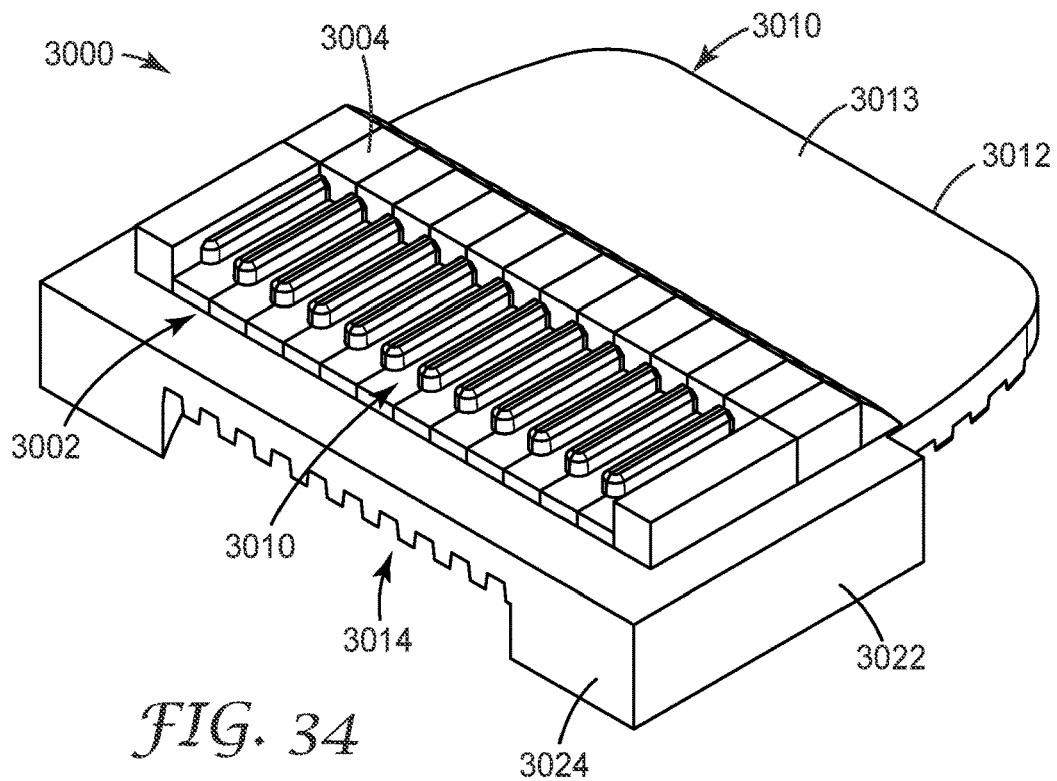
FIGS. 34 and 36 illustrate various features provided on a first major surface of an LCU in accordance with various embodiments.

FIGS. 31 and 33 illustrate various features of the LCU 3000 provided on a second major surface 3021, the second major surface 3021 opposing the first major surface 3001 shown in FIGS. 30 and 32. The second major surface 3021 is configured to be a mating surface of the LCU 3000. The second major surface 3021 includes the second surface 3015 of the mating tongue 3012 which, in the embodiment shown in FIGS. 31 and 33, is substantially planar. The second major surface 3021 also includes a plurality of substantially parallel second grooves 3020 and an optically transmitting window 3016 disposed between the second grooves 3020 and the second surface 3015 of the mating tongue 3012. The second grooves 3020 are oriented along a direction different from the first direction of the first grooves 3010 provided at the LCU attachment area 3002 on the first major surface 3001. The second grooves 3020 are oriented along a direction different from the mating direction, $D_M$. The second grooves 3020 have a pitch different from that of the first grooves 3010.

In the embodiment shown in FIGS. 31 and 33, the second surface 3015 of the mating tongue 3012 is substantially planar. In other embodiments, the second surface 3015 of the mating tongue 3012 includes a plurality of the substantially parallel second grooves 3020. The second grooves 3020 on the second surface 3015 of the mating tongue 3012 are oriented along a direction different from the mating direction, $D_M$.

As discussed above, the second major surface 3021 is configured to be a mating surface of the LCU 3000. In particular, the second major surface 3021 is adapted to slide against the mating surface of a mating light coupling unit when moved in a mating direction, $D_M$ (see FIG. 31). The interior surfaces of the sidewalls 3022 have a shape configured to receive the shape of a mating tongue 3012 of a mating light coupling unit. In the embodiment shown in FIGS. 31 and 33, the interior surfaces of the sidewalls 3022 have a curvature that matches the curvature of the mating tongue 3012 of the mating light coupling unit. It is understood that the interior surfaces of the sidewalls 3022 can instead be polygonal or include polygonal features in addition to curved features.

In the embodiment shown in FIGS. 31 and 33, the optically transmitting window 3016 is recessed into the second major surface 3021. More particularly, the optically transmitting window 3016 is recessed below the second surface 3015 of the mating tongue 3012 and below the lands 3023 of the second grooves 3020. Recessing the optically transmitting window 3016 into the second major surface 3021 prevents potentially damaging contact with a mating tongue 3012 of a mating light coupling unit when the LCU 3000 is connected to a mating light coupling unit.

According to various embodiments, the second grooves 3020 on the second major surface 3021 are configured to capture particulate contaminants (e.g., dust) between the second major surface 3021 and a mating surface of a mating light coupling unit. For example, as the mating tongue 3012 of the mating light coupling unit is received by the coupling member 3014, any particulate contaminants on the mating tongue 3012 of the mating light coupling unit or on a land 3023 of the second grooves 3020 are pushed into and captured by a recess of the second grooves 3020. Capturing of particulate contaminants within the recesses of the second grooves 3020 prevents the above-described angular errors from occurring when mating a pair of light coupling units.

In the embodiment shown in FIGS. 31 and 33, the second grooves 3020 on the second major surface 3021 are oriented transverse to the first direction of the first grooves 3010 on the first major surface 3001. In some embodiments, the second grooves 3020 are oriented substantially perpendicular to the first direction of the first grooves 3010. In other embodiments, the second grooves 3020 can be oriented at an angle of about 45° with respect to the first direction of the first grooves 3010. In further embodiments, the second grooves 3020 can be oriented at an angle between about 30° and 60° with respect to the first direction of the first grooves 3010. Although the second grooves 3020 are shown in FIGS. 31 and 33 to be substantially parallel and straight, the second grooves 3020 can have some degree of curvature while maintaining a substantially parallel relationship. For example, the second grooves 3020 can have a generally chevron shape or other curved shape.

The second grooves 3020 can have cross-sections that comprise polygonal surfaces and/or curvilinear surfaces. In some embodiments, the second grooves 3020 have a V-shaped cross section. In other embodiments, the second grooves 3020 have a U-shaped cross section. The second grooves 3020 comprise a series of lands 3023 and a recess between adjacent lands 3023. In some embodiments, the lands 3023 have a width smaller than a width of the recesses. For example, the width of the lands 3023 can be less than about half the width of the recesses. By way of further example, the width of the lands 3023 can be less than about one-fourth the width of the recesses. In other embodiments, the lands 3023 have a width larger than a width of the recesses. In further embodiments, the width of the lands 3023 is less than about 75 µm. The lands 3023 may be coplanar with any mating surface, such as a mating surface that does not have lands. It is noted that if the lands 3023 are narrower than the recesses, and there is a linear pattern where the lands 3023 are parallel on the two mating parts, the lands 3023 can fall into the recesses and jam. Accordingly, if the lands 3023 are linear and not sufficiently parallel, they will not cause jamming.

FIGS. 34-37 illustrate an LCU 3000 having a groove configuration on the second major surface 3021 in accordance with various embodiments. The LCU 3000 shown in FIGS. 34 and 36 includes a first major surface 3001 having many of the features shown in FIGS. 30 and 32. The LCU 3000 shown in FIGS. 34 and 36 includes a second major surface 3021 having features differing from those shown in FIGS. 31 and 33. More particularly, and with reference to FIGS. 35 and 37, the second surface 3015 of the mating tongue 3012 includes a plurality of substantially parallel second grooves 3020. In this embodiment, the second major surface 3021 includes a first region 3030 comprising at least some of the second grooves 3020 and a second region 3032 comprising at least some of the second grooves 3020, wherein the second region 3032 includes the second surface 3015 of the mating tongue 3012.

The second grooves 3020 on the second major surface 3021 are oriented along a direction different from the first direction of the first grooves 3010 of the LCU attachment area 3002. In the embodiment shown in FIGS. 35 and 37, the second grooves 3020 are oriented at an angle of about 45° with respect to the first direction of the first grooves 3010. In general, the second grooves 3020 can be oriented at an angle between about 30° and 60° with respect to the first direction of the first grooves 3010. A diagonal orientation of the second grooves 3020 serves to reduce chattering that can occur during light coupling unit mating where the second grooves 3020 are oriented perpendicular to the direction of mating, $D_M$. Although the second grooves 3020 are shown in FIGS. 35 and 37 to be substantially parallel and straight, the second grooves 3020 can have some degree of curvature while maintaining a substantially parallel relationship.

Figure 35:
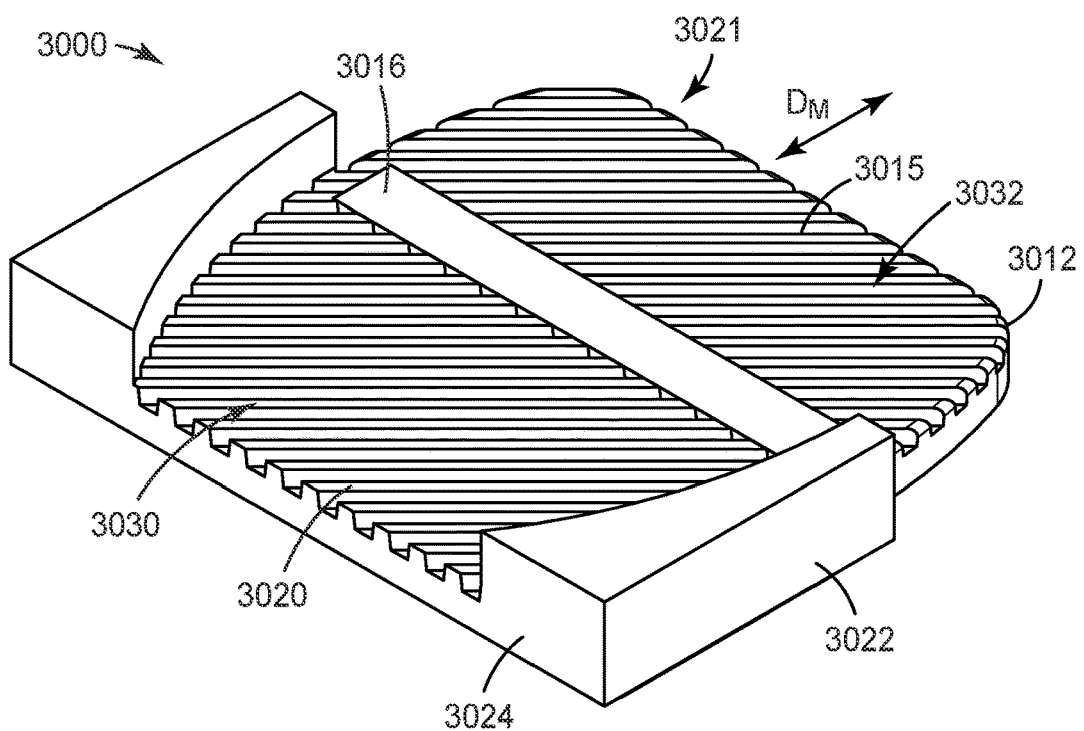
FIGS. 35 and 37 illustrate various features provided on a second major surface of the LCU shown in FIGS. 34 and 36.
Figure 36:
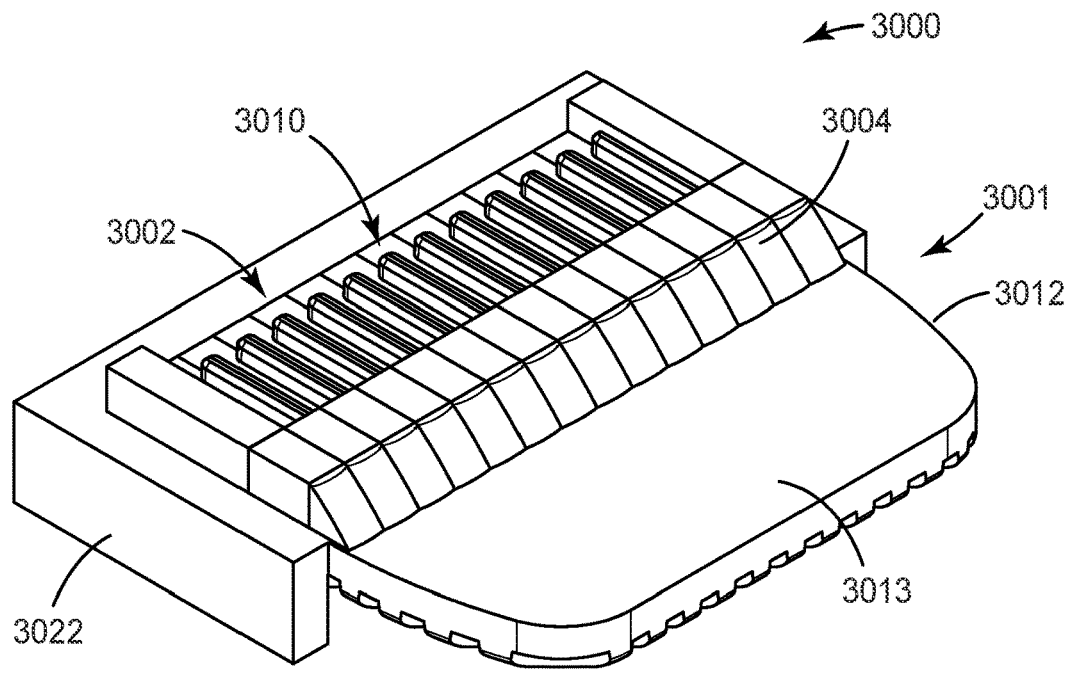
Figure 37:
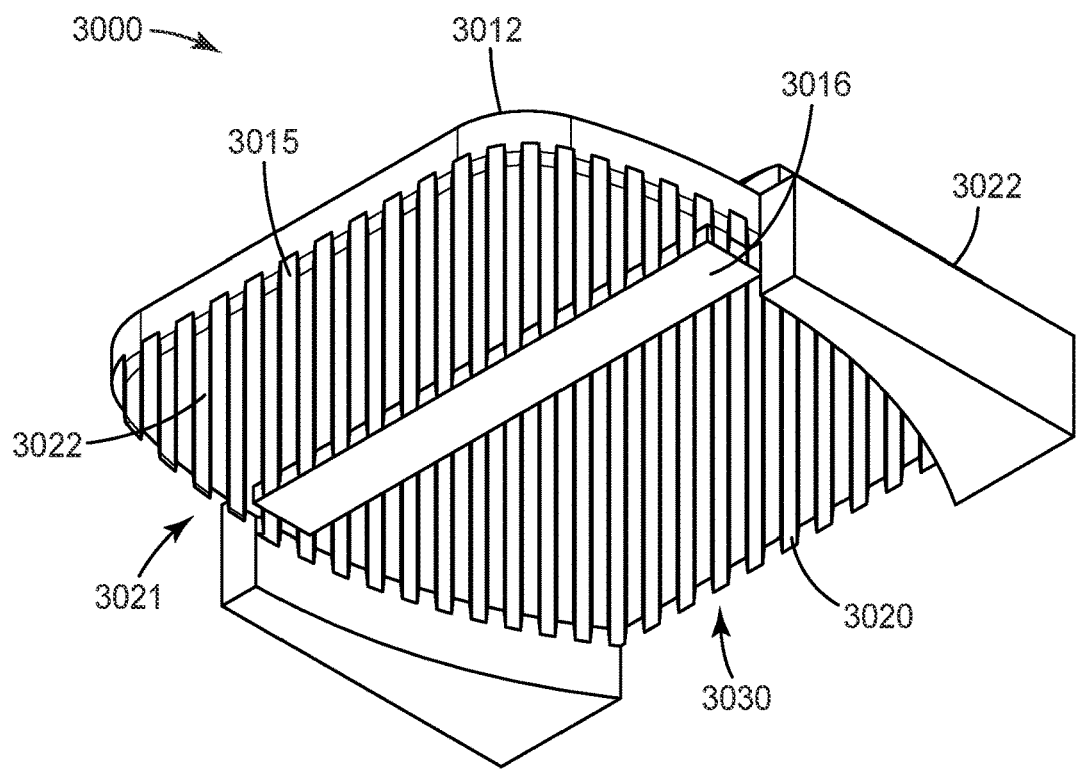

In the embodiment illustrated in FIGS. 35 and 37, an optically transmitting window 3016 is situated between the first region 3030 and the second region 3032. The upper surface of the optically transmitting window 3016 is flush with the lands 3023 of the second grooves 3020 in the first and second regions 3030 and 3032. Positioning the optically transmitting window 3016 to be flush with the lands 3023 of the second grooves 3020 facilitates clearing of any particulate contaminants from the optically transmitting window 3016 when connecting the LCU 3000 to a mating light coupling unit. When connecting a pair of light coupling units, for example, the second grooves 3020 on region 3032 of the mating tongue 3012 of a mating light coupling unit slidably contacts the optically transmitting window 3016 of the LCU 3000, thereby pushing any particulate contaminates off of the optically transmitting window 3016.

Because the optically transmitting window 3016 comes into contact with the mating tongue 3012 of a mating light coupling unit, it is desirable that the optically transmitting window 3016 have enhanced hardness. More particularly, the optically transmitting window 3016 can have a hardness greater than that of the lands 3023 of the second grooves 3020. For example, the optically transmitting window 3016 can include a coating having a hardness greater than that of the lands 3023 of the second grooves 3020. The coating on the optically transmitting window 3016 can be an antireflective coating, for example.

Figure 38:
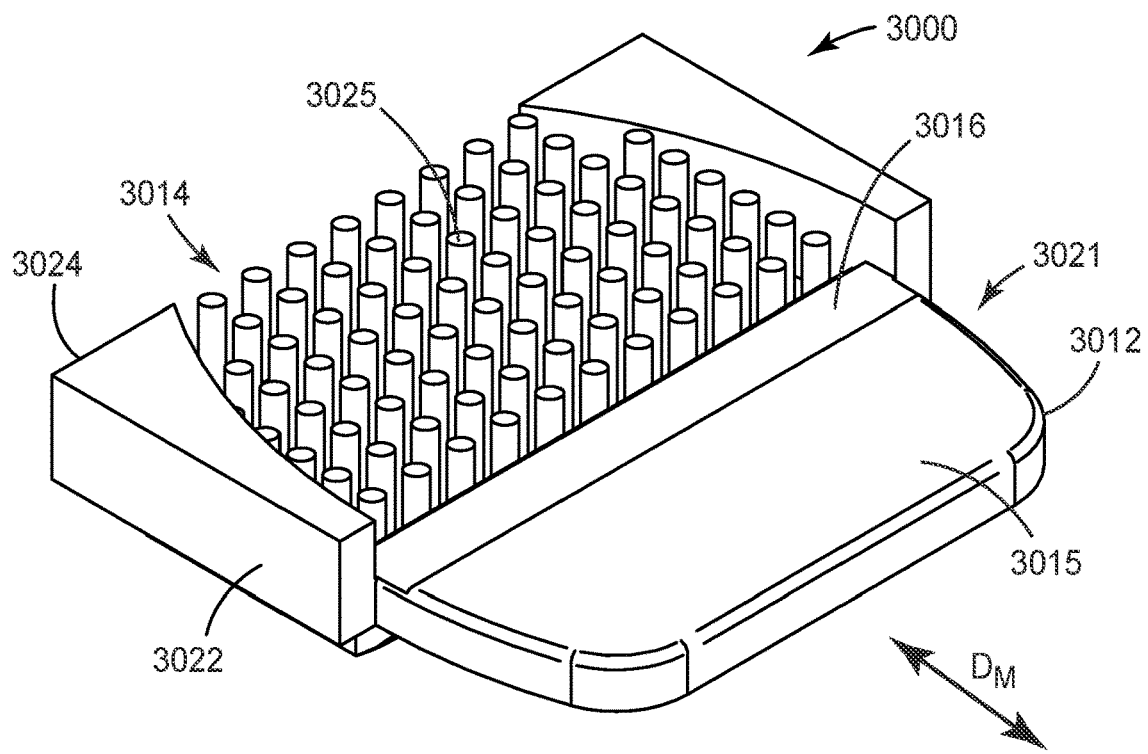
FIG. 38 illustrates various features provided on a surface of an LCU in accordance with various embodiments.

FIG. 38 illustrates an LCU 3000 having a pattern of small posts 3025 on the second major surface 3021 in accordance with various embodiments. The LCU 3000 shown in FIG. 38 includes a first major surface (not shown) having many of the features shown in previous figures (e.g., one or more grooves configured to receive one or more optical waveguides). The LCU 3000 shown in FIG. 38 includes a second major surface 3021 having a field of small posts 3025 that extend normal from the second major surface 3021. Top surfaces of the posts 3025 define lands. The spacing between the posts 3025 allows dust and other particulate contaminants to be captured within recesses between the posts 3025. In some embodiments, the posts 3025 are arranged in rows and columns. In other embodiments, the posts 3025 are arranged in a staggered pattern or other distribution. The second surface 3015 of the mating tongue 3012 is preferably planar, which becomes a mating surface for posts of a mating LCU.

Figure 39:
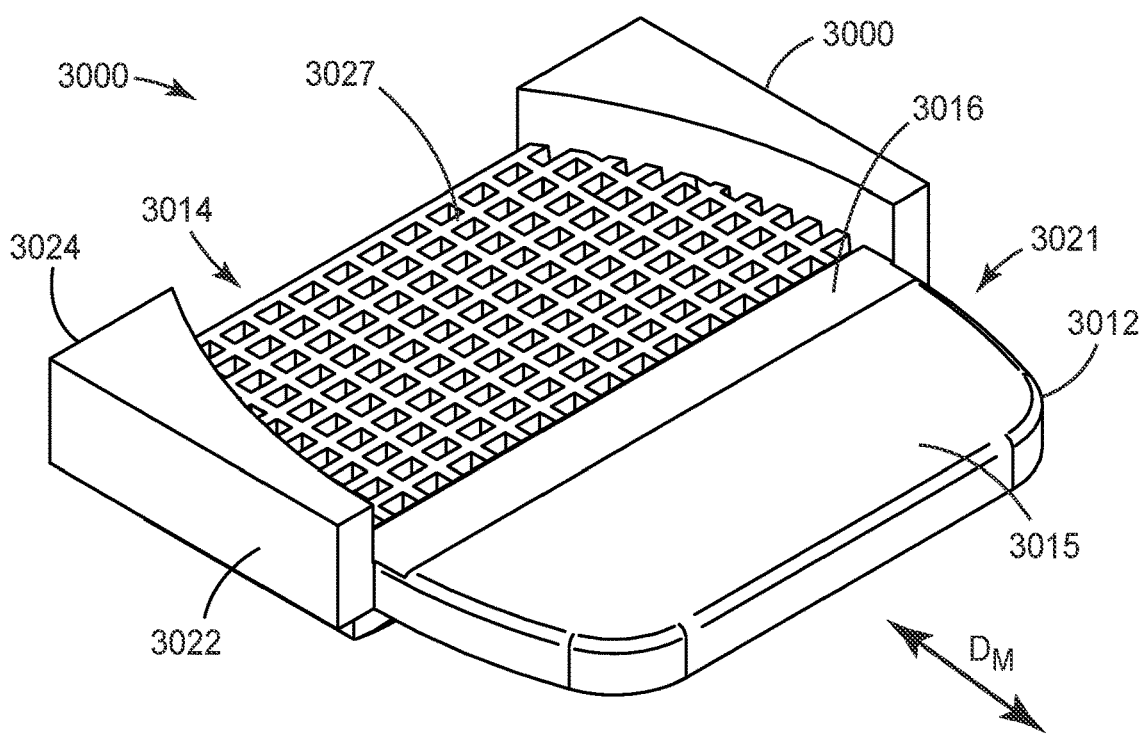
FIG. 39 illustrates various features provided on a surface of an LCU in accordance with other embodiments.

FIG. 39 illustrates an LCU 3000 having a waffle pattern 3027 on the second major surface 3021 in accordance with various embodiments. The LCU 3000 shown in FIG. 39 includes a first major surface (not shown) having many of the features shown in previous figures. The LCU 3000 shown in FIG. 39 includes a second major surface 3021 having a waffle pattern 3027 extending over the second major surface 3021 except for the optically transmitting window 3016. In some embodiments, the waffle pattern 3027 can cover the region of the second major surface 3021 that excludes the mating tongue 3012 and the optically transmitting window 3016. The lands (raised portions) of the waffle pattern 301 are arranged to contact corresponding lands or planar surfaces of a waffle pattern or planar surface provided on a mating LCU. The waffle pattern 3017 of FIG. 39 has a rectangular pattern. In other embodiments, patterns such as hexagonal patterns, diamond patterns, or irregular patterns may be used.

Figure 40A:
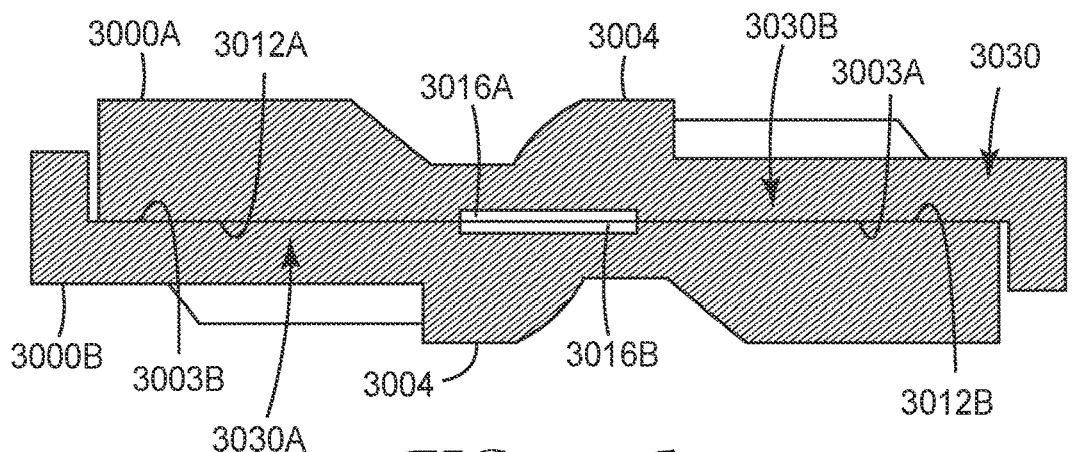
FIG. 40A illustrates a mating interface between two LCUs that does not incorporate a particulate contaminant capture feature of the present disclosure.
Figure 40B:
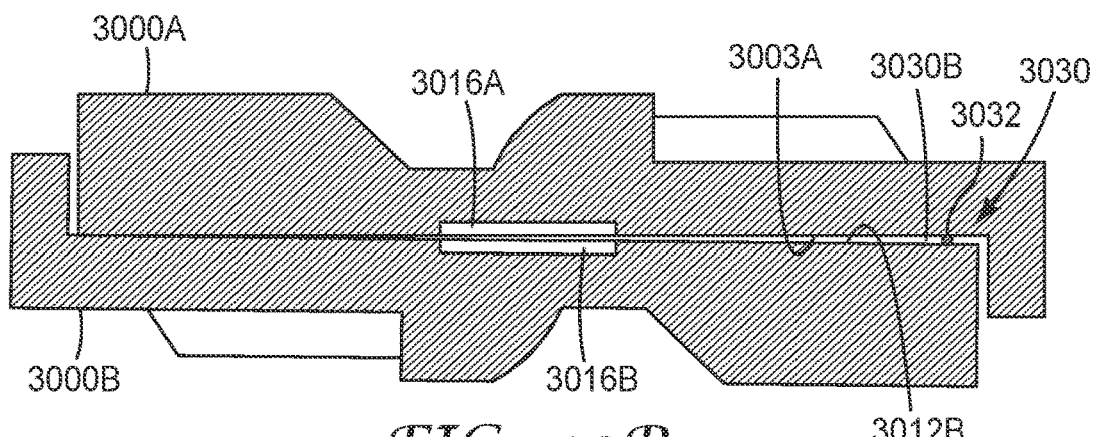
FIG. 40B illustrates a particulate contaminant at a mating interface between two LCUs that does not incorporate a particulate contaminant capture feature of the present disclosure.
Figure 40C:
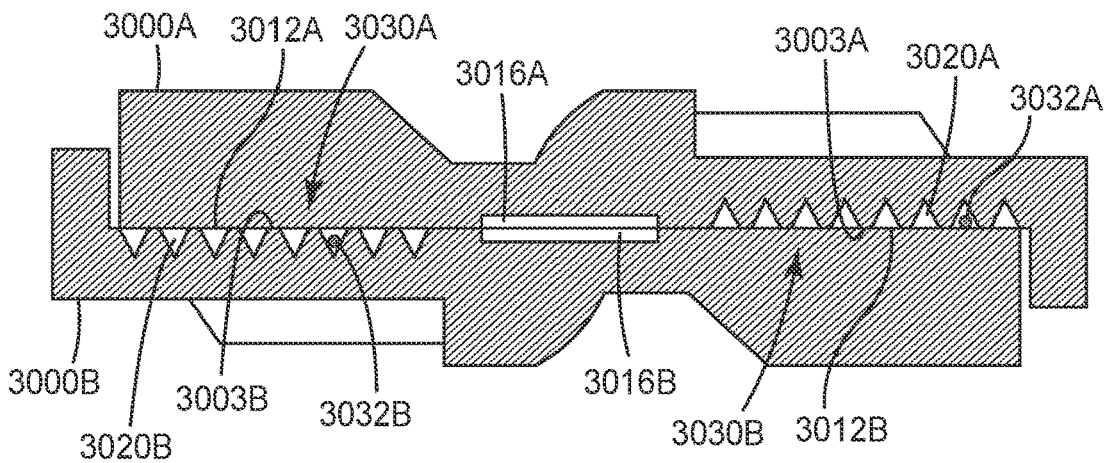
FIG. 40C illustrates particulate contaminants trapped by particulate contaminant capture features of the present disclosure provided at mating interfaces between two LCUs.

FIGS. 40A-40C illustrate coupling between two LCUs 3000A and 3000B along a mating interface 3030. The mating interface 3030 includes a first mating interface 3030A between a mating tongue surface 3012A of LCU 3000A and a mating surface 3003B of LCU 3000B. The mating interface 3030 also includes a second mating interface 3030B between a mating tongue surface 3012B of LCU 3000B and a mating surface 3003A of LCU 3000A. In FIG. 40A, the mating interface 3030 of the two LCUs 3000A and 3000B does not include a particulate contaminant capture feature of the present disclosure. In the absence of particulate contaminants at the mating interface 3030, the optical transparent portions 3016A and 3016B are in proper optical alignment.

FIG. 40B shows a dust particle 3032 trapped at the second mating interface 3030B between the mating surface 3003A of LCU 3000A and the tongue mating surface 3012B of LCU 3000B. As was discussed previously, presence of a single 50 µm diameter dust particle trapped in the interface 3030 between the two mated LCUs 3000A and 3000B can generate an angular error of 1 degree or larger at the optical interface 3016A/3016B.

FIG. 40C shows coupling between two light coupling units 3000A and 3000B each incorporating a particulate contaminant capture feature in accordance with various embodiments. FIG. 40C illustrates a dust particle 3032A captured within one of the second grooves 3020A at a second mating interface 3030B between LCU 3000A and LCU 3000B. More particularly, the dust particle 3032A is captured within a recess of one of the grooves 3020A at the second mating interface 3030B between the mating surface 3003A of LCU 3000A and the mating tongue surface 3012B of LCU 3000B.

FIG. 40C also illustrates a dust particle 3032B captured within one of the second grooves 3020B at a first mating interface 3030A between LCU 3000A and LCU 3000B. More particularly, the dust particle 3032B is captured within a recess of one of the grooves 3020B at the first mating interface 3030A between the mating surface 3003B of LCU 3000B and the mating tongue surface 3012A of LCU 3000A. Because the dust particles 3032A and 3032B are trapped within the particulate contaminant capture features, proper optical alignment at the optical interface 3016A/3016B between LCU 3000A and LCU 3000B is maintained.

Attachment of optical waveguides or fibers to optical or optoelectronic devices is often done with V-shaped grooves (i.e., V-grooves). The waveguides is forced into the bottom of the groove (typically a 90° angle V-groove) with a clamping mechanism. Typically, an index-matching adhesive is then applied to permanently hold the waveguides in the V-groove. This scheme has several challenges. The clamping mechanism must provide sufficient force to bend the waveguides to seat them in and thus align them with the grooves, yet have sufficient compliance to contact each waveguide of a ribbon of waveguides. It must also allow access for the application of the adhesive without itself becoming bonded to the waveguides. The position of the clamping mechanism over the V-grooves makes it difficult to observe the positions of the waveguides, or to use a light-cured adhesive. Use of U-shaped grooves (i.e., U-grooves) with flat bottoms and vertical sidewalls have several challenges. Issues with the ease of capture of the waveguides and with the positional error associated with the clearance required for the groove width have not been previously addressed.

Embodiments are directed to a light coupling unit having one or a multiplicity of grooves configured to receive and permanently attach to one or a multiplicity of optical waveguides. In one embodiment, a portion of a groove provides nearly vertical sidewalls that allow an optical waveguide to be bent laterally into the correct position. The groove can be formed wider at the top, providing a substantially Y-shaped cross-section (i.e., Y-groove) that facilitates capturing an optical waveguide into the groove. As was discussed previously, the optical waveguides can be single-mode optical waveguides, multi-mode optical waveguides, or an array of single-mode or multi-mode optical waveguides. In some embodiments, the waveguides are single-mode or a multi-mode polymer optical waveguide.

In another embodiment, a portion of a groove provides nearly vertical sidewalls that allow an optical waveguide to be bent laterally into the correct position. This portion of the groove can be made slightly wider than the diameter of the optical waveguide to provide clearance for initial capture of the optical waveguide. Once in contact with and approximately parallel to the bottom of the groove, the end of the optical waveguide is slid axially into a location where the width of the groove gradually narrows to less than the diameter of the optical waveguide. Here the tip of the optical waveguide stops, and is correctly positioned. The groove, according to some embodiments, can be formed wider at the top, providing a substantially Y-shaped cross-section that facilitates capturing an optical waveguide into the groove.

Embodiments of the disclosure can provide several advantages over conventional approaches. For example, like V-grooves, Y-grooves can be molded in the same mold insert as the light redirecting members (e.g., mirror lenses) of a light coupling unit. The waveguides can be easily and very quickly positioned in the Y-grooves. The waveguides can be precisely positioned without the use of a clamp over the grooves (see FIGS. 49-55), which allows for direct observation of the waveguides in the grooves and the use of light-cured adhesive to rapidly and reliably attach the waveguides in the Y-grooves.

Figure 41:
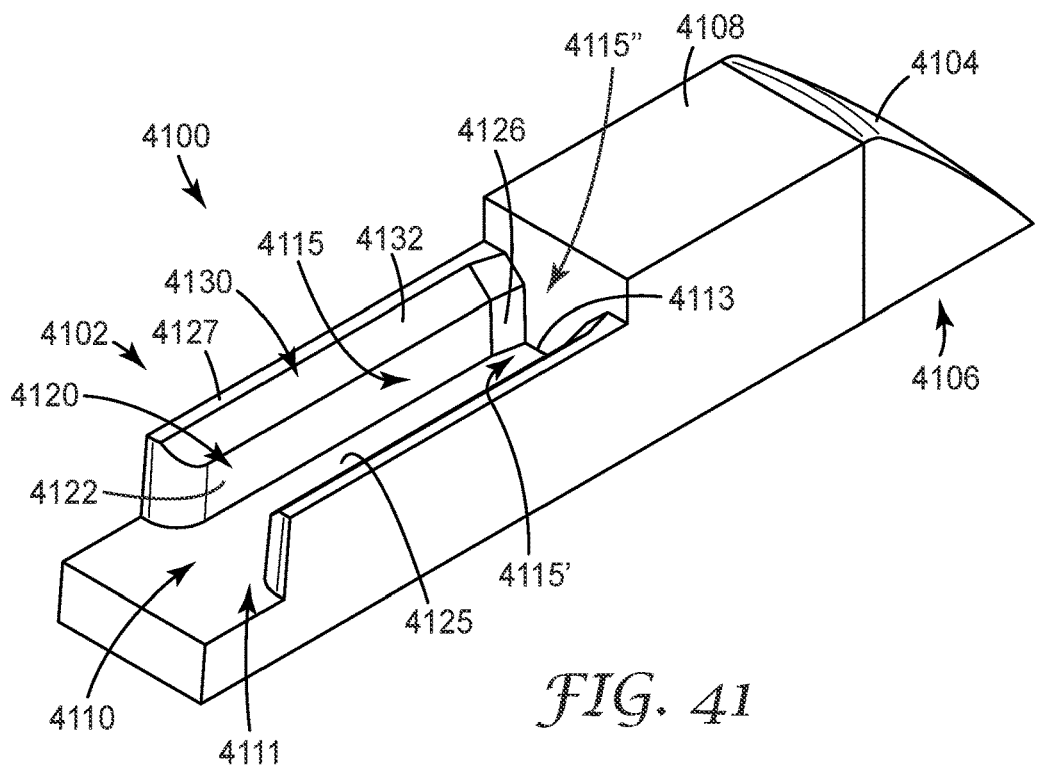
FIG. 41 illustrates an LCU that incorporates a compound groove having a centering arrangement in accordance with various embodiments.
Figure 42:
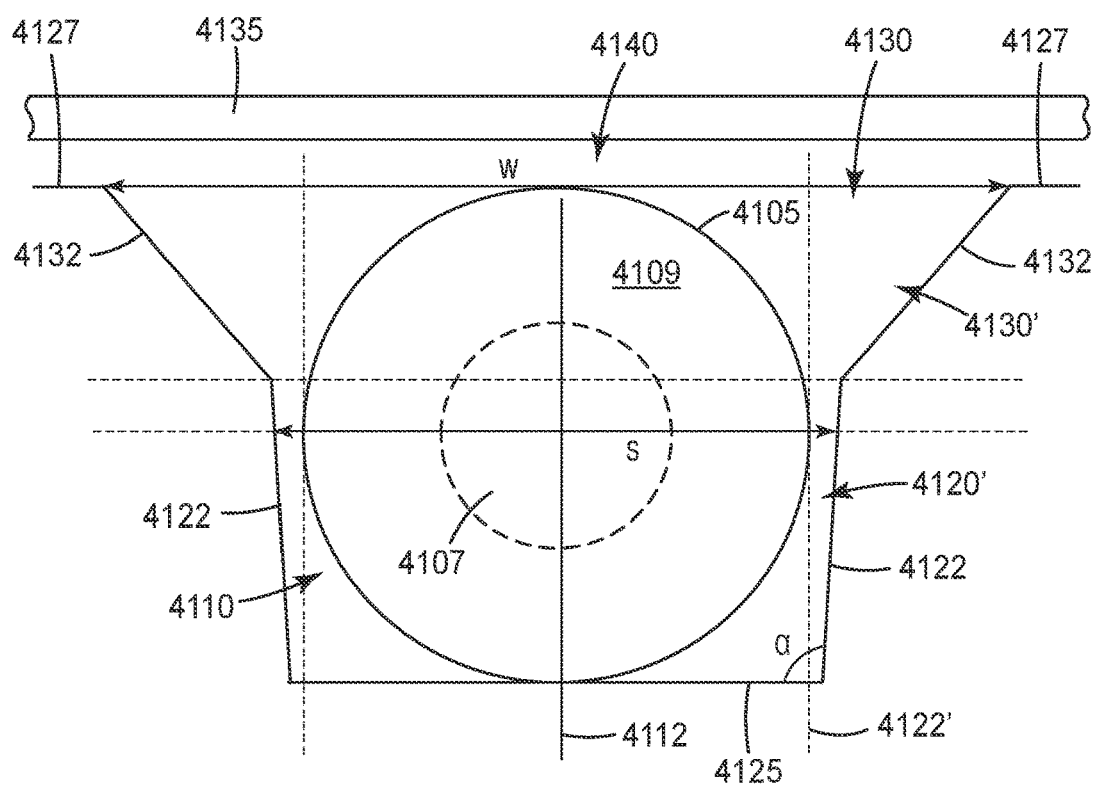
FIG. 42 illustrates various details of the compound groove shown in FIG. 41, the groove configured to receive an optical waveguide.

FIG. 41 illustrates a portion of an LCU 4100 in accordance with various embodiments. The LCU 4100 shown in FIG. 41 includes a single LCU attachment area 4102. Although a single LCU attachment area 4102 is shown in FIG. 41, it is understood that a multiplicity of attachment areas 4102 can be provided on the LCU 4100 for receiving and permanently attaching to a multiplicity of optical waveguides. The LCU attachment area 4102 includes a Y-groove 4110 having an entrance 4111, a terminal end 4113, and a central plane 4112 (see FIG. 42) extending between the entrance 4111 and the terminal end 4113. The central plane 4112, as shown in FIG. 42, is a plane bisecting a bottom surface 4125 of the Y-groove 4110 and extending perpendicularly from the bottom surface 4125. The Y-groove 4110 is configured to receive an optical waveguide, such as the generally cylindrical waveguide 4105 shown in FIG. 42.

The LCU 4100 includes a light redirecting member 4104 and an intermediate section 4108 between the light redirecting member 4104 and the terminal end 4113. In some embodiments, the terminal end 4113 comprises an optically clear member, such as a lens, or is formed from optically transparent material. The intermediate section 4108 is formed from an optically transparent material. The light redirecting member 4104 includes an output side 4106 through which light exits from (or enters into) the light directing member 4104.

According to some embodiments, and with reference to FIGS. 41 and 42, the Y-groove 4110 is a compound groove formed by a generally U-shaped lower portion 4120 and an expanded upper portion making the compound groove generally Y-shaped. It is understood that the terms U and Y modifying the term groove serve to connote an approximate shape of these grooves for purposes of convenience and not of limitation.

As is best seen in FIG. 42, the Y-groove 4110 is defined by a first region 4120', a second region 4130', an opening 4140, and a bottom surface 4125. The first region 4120' is defined between the bottom surface 4125 and the second region 4130'. The first region 4120' includes substantially parallel sidewalls 4122 separated by a spacing, S. The sidewalls 4122 can have a draft of one or a few degrees (e.g., < about 10 degrees) in a direction off vertical, and as such, may be considered to be substantially parallel to one another. For example, the sidewalls 4122 can be normal to the bottom surface 4125 to within about 5 degrees. The sidewalls 4122 can have a slight outward slope or draft to facilitate mold release of the sidewalls 4122 during fabrication. In this case, the substantially vertical sidewalls 4122 form a draft angle, a, with a plane 4112 extending perpendicular from the bottom surface 4125.

The second region 4130' is disposed between the first region 4120' and the opening 4140. The opening 4140 is defined between top surfaces 4127 of the Y-groove 4110. A width, W, of the opening 4140 is greater than the spacing, S, between the sidewalls 4122. As can be seen in FIG. 42, the first region 4120' defines the U-shaped lower portion 4120 of Y-Y-groove 4110 and the second region 4130' defines the expanded upper portion 4130.

The second region 4130' includes sidewalls 4132 that extend outwardly from the central plane 4112 of the Y-groove 4110. In FIG. 42, the sidewalls 4132 comprise linear sidewalls, which may be considered chamfered sidewalls. In other embodiments, the sidewalls 4132 may be non-linear, such as by having some degree of curvature. The sidewalls 4132 extend between the first region 4120' and the opening 4140, with a spacing between the sidewalls 4132 progressively increasing from the first region 4120' to the opening 4140.

According to some embodiments, a width, W, of the opening 4140 is greater than the spacing, S, of the first region 4120' by a distance equal to about half of the spacing, S. In other embodiments, the width, W, of the opening 4140 is greater than the spacing, S, by a distance greater than half of the spacing, S. A height of the sidewalls 4122 of the first region 4120' can be greater than about 50% of the height of the waveguide 4105. For example, a height of the sidewalls 4120 of the first region 4120' can range between about 50% and 75% of the height of the optical waveguide 4105. In some embodiments, the height of the sidewalls 4122 of the first region 4120' can be greater than about 62.5 to 65 µm but less than a height of an optical waveguide 4105. In other embodiments, the height of the sidewalls 4122 of the first region 4120' can be greater than about 75 µm but less than a height of an optical waveguide 4105. In the embodiment shown in FIG. 42, the overall height of the Y-groove 4110 is about equal to the height of the waveguide 4105 (e.g., about 125 µm). In some embodiments, the overall height of the Y-groove 4110 can be less than or greater than the height of the waveguide 4105. A cover 4135 (optional) may be configured to cover the optical waveguides 4105 and grooves 4110 of the LCU 4100. As can be seen in FIG. 42, spacing between the sidewalls 4122 of the first region 4120' in a region of closest approach to the optical waveguide 4105 is larger than the width of the waveguide by a predetermined clearance. In some embodiments, the predetermined clearance can be less than about 1 µm. In other embodiments, the predetermined clearance can be between about 1 and 3 µm. In further embodiments, the predetermined clearance can be between about 1 and 5 µm. For example, an optical waveguide 4105 can have a width of about 125 µm, and the spacing separating the sidewalls 4122 of the first region 4120' can include a clearance of about 1 to 5 µm.

In embodiments that employ a waveguide 4105 comprising multi-mode fiber, the predetermined clearance can be between about 1 and 5 µm. For example, the predetermined clearance can be equal to about 0.8 to 4% of the width of an optical waveguide 4105 that comprises multi-mode fiber. In embodiments that employ a waveguide 4105 comprising single mode fiber, the predetermined clearance can be between about 0 and 2 µm. For example, the predetermined clearance can be equal to about 0 to 1.6% of a width of an optical waveguide 4105 that comprises single mode fiber. In some cases, the clearance may be less than 0, so that the waveguide 4105 deforms the Y-groove 4110 when placed in it (e.g., via an interference fit).

Figure 43:
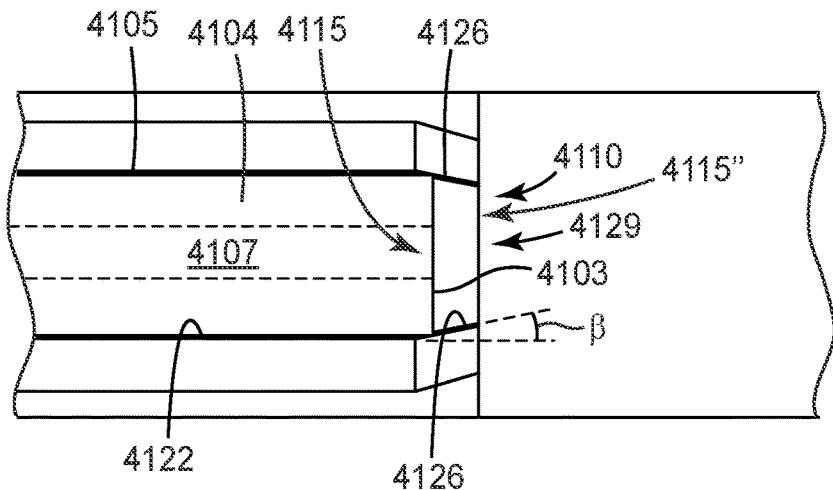
FIG. 43 illustrates a longitudinal transition section of the groove shown in FIG. 41.

The waveguide 4105 shown in FIGS. 42 and 43 includes a core 4107 surrounded by cladding 4109. It is important that the core 4107 be optically aligned with the light redirecting member (see 4104 in FIG. 41) when the waveguide 4105 is permanently bonded in place within the Y-groove 4110 using an optical (index-matched) bonding material. In some embodiments, the Y-groove 4110 includes a centering arrangement by which the waveguide 4105 is forcibly guided laterally toward a central plane 4112 of the Y-groove 4110 when the waveguide 4105 is installed in the Y-groove 4110. In addition to centering the core 4107 along a central plane 4112 of the Y-groove 4110, the centering arrangement serves as a stop that limits axial displacement of the waveguide 4105 within the Y-groove 4110. As such, a compound Y-groove 4110 according to some embodiments includes a centering arrangement in combination with a U-groove alone or a Y-groove.

FIGS. 41 and 43 show a Y-groove 4110 that incorporates a centering arrangement defined by a longitudinal transition section 4115 comprising a first end 4115' and a second end 4115". The first end 4115' has a width equal to the spacing, S, between the sidewalls 4122 of the first region 4120'. The second end 4115" has a width less than a width of the optical waveguide 4105. The sidewall spacing progressively reduces within the transition section 4115, such as by the sidewalls angling inwardly in the transition section 4115. The transition section 4115 comprises centering sidewalls 4126 which can originate from terminal ends of sidewalls 4122 and project inwardly toward the central plane of the Y-groove 4110. The centering sidewalls 4126 may be considered chamfered sidewalls of the Y-groove 4110. The sidewalls 4122 and centering sidewalls 4126 of the transition section 4115 can comprise substantially planar sidewall surfaces or non-planar sidewall surfaces.

The centering sidewalls 4126 form an angle, (3, with the sidewalls 4122 that can range between about 5 and 45 degrees. The longitudinal transition section 4115 need not be very long relative to the overall length of the Y-groove 4110. For example, length of the Y-groove 4110 can be between 200 µm and 2000 µm, and the centering sidewalls 4126 can extend from the sidewalls 4122 by a distance of about 2 µm to 50 µm. The centering sidewalls 4126 can have the same height as that of the sidewalls 4122.

As the waveguide 4105 is displaced axially within the Y-groove 4110 toward the light redirecting member 4104, the terminal end 4103 of the waveguide 4105 contacts the centering sidewalls 4126 and is guided toward the central plane of the Y-groove 4110 so that the central axis of the waveguide 4105 is centered within the Y-groove 4110. A gap 4129 is defined between terminal ends of the centering sidewalls 4126. The gap 4129 is sufficiently wide to allow unimpeded passage of light emanating from the core 4107 of the waveguide 4105. The length of the centering sidewalls 4126 and width of the gap 4129 are preferably sized to accommodate the core and cladding dimensions of the waveguide 4105. With the terminal end 4103 of the waveguide 4105 properly centered within the Y-groove 4110 by the centering arrangement, the cladding 4109 is in contact with the centering sidewalls 4126, and the core 4107 is aligned with the center of the gap 4129. It is understood that the centering arrangement shown in FIG. 43 may be implemented in a U-groove, or in a compound U-groove such as a Y-groove.

Figure 44:
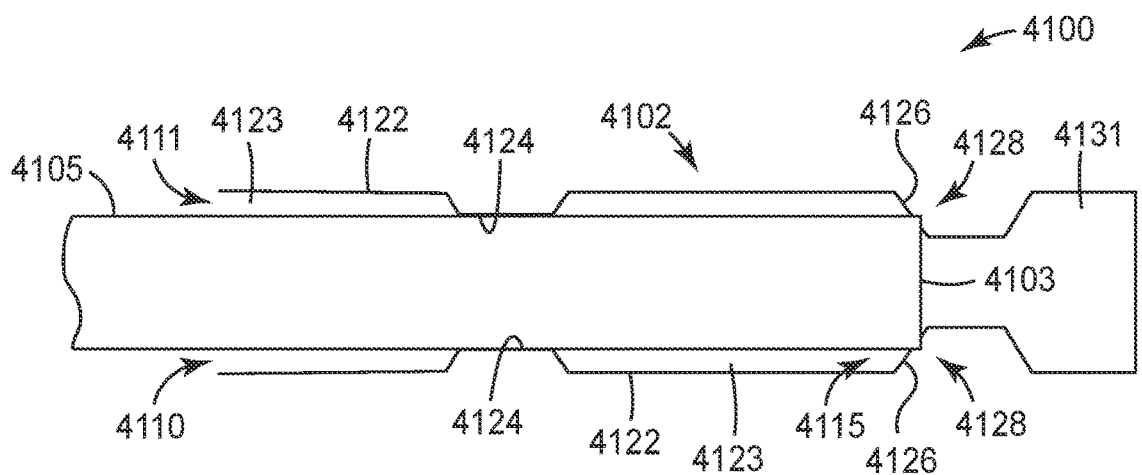
FIG. 44 is a top view of an LCU attachment area comprising a forward adhesive cavity in accordance with various embodiments.

FIG. 44 shows a top view of an LCU attachment area 4102 of an LCU 4100 in accordance with various embodiments. The LCU attachment area 4102 illustrated in FIG. 44 shows the terminal end 4103 of the waveguide 4105 centered within the Y-groove 4110. The embodiment of the Y-groove 4110 illustrated in FIG. 44 includes an alignment feature between the entrance 4111 and the longitudinal transition section 4115 of the Y-groove 4110. The alignment feature includes a protruded section 4124 of the groove sidewalls 4122. The spacing between opposing protruded sections 4124 is slightly greater than the width of the waveguide 4105 and less than the spacing between opposing sidewalls 4122. The protruded sections 4124 of the alignment feature serve to provide angular alignment of the waveguide 4105 with respect to the central plane of the Y-groove 4110 when the waveguide end 4103 is positioned in the transition section 4115 of the Y-groove 4110. In some embodiments, the alignment feature formed by protruded sections 4124 is located at or near the groove entrance 4111.

In the embodiment illustrated in FIG. 44, the edges of the terminal end 4103 of the waveguide 4105 are shown slightly embedded in the centering walls 4126 of the transition section 4115. In this embodiment, the cladding 4109 of the waveguide 4105 is formed of a material (e.g., glass) that is harder than the material used to form the centering walls 4126. A deformation 4128 in the centering walls 4126 can be formed by applying an axially directed force to the waveguide 4105 when the terminal end 4103 of the waveguide 4105 rests against the centering walls 4126 at its centered position. The deformation 4128 helps to maintain proper centered positioning of the waveguide 4105 within the Y-groove 4110 when optical bonding material is applied to permanently bond the waveguide 4105 within the Y-groove 4110.

The embodiment of the Y-groove 4110 shown in FIG. 44 incorporates a bonding region 4123 defined between the sidewalls 4122 of the Y-groove 4110 and the outer periphery of the waveguide 4105. The bonding region 4123 can be filled with bonding material (e.g., optical bonding material) which, when cured, permanently bonds the waveguide 4105 within the Y-groove 4110. In some embodiments, the bonding region 4123 is defined as a volume between the waveguide 4105, the planar bottom surface 4125, and the sidewalls 4122. In other embodiments, a depression or trough can be formed along a portion of the sidewalls 4122 where the bottom surface 4125 meets the sidewalls 4122 so as to increase the volume of bonding material captured within the Y-groove 4110.

Figure 45:
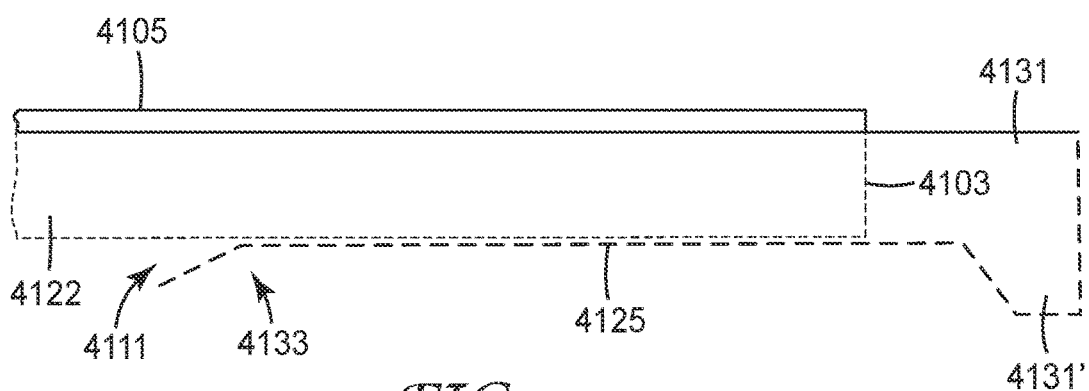
FIG. 45 is a side view of the LCU attachment area shown in FIG. 44.

FIG. 44 also shows a forward adhesive cavity 4131 configured to receive a volume of optical bonding material which, when cured, serves to increase the strength (e.g., integrity) of the bond between the terminal end 4103 of the waveguide 4105 and the LCU attachment area 4102. The forward adhesive cavity 4131 can be configured to receive a volume of material other than an adhesive, such as an index gel or oil, for example. In some embodiments, the adhesive cavity 4131 is configured to transmit light from an end of the waveguide 4105. As is shown in FIG. 45, the forward adhesive cavity 4131 can include a depression 4131' formed into the bottom surface 4125 of the LCU attachment area 4102. The depression 4131' serves to increase the total volume of the forward adhesive cavity 4131 for receiving an optical bonding material, thereby enhancing the strength/integrity of the bond between the terminal end 4103 of the waveguide 4105 and the LCU attachment area 4102. FIG. 45 also shows the entrance 4111 of the Y-groove 4110 at a location 4133 where the bottom surface 4125 of the groove 110 transitions from a slope to a plateau.

Figure 46:
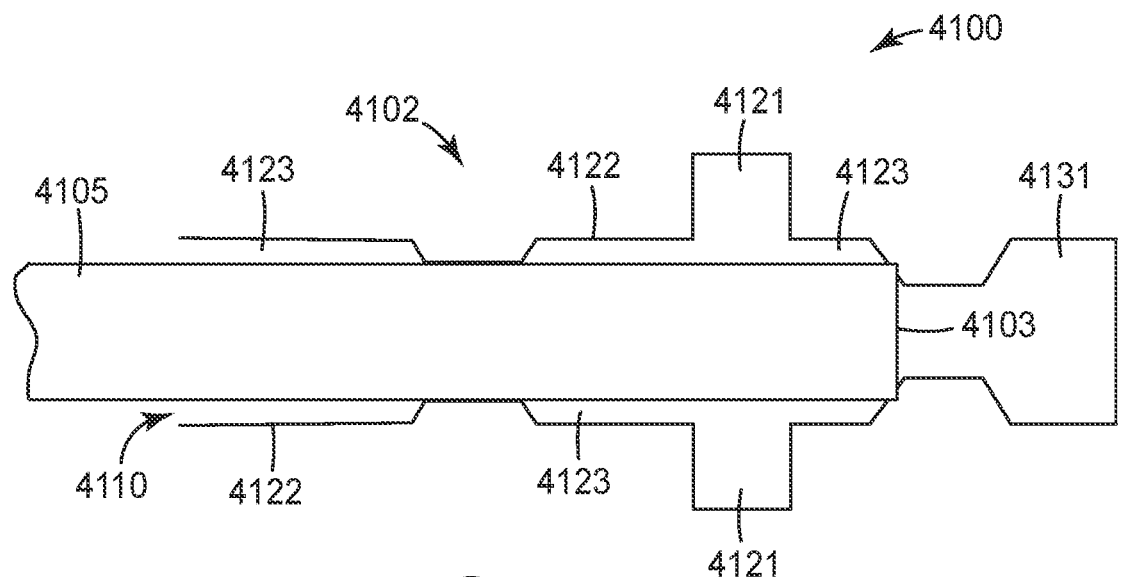
FIG. 46 is a top view of an LCU attachment area comprising lateral adhesive cavities in accordance with various embodiments.
Figure 47:
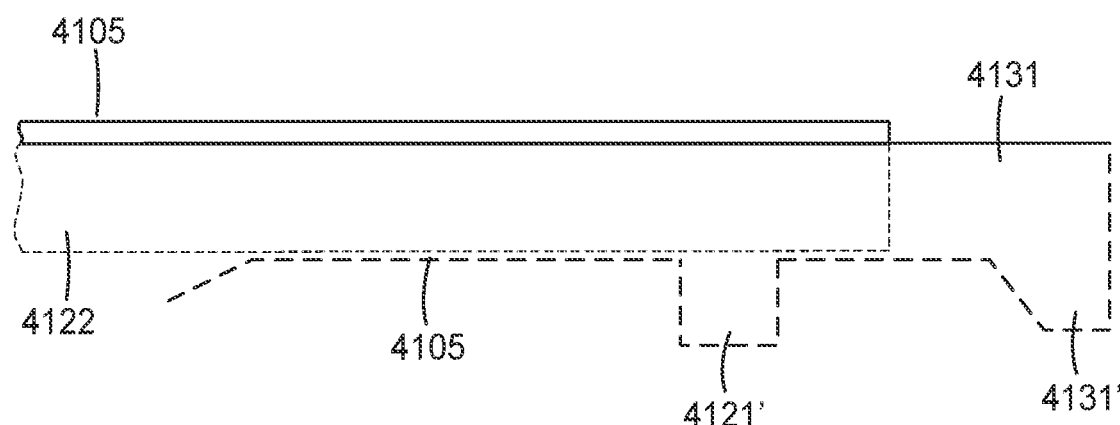
FIG. 47 is a side view of the LCU attachment area shown in FIG. 46.

FIG. 46 shows the bonding regions 4123 and forward adhesive cavity 4131 illustrated in FIG. 44 and, in addition, shows a lateral adhesive cavity 4121 extending laterally from each sidewall 4122 of the Y-groove 4110. The lateral adhesive cavities 4121 can be extended portions of the bonding regions 4123. The lateral adhesive cavities 4121 provide a volume for receiving additional bonding material near the sides of the terminal end 103 of the waveguide 4105, which increases the strength/integrity of the bond between the Y-groove 4110 and the waveguide 4105. As is shown in FIG. 47, the lateral adhesive cavity 4121 can include a depression 4121' formed into the bottom surface 4125 of the LCU attachment area 4102. The depression 4121' serves to increase the total volume of the lateral adhesive cavity 4121 for receiving an optical bonding material, thereby enhancing the strength/integrity of the bond between the waveguide 4105 and the Y-groove 4110. The lateral adhesive cavity 4121 can be configured to receive a volume of material other than an adhesive, such as an index gel or oil, for example.

Figure 48:
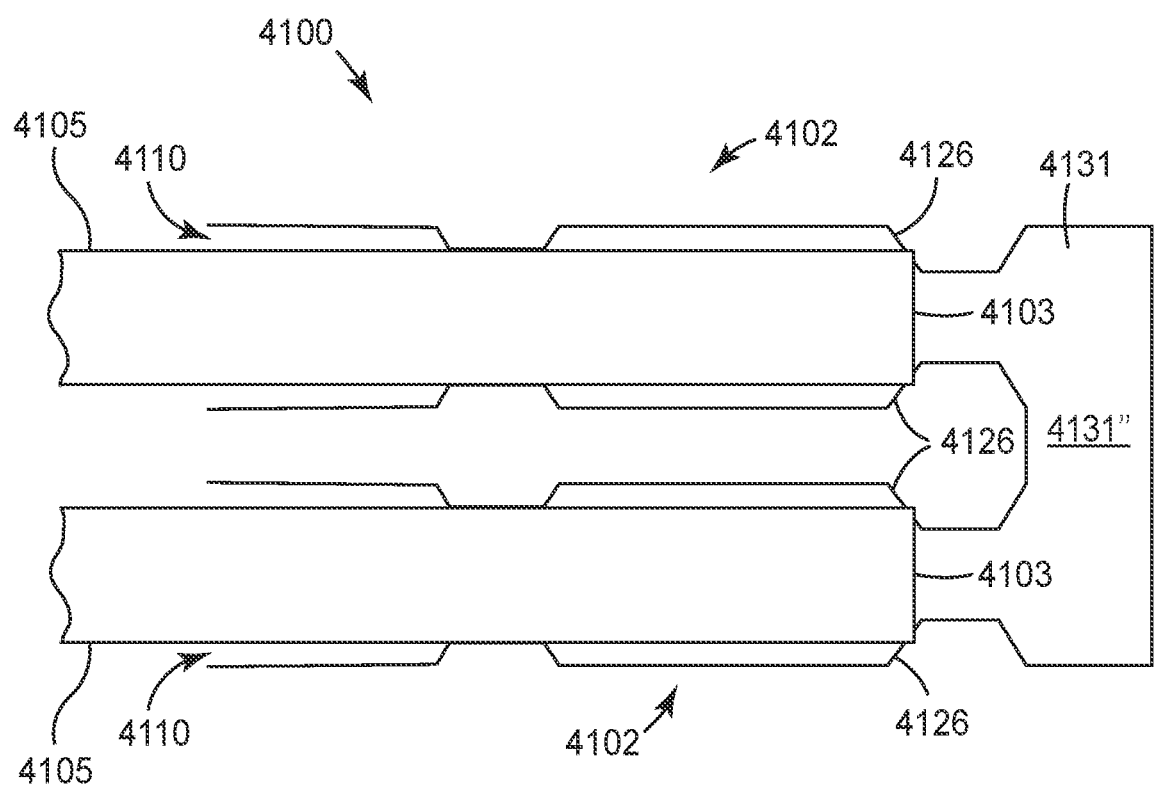
FIG. 48 is a top view of an LCU attachment area comprising a shared forward adhesive reservoir in accordance with various embodiments.

FIG. 48 illustrates an LCU attachment area 4102 comprising a multiplicity of grooves 4110 each having a waveguide 4105 disposed therein. In FIG. 48, two grooves 4110 are illustrated with respective waveguides 4105 in contact with centering surfaces 4126 at a centered position within the grooves 4110. FIG. 48 shows an adhesive reservoir 4131" located adjacent the forward adhesive cavities 4131. The adhesive reservoir 4131" is a volume of the LCU attachment area 4102 that is shared between two or more of the forward adhesive cavities 4131. In this regard, the adhesive reservoir 4131" is fluidically coupled to two or more of the forward adhesive cavities 4131. The adhesive reservoir 4131" provides a volume for receiving additional bonding material near the terminal ends 4103 of the waveguides 4105, which increases the strength/integrity of the bond between the waveguide 4105 and the LCU attachment area 4102. The adhesive reservoir 4131" can be configured to receive a volume of material other than an adhesive, such as an index gel or oil, for example.

FIGS. 49-55 illustrate a process for installing a waveguide 4105 in a Y-groove 4110 of an LCU attachment area 4102 in accordance with various embodiments. In some embodiments, the installation process can be monitoring using microscopes with digital cameras to provide views (e.g., top view, side view) similar to those shown in FIGS. 49 and 50. The waveguide 4105 to be positioned within the Y-groove 4110 is shown extending from a buffer 4116 which encompasses the waveguide 4105. The buffer 4106 is typically a polymer sheath which serves to protect the waveguide 4105.

Figure 49:
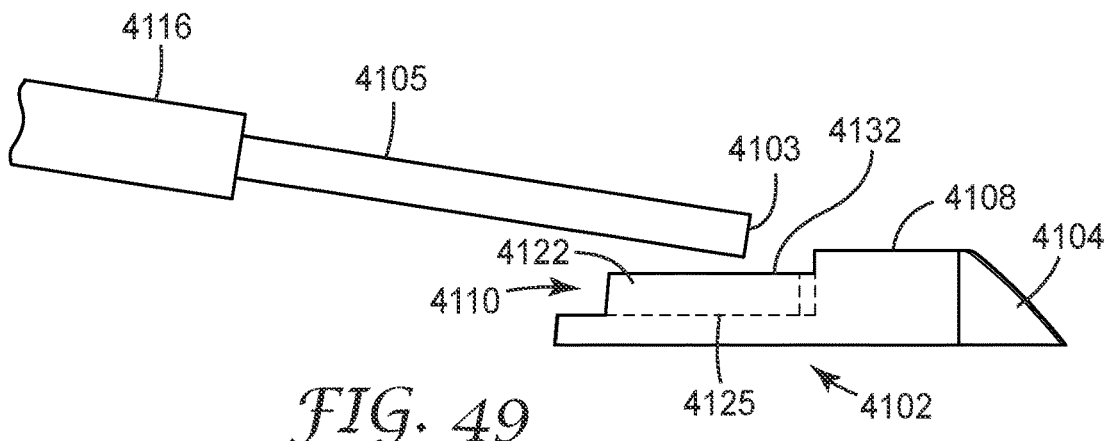
FIGS. 49-55 illustrate a process for installing a waveguide in a compound groove of an LCU attachment area in accordance with various embodiments.
Figure 50:
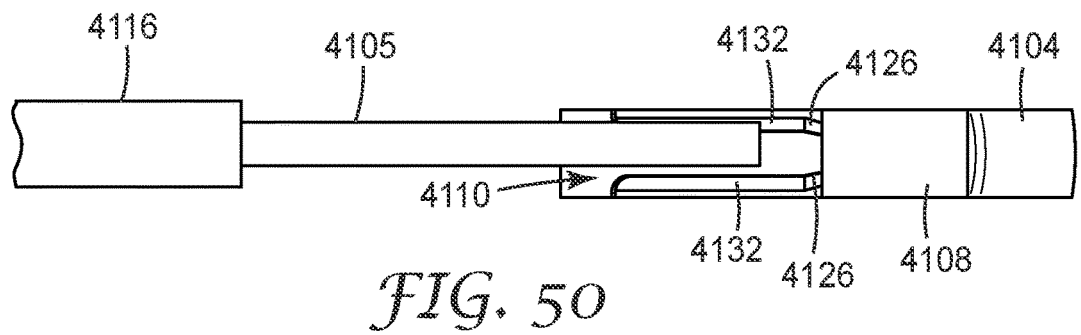
Figure 51:
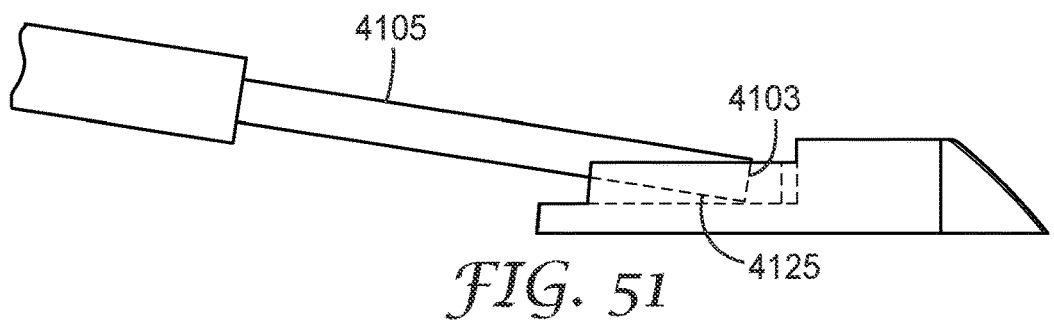
Figure 52:
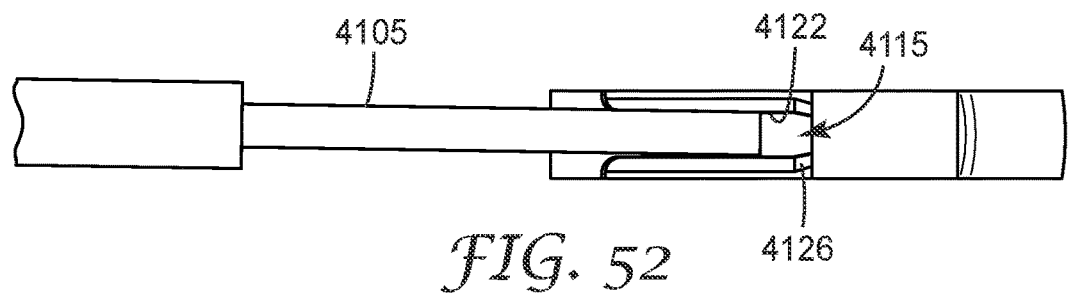

The waveguide 4105 is initially positioned over the expanded region (i.e., upper region) of Y-groove 4110 with the terminal end 4103 pointed downwards at a small angle (e.g., (5°-20°). FIGS. 49 and 50 illustrate a typical example in which the waveguide 4105 is initially misaligned within the Y-groove 4110. The upper expanded region of Y-groove 4110 includes angled side surfaces 4132 which serve to capture the waveguide 4105 and funnel the waveguide 4105 into the U-groove region (i.e., lower region) of the Y-groove 4110. As the terminal end 4103 of the waveguide 4105 is lowered, the terminal end 4103 contacts the capturing sidewall 4132 on one side of the Y-groove region, which guides the terminal end 4103 into the bottom region (i.e., U-groove region) of the Y-groove 4110, forcing the waveguide 4105 to bend and/or move laterally.

Figure 53:
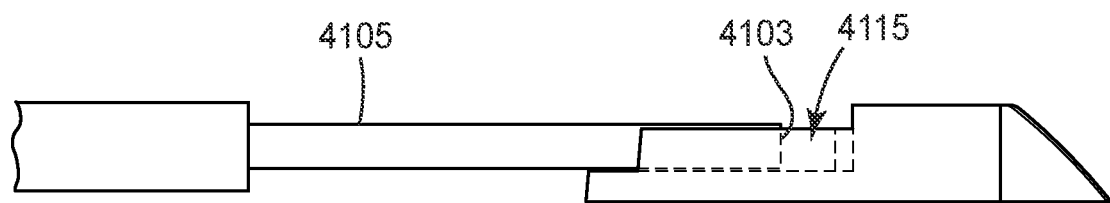
Figure 54:
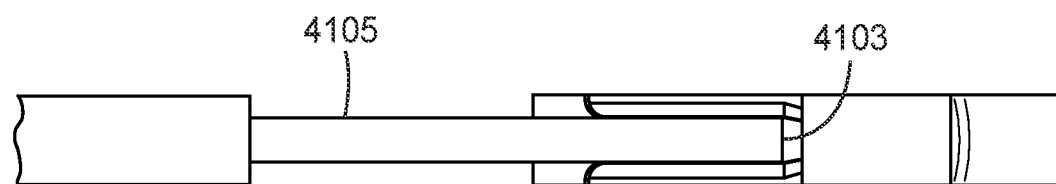
Figure 55:
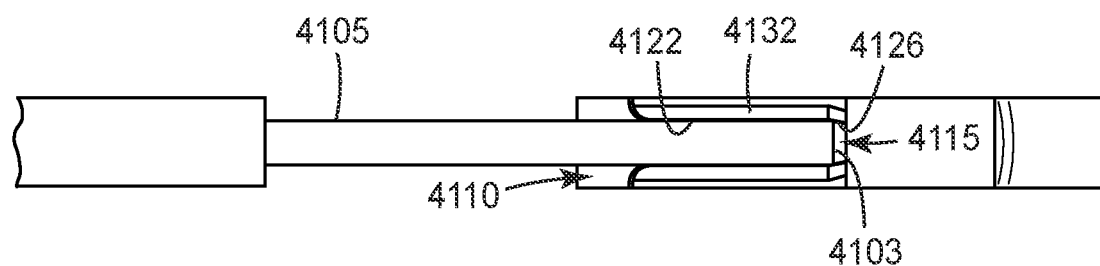

As the waveguide 4105 is lowered into the Y-groove 4110 (see FIG. 51), the terminal end 4103 is bent upward by the bottom surface 4125 of the Y-groove 4110. Simultaneously, the Y-groove 4110 continues to bend and/or move the waveguide 4105 laterally so that the waveguide 4105 is constrained by the near-vertical sidewalls 4122 of the U-groove region of the Y-groove 4110 (see FIG. 52). When the waveguide 4105 is approximately horizontal (i.e., tangent to the bottom surface 4125 of the Y-groove 4110), as is shown in FIG. 53, the waveguide 4105 is pushed forward into the longitudinal transition section 4115 of the Y-groove 4110 (see FIG. 54) until the terminal end 4103 contacts a centering surface 4126 (see FIG. 55). The centering surface 4126 pushes the terminal end 4103 of the waveguide 4105 laterally as needed until the terminal end 4103 is in contact with the centering surfaces 4126 on both sides of the Y-groove 4110, thereby precisely centering the terminal end 4103 of the waveguide 4105 in the Y-groove 4110, as is best seen in FIG. 55.

Figure 56:
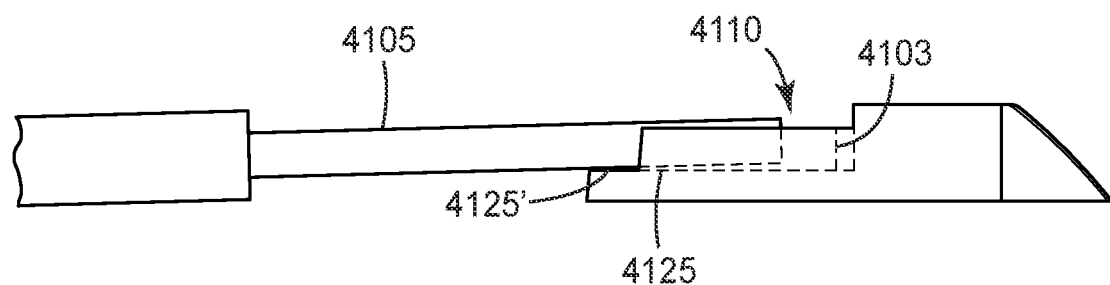
FIG. 56 illustrates an alignment error that can occur when installing a waveguide in a compound groove.

The final angle of the waveguide 4105 as it is centered by the centering surfaces 4126 is typically horizontal, and may be controlled by any suitable mechanical means, optionally guided by optical inspection of a side view, such as the view shown in FIG. 53. FIG. 56 illustrates an alignment error that can occur if the waveguide 4105 is lowered too much such that it makes contact with the rear edge 4125' of the bottom surface 4125 of the Y-groove 4110. In this scenario, the terminal end 4103 of the waveguide 4105 is levered up out of the Y-groove 4110. This misalignment is greatly reduced by recessing the most of the bottom surface 4125 of the Y-groove 4110, leaving only a relatively short porch region 4125" (FIG. 57) at the terminal end 4113 of the Y-groove 4110.

Figure 57:
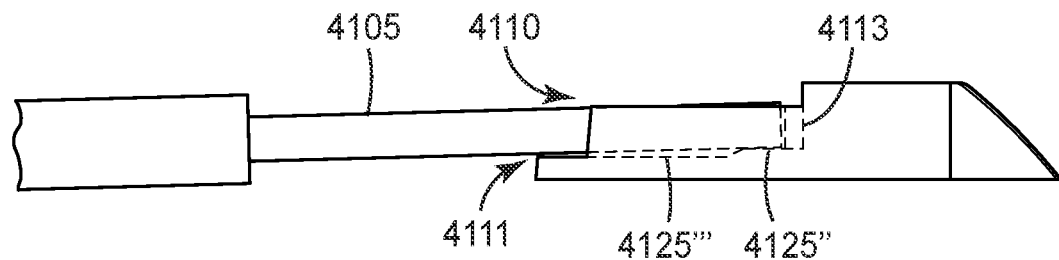
FIG. 57 shows a groove having a recessed bottom surface and a porch region according to various embodiments that facilitate reduction of the alignment error illustrated in FIG. 56.

As can be seen in FIG. 57, the majority of the bottom surface 4125''' is recessed relative to the porch region 4125" adjacent the terminal end 4113 of the Y-groove 4110. In some embodiments, the recessed section 4125''' of the bottom surface 4125 of the Y-groove 4110 can extend from the entrance 4111 of the Y-groove 4110 towards the terminal end 4113 and cover more than about one-half of the surface area of the bottom surface 4125. For example, the recessed section 4125''' can extend from the entrance 4111 of the Y-groove 4110 to within a distance from the terminal end 4113, the distance being less than about two times a height of the waveguide 4105 received by the Y-groove 4110. Typically, at least a portion of the recessed section 4125''' will be filled with cured optical adhesive, so that the waveguide 4105 is well supported.

A compound Y-groove 4110 comprising a lower U-groove and an expanded upper groove can be fabricated with injection molding of a thermoplastic (e.g., Ultem). Such materials have a much larger coefficient of thermal expansion than that of glass optical fibers. Therefore, there is concern over stresses caused by thermal excursions, such as may occur in operation in a computer chassis. These stresses may lead to optical misalignment due to warping of the part containing the Y-groove 4110, or even to failure of the adhesive used to bond the waveguide 4105. To minimize such stresses, it is desirable to minimize the length of the Y-groove 4110 that is filled with adhesive. However, sufficient groove length is required to constrain the angle of the waveguide 4105. The required length of the Y-groove 4110 depends on the angular tolerance of the optics system and on the extra width of the Y-groove 4110 included to provide clearance for the waveguide 4105.

Figure 58:
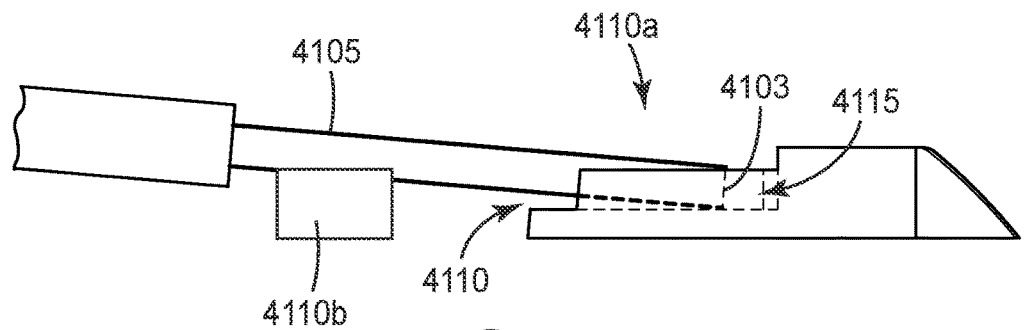
FIGS. 58-60 show a groove having two separate sections, including an angular alignment section and a longitudinal transition section comprising centering surfaces in accordance with various embodiments.
Figure 59:
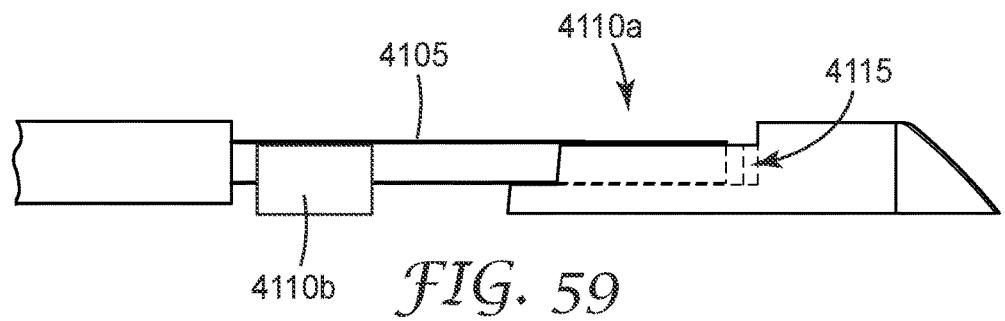
Figure 60:
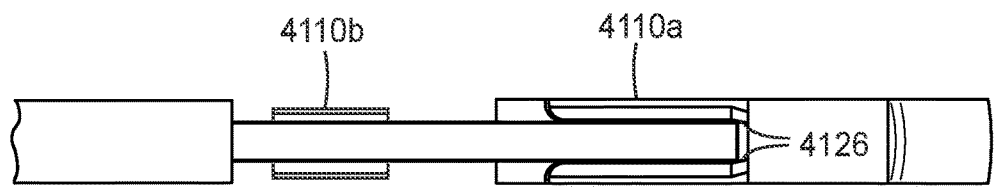

FIGS. 58-60 show a Y-groove 4110 with two separate sections 4110a and 4110b. Near the terminal end 4103 of the waveguide 4105, a short section includes the longitudinal transition section 4115 and the centering surfaces 4126. This section 4110a may be filled with index-matching adhesive. A separate section 4110b is placed some sufficient distance (e.g., 0.5 mm) from the section 4110b, such that it provides accurate angular alignment of the waveguide 4105 but is not filled with adhesive. This design minimizes stresses associated with thermal expansion (by minimizing the bond length) without compromising angular alignment.

Figure 61:
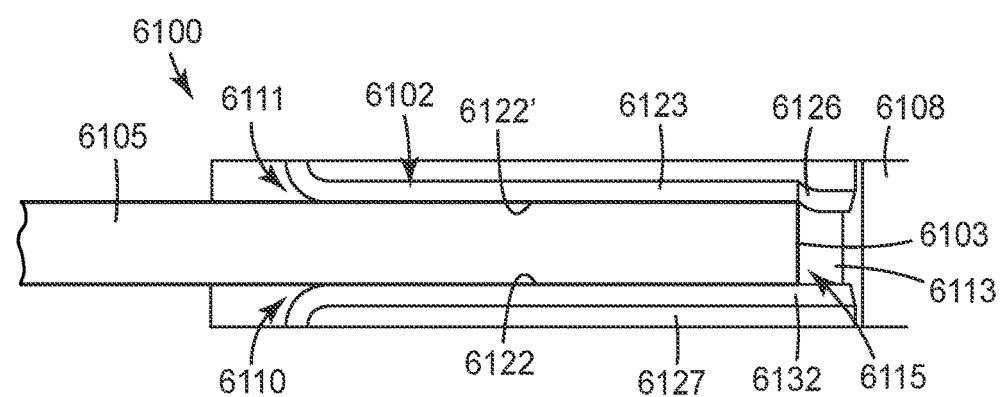
FIG. 61 shows an LCU that incorporates a compound groove having a positioning arrangement in accordance with various embodiments.

FIG. 61 illustrates a portion of an LCU 6100 in accordance with various embodiments. The LCU 6100 shown in FIG. 61 includes a single LCU attachment area 6102. Although a single LCU attachment area 6102 is shown in FIG. 61, it is understood that a multiplicity of attachment areas 6102 can be provided on the LCU 6100 for receiving and permanently attaching to a multiplicity of optical waveguides. The LCU attachment area 6102 includes a groove 6110 having an entrance 6111 and a terminal end 6113. The groove 6110 is configured to receive an optical waveguide, such as the generally cylindrical waveguide 4105 shown in FIG. 42.

The LCU 6100 includes a light redirecting member (not shown in FIG. 61, but see 4104 in FIG. 41) and an intermediate section 6108 between the light redirecting member and the terminal end 6113. In some embodiments, the terminal end 6113 comprises an optically clear member, such as a lens, or is formed from optically transparent material. The intermediate section 6108 is formed from an optically transparent material. The light redirecting member includes an output side through which light exits from (or enters into) the light directing member.

According to some embodiments, the groove 6110 is a compound groove formed by a generally U-shaped lower portion 6123 and an expanded upper portion 6127, 6132 making the compound groove generally Y-shaped (Y-groove), as has been described in detail hereinabove. The groove 6110 includes a longitudinal transition section 6115 that includes a single centering sidewall 6126. Within the longitudinal transition section 6115, the spacing between sidewalls 6122 and 6122' reduces from a width equal to that of the optical waveguide 6105 plus a clearance to a width less than the width of the optical waveguide 6105. In the embodiment illustrated in FIG. 61, one of the sidewalls 6122 is substantially planar between the entrance 6111 and terminal end 6113 of the groove 6110. The opposing sidewall 6122' includes a sidewall portion that is substantially parallel to sidewall 6122 and transitions to the centering sidewall 6126 that angles inwardly in the transition section 6115. The centering sidewall 6126 may be considered chamfered sidewall of the groove 6110.

In FIG. 61, the groove 6110 includes a centering sidewall 6126 only on one side of the groove 6110. As such, the single centering sidewall 6126 may be considered a positioning sidewall 6126. During assembly, the optical waveguide 6105 is slid along the planar sidewall 6122 until the positioning sidewall 6126 pins the optical waveguide 6105 at its installed location within the groove 6110, as is shown in FIG. 61. At this location, the positioning sidewall 6126 prevents further longitudinal advancement of the terminal end 6103 of the optical waveguide 6105 within the groove 6110. One advantage to the embodiment shown in FIG. 61 is that the angle of the optical waveguide 6105 can be well controlled during assembly, since it can be bent parallel to the sidewall 6122. In some embodiments, the positioning sidewall 6126 need not pinch the optical waveguide 6105, but can instead serve as a conventional stop, such as by defining the end of the groove 6110 or some other barrier, as long as the optical waveguide 6105 can be bent against the sidewall 6122 during assembly.

Figure 62:
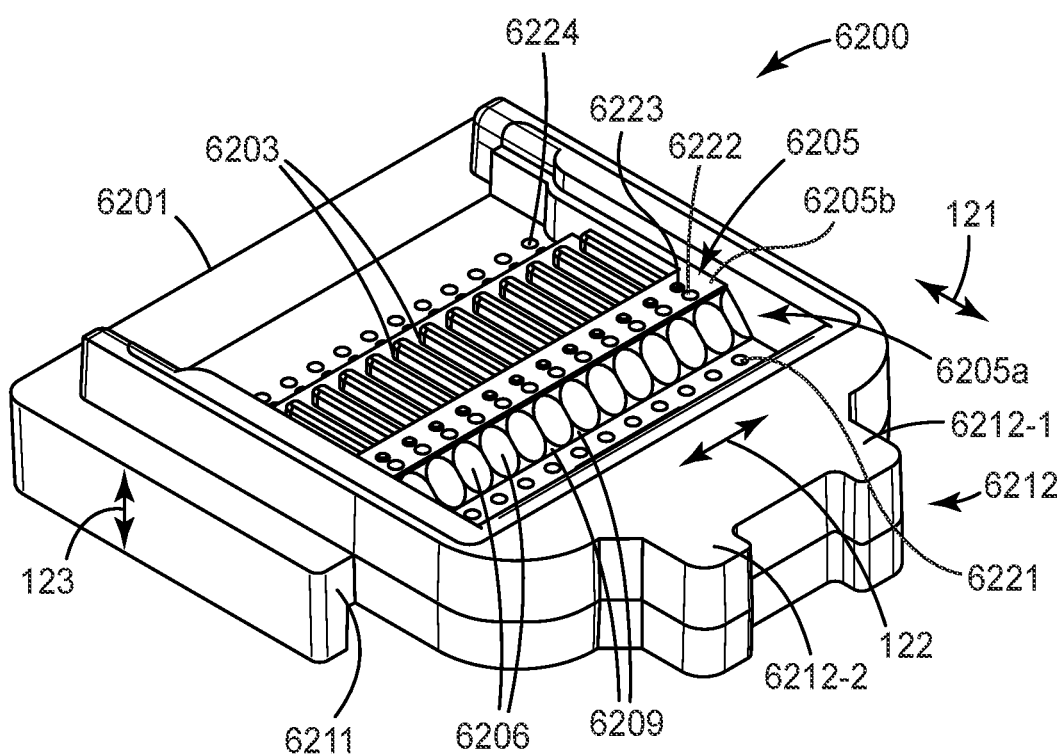
FIG. 62 illustrates an optical ferrule having fiducials in accordance with some embodiments.

FIG. 62 shows one side 6201 of an optical ferrule 6200, e.g., a molded optical ferrule, a molded plastic optical ferrule, that includes fiducials 1221-1224. Ferrule 6200 is configured to receive one or more optical waveguides and includes one or more features. Each feature corresponds to a different optical waveguide. The ferrule 6200 also includes one or more fiducials, wherein the one or more fiducials correspond to the one or more features. According to some implementation, the features of the optical ferrule 6200 are optical elements configured to be on an optical path of a light ray propagating within the ferrule and the one or more fiducials correspond to the one or more optical elements.

The ferrule 6200 includes elements 6203, e.g., grooves, U-shaped, V-shaped, or Y-shaped grooves configured for receiving and securing an optical waveguide. Ferrule 6200 includes one or more light affecting elements 6205 configured for affecting characteristics of light from the optical waveguide while propagating the light within the optical ferrule 6200. According to some embodiments, each light affecting element 6205 of the ferrule 6200 comprises a light redirecting feature 6205a that may include a curved lens 6206 and a planar surface 6207 disposed proximate to and/or at least partially surrounding the lens 6206. The light affecting element 6205 further includes an intermediate surface 6205b, e.g., a planar surface, disposed between the receiving element 6203 and light redirecting feature 6205a. Optical ferrule 6200 includes multiple receiving and securing elements 6203 and multiple light affecting elements 6205, however, some unitary optical ferrules can include a single receiving and securing element and a single light affecting element with an intermediate surface disposed therebetween.

The optical ferrule includes one or more alignment features, including feature 6211 configured to control translation of the ferrule 6200 along a first lateral axis 121. Features 6211 shown in the example optical ferrule 6200 are forward stops that engage with forward stops of a mating ferrule to set the mated distance between light affecting elements of the optical ferrule and light affecting elements of the mating ferrule. The forward stops 6211, when engaged with forward stops of the mating ferrule, also control rotation of the optical ferrule 6200 around the thickness axis 123.

The optical ferrule 6200 includes alignment features 6212, 6213 wherein alignment feature 6212 is a pin that fits into a compatible socket of a mating ferrule. Alignment feature 6213 is a socket that fits a pin of the mating ferrule. The pin 6212 includes spaced apart portions 6212a and 6212b. The pin 6212 and socket 6213 control translation of the optical ferrule 6200 along the second lateral axis 622 and may also control rotation of the optical ferrule 6200 around the thickness axis 623. Pin 6212 may be designed such that only the sides of the pin 6212 can come into contact with the mating socket, providing a lateral stop on either side of the pin 6212 and thereby controlling translation along the second lateral axis 122. The pin 6212 is designed to be slightly narrower that the socket 6213 to allow for manufacturing tolerances. Optionally, compliant features (not shown) could be designed into the pin and/or socket to allow for manufacturing tolerances. In some embodiments, the compliant features may provide flexible alignment. The pin or the socket, or both, can be fitted with compliant side features that facilitate centering the pin in the socket.

Additional information regarding optical ferrules having alignment features is provided in commonly owned and concurrently filed U.S. Patent Application Ser. 62/240,069, having the title "Optical Ferrules" which is incorporated herein by reference. Additional information regarding optical ferrules, frames, and connectors that employ flexible alignment features is provided in commonly owned and concurrently filed U.S. Patent Application Ser. 62/240,066, having the title "Ferrules, Alignment Frames and Connectors" and which is incorporated herein by reference.

The planar mating surface 6217 of optical ferrule 6200 controls translation of the ferrule 6200 along the thickness axis 123 and rotation of the ferrule 6200 along the first and second lateral axes 121, 122. An optical output window 6214 is disposed, e.g., recessed, in the planar mating surface 6217.

Optical ferrules and the molds used to make the optical ferrules according to various embodiments, including those illustrated herein, involve molded features, e.g., plastic molded features, configured to provide for propagation of light within the ferrule and between the ferrule and a mating ferrule that is aligned with the ferrule. For example, the light affecting elements may comprise lenses, e.g., curved lenses, configured to redirect light propagating in the ferrule. As previously described, the optical ferrules can include a planar mating surface having optical output window that is transparent to the propagating light, wherein the light propagating in the optical ferrule exits the optical ferrule after being transmitted by the optical output window.

In some embodiments, one or more fiducials may be molded into the ferrule wherein the fiducials correspond to the ferrule features. For example, a mold side may be fabricated by one or more tools and each fiducial may be a divot (or other feature) that indicates a location of the tool used form a mold feature.

One fiducial may correspond to a plurality of ferrule features or one fiducial may correspond to a single ferrule feature. For example, in implementations that include multiple light affecting elements, multiple fiducials may be used wherein each of the fiducials corresponds to one of the light affecting elements. In some embodiments, as shown in FIG. 62, two or more fiducials 6221, 6222 may correspond to a light redirecting feature 6205a, e.g., each light redirecting feature 6205a may be disposed between two fiducials 6221, 6222.

According to some implementations, at least one fiducial may correspond to at least a single receiving element. In implementations that include multiple receiving elements, multiple fiducials may be used, wherein each of the fiducials corresponds to one of the receiving elements. For example, as shown in FIG. 62, two or more fiducials 6223, 6224 may correspond to one of the receiving elements 6203, e.g., each receiving element 6203 may be disposed between two fiducials 6223, 6224. Fiducials that correspond to one feature (or type of feature) may have the same shape or may differ in shape from fiducials that correspond to another feature (or type of feature).

Additional information regarding ferrules, alignment frames, and connectors that may be used in conjunction with the approaches described herein is provided in the following commonly owned and concurrently filed U.S. Patent Applications which are incorporated herein by reference: U.S. Patent Application Ser. 62/239,998, having the title "Connector with Latching Mechanism"; U.S. Patent Application Ser. 62/240,069, having the title "Optical Ferrules"; U.S. Patent Application Ser. 62/240,066, having the title "Ferrules, Alignment Frames and Connectors,"; U.S. Patent Application Ser. 62/240,010, having the title "Optical Coupling Device with Waveguide Assisted Registration,"; U.S. Patent Application Ser. 62/240,000, having the title "Dust Mitigating Optical Connector,"; U.S. Patent Application Ser. 62/240,009, having the title "Optical Waveguide Registration Feature,"; U.S. Patent Application 62/239,996, having the title "Optical Ferrules and Optical Ferrule Molds,"; U.S. Patent Application 62/240,002, having the title "Optical Ferrules with Waveguide Inaccessible Space,"; U.S. Patent Application 62/104,196, having the title "Configurable Modular Connectors,"; and U.S. Patent Application 62/240,005, having the title "Hybrid Connectors,".

Items described in this disclosure include:

Item 1. An optical cable subassembly comprising:
   one or more optical waveguides;
   at least one light coupling unit comprising a first attachment area permanently attached to the optical waveguides; and
   at least one cable retainer comprising a second attachment area permanently attached to the optical waveguides and adapted to be installed in a housing, a length of the optical waveguides between the first attachment area and the second attachment area configured to allow a bend in the optical waveguides that provides a predetermined mating spring force at a predetermined angle of the light coupling unit when installed in the housing.

Item 2. The subassembly of item 1, wherein the optical cable subassembly is adapted to be installed in and subsequently removed from the housing without damage to the housing or optical cable subassembly.

Item 3. The subassembly of any of items 1 through 2, wherein:
   the one or more optical waveguides comprises multiple waveguide arrays; and
   the at least one cable retainer comprises a single cable retainer attached to each of the multiple waveguide arrays.

Item 4. The subassembly of any of items 1 through 3, wherein the cable retainer is adhesively attached to the optical waveguides.

Item 5. The subassembly of any of items 1 through 4, wherein the cable retainer is attached to the optical waveguides by one or more mechanical fasteners.

Item 6. The subassembly of any of items 1 through 5, wherein the cable retainer is attached to cladding of the optical waveguides.

Item 7. The subassembly of any of items 1 through 6, wherein the cable retainer is attached to buffer coatings of the optical waveguides.

Item 8. The subassembly of any of items 1 through 7, wherein the cable retainer is attached to a jacket of the plurality of optical waveguides.

Item 9. The subassembly of any of items 1 through 8, wherein adhesive is disposed between an outer surface of the plurality of optical waveguides and an inner surface of the cable retainer.

Item 10. The subassembly of any of items 1 through 9, wherein the cable retainer includes features that provide a space for adhesive between the inner surface of the cable retainer and the outer surface of the plurality of optical waveguides.

Item 11. The subassembly of any of items 1 through 10, wherein the cable retainer includes fingers configured to grip the plurality of optical waveguides in response to a force applied to the fingers.

Item 12. The subassembly of any of items 1 through 10, wherein the cable retainer is a unitary component.

Item 13. The subassembly of any of items 1 through 10, wherein the cable retainer is a multi-piece component.

Item 14. The subassembly of any of items 1 through 10, wherein the cable retainer includes first and second pieces and the optical waveguides are disposed between the first and second pieces.

Item 15. The subassembly of any of items 1 through 10, wherein the cable retainer includes a channel piece and a plate piece and the optical waveguides are disposed between the channel piece and the plate piece.

Item 16. The subassembly of any of items 1 through 10, wherein the cable retainer includes a first channel piece and a second channel piece and the optical waveguides are disposed between the first channel piece and the second channel piece.

Item 17. The subassembly of any if items 1 through 10, wherein the cable retainer includes a first piece and a second piece that fits at least partially within the first piece and the optical waveguides are attached to the cable retainer between the first piece and the second piece.

Item 18. The subassembly of any of items 1 through 10, further comprising an elastomeric grommet that is compressed around the optical waveguides when the optical waveguides are disposed within the cable retainer.

Item 19. The subassembly of any of items 1 through 10, wherein the cable retainer includes a first piece and a second piece attached to the first piece by a hinge.

Item 20. The subassembly of any of items 1 through 10, wherein the cable retainer includes a first piece and a second piece with the optical waveguides disposed between the first piece and the second piece, the first piece and the second piece including complementary latching parts that latch the first piece and the second piece together.

Item 21. The subassembly of any of items 1 through 10, wherein the cable retainer comprises a key configured to orient the cable retainer within the housing.

Item 22. The subassembly of any of items 1 through 21, wherein an inner surface of the cable retainer includes alignment grooves, each alignment groove dimensioned to receive an optical waveguide of the one or more optical waveguides.

Item 23. The subassembly of any of items 1 through 22, wherein the cable retainer has a first end and a second end and the retainer has a beveled opening at one or both of the first end and the second end.

Item 24. The subassembly of any of items 1 through 23, wherein the cable retainer has a first end having a first opening for the optical waveguides and a second end with a second opening for the optical waveguides and the optical waveguides bend inside the cable retainer between the first end and the second end.

Item 25. The subassembly of any of items 1 through 24, wherein the cable retainer has a first end with a first opening for the optical waveguides and a second end with a second opening for the optical waveguides and the optical waveguides are not perpendicular to a major surface of at least one end of the cable retainer.

Item 26. The subassembly of any of items 1 through 25, further comprising a strain relief boot, wherein the cable retainer is disposed between the boot and the light coupling unit.

Item 27. The subassembly of any of items 1 through 26, wherein the cable retainer includes a strain relief section attached to a jacket of the plurality of optical waveguides.

Item 28. The subassembly of item 27, wherein the cable retainer is attached to a cladding of the optical waveguides of the plurality of optical waveguides.

Item 29. The subassembly of item 27, wherein the cable retainer is attached to a buffer coating of the optical waveguides of the plurality of optical waveguides.

Item 30. The subassembly of item 27, wherein the cable retainer is attached to a jacket of the plurality of optical waveguides.

Item 31. The subassembly of any of items 1 through 30, wherein first attachment area comprises one or more grooves provided at the attachment area, each groove configured to receive an optical waveguide and defined by:
- a first region, a second region, an opening, and a bottom surface;
- the first region defined between the bottom surface and the second region, the first region in cross section having substantially parallel sidewalls separated by a spacing; and
- the second region disposed between the first region and the opening, wherein a width of the opening is greater than the spacing.

Item 32. The subassembly of any of items 1 through 31, wherein the first attachment area comprises:
- one or more grooves, each groove configured to receive an optical waveguide having a width;
- each groove having a first region and a bottom surface, the first region in cross section having substantially parallel sidewalls separated by a spacing; and
- each groove having a longitudinal transition section comprising a first end and a second end, the first end having a sidewall spacing greater than the width of the optical waveguide, and the second end having a sidewall spacing less than the width of the optical waveguide.

Item 33. The subassembly of any of items 1 through 32, wherein the first attachment area comprises:
- a one or more grooves, each groove configured to receive an optical waveguide having a width;
- each groove having a first region and a bottom surface, the first region in cross section having substantially parallel sidewalls separated by a spacing; and
- each groove having two or more sections along a longitudinal direction wherein each section has a different sidewall spacing than adjoining sections, wherein at least one of the sections has a sidewall spacing less than a width of the optical waveguide.

Item 34. The subassembly of any of items 1 through 33, wherein the light coupling unit comprises:
- a first major surface comprising one or more substantially parallel first grooves oriented along a first direction for receiving one or more optical waveguides; and
- a second major surface for slidably contacting a mating light coupling unit, the second major surface comprising:
  - an optically transmitting window for propagating an optical signal therethrough; and
  - a region of second grooves and lands configured to capture particulate contaminants in the second grooves.

Item 35. The subassembly of any of items 1 through 34, wherein the light coupling unit comprises:
- a first major surface comprising one or more substantially parallel first grooves oriented along a first direction for receiving one or more optical waveguides; and
- a second major surface for slidably contacting a mating light coupling unit, the second major surface comprising:
  - an optically transmitting window for propagating an optical signal therethrough; and
  - a region of second grooves and lands configured to capture particulate contaminants in the second grooves, the second grooves substantially parallel to each other and oriented along a direction different from the first direction of the first grooves on the first major surface.

Item 36. The subassembly of any of items 1 through 35, wherein the light coupling unit comprises;
- an optically transmitting window for propagating an optical signal therethrough;
- a plurality of substantially parallel first grooves on a first region of the surface oriented along a first direction; and
- a plurality of substantially parallel second grooves on a second region of the surface oriented along the first direction; and
- a third region of the first major surface disposed between first and second regions, the third region being substantially devoid of grooves.

Item 37. The subassembly of any of items 1 through 36, wherein:
- the first attachment area comprises a plurality of first grooves; and
- the light coupling unit is adapted to mate with a mating light coupling unit along a mating direction, the light coupling unit comprising a plurality of substantially parallel second grooves in a mating surface oriented along a first direction different than the mating direction.

Item 38. The subassembly of any of items 1 through 37, wherein the light coupling unit comprises:
- a first section comprising a mating tongue having a mating tongue surface;
- a second section comprising:
  - a first surface comprising the first attachment area configured for receiving and permanently attaching to the optical waveguides; and
  - a second mating surface opposing the first surface and comprising a plurality of grooves, the grooves configured to capture particulate contaminants between the second mating surface and a mating tongue surface of a mating light coupling unit;
- a plurality of light redirecting members on the first surface optically coupled to the optical waveguides; and
- an optically transmitting window on the second mating surface between the grooves and the mating tongue, the optically transmitting window optically coupled to the light redirecting members.

Item 39. The subassembly of any of item 1 through 38, wherein the light coupling unit includes one or more curved surfaces, each curved surface corresponding to a different optical waveguide, the curved surface being configured to change a divergence of light from the optical waveguide.

Item 40. An optical cable subassembly comprising:
- one or more optical waveguides;
- at least one light coupling unit permanently attached to and adapted to receive optical signals from the optical waveguides and propagate the received optical signal therein; and
- a cable retainer permanently attached to the plurality of optical waveguides and adapted to engage a corresponding retainer mount in a connector housing such than when the subassembly is installed in the housing, the engagement of the cable retainer and the retainer mount provides the only attachment of the subassembly to the housing between the cable retainer and the light coupling unit.

Item 41. An optical cable subassembly comprising:
- one or more optical waveguides;
- at least one light coupling unit comprising a first attachment area for receiving and permanently attaching to the plurality of optical waveguides; and
- at least one cable retainer comprising a second attachment area for receiving and attaching to the optical waveguides, the cable retainer dimensioned to couple with a retainer mount of a connector housing such that a position of the second attachment area within the connector housing is fixed, the light coupling unit and the first attachment area configured to move within the connector housing relative to the fixed position of the second attachment area, and a length of the optical waveguides between the first attachment area and the second attachment area allows the optical waveguides to bend within the housing as the first attachment area moves relative to the second attachment area.

Item 42. The subassembly of item 41, wherein:
- the retainer mount comprises a slot, and
- the cable retainer is configured to grip and attach to the optical waveguides due to friction between outer surfaces of the optical waveguides and inner surfaces of the cable retainer due to a force applied by the slot on the cable retainer.

Item 43. The subassembly of any of items 41 through 42, wherein the cable retainer is cylindrical in shape, and has a key to control the rotary position of the cable retainer in the housing, thereby controlling an angle of the optical waveguides.

Item 44. An optical cable subassembly comprising:
- one or more optical waveguides;
- at least one light coupling unit comprising a first attachment area for receiving and permanently attaching to the plurality of optical waveguides; and
- at least one cable retainer comprising a second attachment area for receiving and attaching to the plurality of optical waveguides, the cable retainer dimensioned to couple with a retainer mount of a connector housing such that a position of the second attachment area within the connector housing is fixed, a length of the plurality of optical waveguides between the first attachment area and the second attachment area of the optical cable subassembly being greater than a straight-line distance between the first attachment area and the second attachment area after the optical cable subassembly is installed in the connector housing.

Item 45. An optical connector housing comprising:
- a mating end;
- a non-mating end opposite the mating end; and
- a passageway extending between the mating end and the non-mating end, the passageway dimensioned to receive an optical cable subassembly including one or more optical waveguides attached to at least one light coupling unit and to at least one cable retainer;
- a retainer mount configured to receive the cable retainer in the housing such that the position of the optical cable subassembly is fixed within the housing by the retainer mount, the passageway dimensioned to constrain the optical waveguides to bend within the housing between the retainer mount and the mating end.

Item 46. The housing of item 45, wherein sides of the passageway are curved.

Item 47. The housing of any of items 45 through 46, wherein sides of the passageway are configured to support the optical cable subassembly within the housing when the light coupling unit is in an unmated position.

Item 48. The housing of any of items 45 through 47, further comprising features configured to support the light coupling unit when the light coupling unit is in an unmated position.

Item 49. The housing of any of items 45 through 48, further comprising a feature at a mating end of the housing configured to support the optical waveguides near the light coupling unit when the light coupling unit is in an unmated position.

Item 50. The housing of any of items 45 through 49, wherein arms extending at a mating end of the housing are configured to support the light coupling unit.

Item 51. The housing of any of items 45 through 50, wherein the retainer mount is a slot.

Item 52. The housing of any of items 45 through 51, wherein the cable retainer comprises one or more holes in the cable retainer and the retainer mount comprises one or more pegs that fit within the holes.

Item 53. The housing of any of items 45 through 52, wherein the cable retainer comprises one or more pegs and the retainer mount of the housing comprises one or more holes, each hole dimensioned to receive the one of the pegs.

Item 54. The housing of any of items 45 through 53, wherein the cable retainer includes a key configured to control rotary orientation of the cable retainer in the retainer mount.

Item 55. An optical connector assembly comprising:
- an optical cable subassembly comprising:
  - one or more optical waveguides;
  - at least one light coupling unit comprising a first attachment area for receiving and permanently attaching to the optical waveguides; and
  - at least one cable retainer comprising a second attachment area for receiving and attaching to the optical waveguides; and
- a housing comprising:
  - at least one passageway dimensioned to receive the optical cable subassembly; and
  - at least one retainer mount configured to couple with the cable retainer such that a position of second attachment area is fixed within the housing, the passageway dimensioned to constrain the optical waveguides to bend within the housing between the first attachment area and the second attachment area.

Item 56. The assembly of item 55, wherein a longitudinal axis of the optical waveguides within the cable retainer is angled with respect to a mating direction of the connector housing.

Item 57. The assembly of any of items 55 and 56, wherein the cable retainer has a first end with a first opening for the optical waveguides and a second end with a second opening for the optical waveguides and the cable retainer has a longitudinal axis between the first opening and the second opening and the longitudinal axis of the cable retainer is substantially parallel to a mating direction of the connector housing.

Item 58. The assembly of any of items 55 through 56, wherein the cable retainer has a first end with a first opening for the optical waveguides and a second end with a second opening for the optical waveguides and the cable retainer has a longitudinal axis between the first opening and the second opening and the longitudinal axis of the cable retainer is angled with respect to a mating direction of the connector housing.

Item 59. The assembly of any of items 55 through 58, wherein the cable retainer is disposed entirely within the connector housing.

Item 60. The assembly of any of items 55 through 58, wherein the cable retainer is disposed partially within the connector housing and partially outside the connector housing.

Item 61. A method of making an optical cable subassembly comprising:
  attaching one or more optical waveguides at a first attachment area of a light coupling unit, the first attachment area configured for receiving and permanently attaching to the optical waveguides; and
  attaching the optical waveguides to a cable retainer comprising a second attachment area for receiving and attaching to the optical waveguides, a length of the optical waveguides between the first attachment area and the second attachment area configured to allow a bend in the optical waveguides that provides a predetermined mating spring force at a predetermined angle of the light coupling unit.

Item 62. The method of item 61, wherein attaching the optical waveguides to the cable retainer comprises inserting a linear array of waveguides into a channel of the cable retainer by motion primarily along a direction parallel to a plane of the array of waveguides, and orthogonal to a direction of axes of the waveguides.

Item 63. The method of item 61, wherein attaching the optical waveguides to the cable retainer comprises inserting a linear array of waveguides into a channel of the cable retainer by motion primarily along a direction perpendicular to the plane of the array of waveguides, and orthogonal to the direction of the waveguide axes.

Item 64. The method of item 61, wherein attaching the plurality of optical waveguides to the cable retainer comprises threading a linear array of waveguides through a closed channel of the cable retainer.

Item 65. The method of any of items 61 through 64, further comprising attaching a strain relief boot over the optical waveguide on the opposite side of the cable retainer from the light coupling unit.

Item 66. The method of item 65, wherein the strain relief boot is attached to the cable retainer before the cable retainer is assembled into the housing.

Item 67. A method of making an optical connector assembly comprising:
  assembling an optical cable subassembly comprising:
    attaching one or more optical waveguides at a first attachment area of a light coupling unit;
    attaching the optical waveguides at a second attachment area of a cable retainer;
  inserting the optical cable subassembly into a housing comprising:
    coupling the cable retainer to a retainer mount in the housing, the coupling of the cable retainer into the retainer mount fixing a position of the optical cable assembly within the housing; and
    inserting the optical waveguides into a passageway in the housing, the passageway dimensioned to constrain the optical waveguides to bend within the housing between the first attachment area and the second attachment area.

Item 68. A method of making an optical connector assembly comprising:
  assembling an optical cable subassembly comprising:
    attaching one or more optical waveguides at a first attachment area of a light coupling unit;
    attaching the optical waveguides at a second attachment area of a cable retainer;
  inserting the optical cable subassembly into a housing comprising:
    coupling the cable retainer to a retainer mount in the housing, the coupling of the retainer and the retainer mount fixing a position of the optical cable assembly within the housing; and
    inserting the optical waveguides into a passageway within the housing, a length of the optical waveguides between the first attachment area and the second attachment area being greater than a distance between the first attachment area and the second attachment area after the optical cable subassembly is installed in the connector housing.

Item 69. An optical ferrule comprising one or more optical elements, each optical element configured to be on an optical path of a light ray propagating within the ferrule, and one or more fiducials, the one or more fiducials corresponding to the one or more optical elements.

Item 70. The optical ferrule of item 69, wherein the one or more optical elements comprise a plurality of optical elements and each fiducial corresponds to one of the optical elements.

Item 71. The optical ferrule of any of item 69 through 70 wherein multiple fiducials correspond to each of the optical elements.

Item 72. The optical ferrule of item 71, wherein the multiple fiducials comprise at least two fiducials.

Item 73. The optical ferrule of item 72, wherein the optical element is disposed between the two fiducials.

Item 74. An optical ferrule configured to receive a one or more optical waveguides and comprising: one or more features, each feature corresponding to a different optical waveguide; and one or more fiducials, the one or more fiducials corresponding to the one or more features.

Item 75. The optical ferrule of item 74, wherein the one or more features comprise one or more elements configured for receiving and securing the optical waveguides.

Item 76. The optical ferrule of item 75, wherein the elements configured for receiving and securing the optical waveguides comprise grooves.

Item 77. The optical ferrule of any of items 74 through 76, wherein the one or more features comprise one or more light redirecting features.

Item 78. The optical ferrule of any of items 74 through 77 wherein one fiducial corresponds to multiple features.

Item 79. The optical ferrule of any of items 74 through 78, wherein multiple fiducials correspond to each feature.

Item 80. The optical ferrule of item 79, wherein the multiple fiducials comprise at least two fiducials.

Item 81. The optical ferrule of item 80, wherein the each feature is disposed between the at least two fiducials.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical assembly configured to be assembled to a housing of an optical connector and comprising:
   an optical ferrule;
   an optical fiber retainer spaced apart from the optical ferrule and configured to be attached to the housing; and
   an optical fiber permanently attached to the optical ferrule at a first location of the optical fiber and attached to the optical fiber retainer at a second location, spaced apart from the first location, of the optical fiber, wherein the cable retainer has a first end with a first opening for the optical fiber and a second end with a second opening for the optical fiber and the optical fiber is not perpendicular to a major surface of at least one of the first end and the second end of the cable retainer;
   wherein the optical ferrule comprises a top major top surface opposite a bottom major mating surface, the optical fiber permanently attached to the top major surface, the major mating surface configured to slidably contact a corresponding mating surface of a mating light coupling unit, the major mating surface comprising a plurality of spaced apart posts extending therefrom.

2. The optical assembly of claim 1, wherein when the optical assembly is assembled to the housing of the optical connector, the optical fiber retainer is attached to the housing and provides the only attachment of the optical assembly to the housing.

3. The optical assembly of claim 1, wherein when the optical assembly is assembled to the housing of the optical connector, the optical ferrule rests on a support feature of the housing, and wherein when the optical connector mates with a mating optical connector, the optical ferrule floats within the housing.

4. The optical assembly of claim 1, wherein at least some of the posts in the plurality of spaced apart posts are configured to capture particulate contaminants when the mating surface slidably contacts the corresponding mating surface of the mating light coupling unit.

5. The optical assembly of claim 1, wherein when the mating surface slidably contacts the corresponding mating surface of the mating light coupling unit, top surfaces of at least some of the posts make contact with the major mating surface.

6. The optical assembly of claim 1, wherein the cable retainer includes fingers configured to grip the optical fiber in response to a force applied to the fingers.

* * * * *